US006695204B1

(12) United States Patent
Stinson et al.

(10) Patent No.: US 6,695,204 B1
(45) Date of Patent: Feb. 24, 2004

(54) METHOD AND APPARATUS FOR AUTOMATIC CHECK CASHING

(75) Inventors: Michael C. Stinson, Fort Worth, TX (US); John W. Templer, Jr., Fort Worth, TX (US); Dyron Clower, Fort Worth, TX (US)

(73) Assignee: ATC Realty Fifteen, Inc., Los Angeles, CA (US)

( * ) Notice: Subject to any disclaimer, the term of this patent is extended or adjusted under 35 U.S.C. 154(b) by 0 days.

(21) Appl. No.: 09/528,411

(22) Filed: Mar. 17, 2000

Related U.S. Application Data

(63) Continuation of application No. 08/854,321, filed on May 12, 1997, now Pat. No. 6,145,738.
(60) Provisional application No. 60/036,923, filed on Feb. 6, 1997.

(51) Int. Cl.[7] ................................................ G06F 17/60
(52) U.S. Cl. ...................... 235/379; 235/992; 235/375; 235/380; 235/381; 235/382
(58) Field of Search ................................. 235/379, 380, 235/381, 382, 492

(56) References Cited

U.S. PATENT DOCUMENTS

| 3,564,132 | A | 2/1971 | Baker |
| 3,588,449 | A | 6/1971 | Paterson |
| 3,675,816 | A | 7/1972 | Bourke, II et al. |
| 3,705,384 | A | 12/1972 | Wahlberg |

(List continued on next page.)

FOREIGN PATENT DOCUMENTS

| DE | 19809006 | 9/1999 |
| EP | 0878780 A2 | 11/1998 |

(List continued on next page.)

OTHER PUBLICATIONS

Anonymous, "No Longer On the Fringe? (While the total number of rent–to–own stores has dropped slightly in the last two years, there are still 7,500 of them)", Collections & Credit Risk, p. 53+, vol. 1, No. 7, Jul. 1996.

(List continued on next page.)

*Primary Examiner*—Michael G. Lee
*Assistant Examiner*—Daniel Walsh
(74) *Attorney, Agent, or Firm*—Glenn D. Bellamy; Greenebaum Doll & McDonald PLLC

(57) ABSTRACT

An automated check-cashing unit includes an input device configured to generate input signals in response to inputs from a customer, a storage device including a database of customer information, a check reader configured to receive and read a check to be processed, a cash dispenser, and an electronic processor. The processor is configured to receive the input signals from the input device, receive information about the check to be processed from the check reader, access the database of customer information to obtain data about the customer, and determine automatically whether to accept or reject the check based on the input signals, the received information about the check, and the data about the customer. Upon accepting the check, the processor signals the cash dispenser to dispense cash to the customer. The processor may be further configured to confirm the identity of the customer based on biometric information about the customer. Examples of suitable biometric information include the customer's fingerprint or an image of the customer's face.

9 Claims, 78 Drawing Sheets

U.S. PATENT DOCUMENTS

| | | | |
|---|---|---|---|
| 3,718,908 A | 2/1973 | Bloomstein | |
| 3,798,603 A | 3/1974 | Walberg | |
| 3,833,885 A | 9/1974 | Gentile et al. | |
| 3,876,864 A | 4/1975 | Clark et al. | |
| 3,896,266 A | 7/1975 | Waterbury | |
| 3,914,579 A | 10/1975 | Shigemori et al. | |
| 3,937,925 A | 2/1976 | Boothroyd | |
| 3,943,335 A | 3/1976 | Kinker et al. | |
| 3,970,992 A | 7/1976 | Boothroyd et al. | |
| 4,025,758 A | 5/1977 | Hatanaka et al. | |
| 4,083,635 A * | 4/1978 | Reed, Jr. | 355/40 |
| 4,100,370 A | 7/1978 | Suzuki et al. | |
| 4,109,238 A | 8/1978 | Creekmore | |
| 4,187,498 A | 2/1980 | Creekmore | |
| 4,205,780 A | 6/1980 | Burns et al. | |
| 4,249,163 A | 2/1981 | Maurer et al. | |
| 4,264,808 A | 4/1981 | Owens et al. | |
| 4,317,957 A | 3/1982 | Sendrow | |
| 4,321,672 A | 3/1982 | Braun et al. | |
| 4,357,597 A | 11/1982 | Butler | |
| 4,404,649 A | 9/1983 | Nunley et al. | |
| 4,423,318 A | 12/1983 | Gotou | |
| 4,449,189 A | 5/1984 | Feix et al. | |
| 4,461,028 A | 7/1984 | Okubo | |
| 4,523,330 A | 6/1985 | Cain | |
| 4,541,057 A | 9/1985 | Hagiwara | |
| 4,580,040 A * | 4/1986 | Granzow et al. | 235/379 |
| 4,617,457 A | 10/1986 | Granzow et al. | |
| 4,641,239 A | 2/1987 | Takesako | |
| 4,669,487 A | 6/1987 | Frieling | |
| 4,672,377 A * | 6/1987 | Murphy et al. | 235/375 |
| 4,727,243 A | 2/1988 | Savar | |
| 4,729,128 A | 3/1988 | Grimes et al. | |
| 4,752,676 A | 6/1988 | Leonard et al. | |
| 4,810,866 A | 3/1989 | Lord, Jr. | |
| 4,821,118 A | 4/1989 | Lafreniere | |
| 4,845,636 A | 7/1989 | Walker | |
| 4,916,435 A | 4/1990 | Fuller | |
| 4,922,419 A | 5/1990 | Ohashi et al. | |
| 4,926,480 A | 5/1990 | Chaum | |
| 4,961,142 A | 10/1990 | Elliott et al. | |
| 4,975,969 A | 12/1990 | Tal | |
| 4,975,978 A | 12/1990 | Ando et al. | |
| 4,991,008 A | 2/1991 | Nama | |
| 4,993,068 A | 2/1991 | Piosenka et al. | |
| 5,023,782 A | 6/1991 | Lutz et al. | |
| 5,040,226 A | 8/1991 | Elischer et al. | |
| 5,053,607 A | 10/1991 | Carlson et al. | |
| 5,056,147 A | 10/1991 | Truner et al. | |
| 5,095,194 A | 3/1992 | Barbanell | |
| 5,103,079 A | 4/1992 | Barakai et al. | |
| 5,144,680 A | 9/1992 | Kobayashi et al. | |
| 5,163,094 A | 11/1992 | Prokoski et al. | |
| 5,177,342 A | 1/1993 | Adams | |
| 5,220,501 A | 6/1993 | Lawlor et al. | |
| 5,224,173 A | 6/1993 | Kuhns et al. | |
| 5,229,764 A | 7/1993 | Matchett et al. | |
| 5,237,620 A | 8/1993 | Deaton et al. | |
| 5,265,008 A | 11/1993 | Benton et al. | |
| 5,291,560 A | 3/1994 | Daugman | |
| 5,305,196 A | 4/1994 | Deaton et al. | |
| 5,341,428 A | 8/1994 | Schatz | |
| 5,347,580 A | 9/1994 | Molva et al. | |
| 5,351,303 A | 9/1994 | Willmore | |
| 5,386,103 A * | 1/1995 | DeBan et al. | 235/379 |
| 5,386,104 A | 1/1995 | Sime | |
| 5,408,536 A | 4/1995 | Lemelson | |
| 5,412,190 A | 5/1995 | Josephson et al. | |
| 5,448,471 A | 9/1995 | Deaton et al. | |
| 5,457,747 A | 10/1995 | Drexler et al. | |
| 5,469,506 A | 11/1995 | Berson et al. | |
| 5,502,774 A | 3/1996 | Bellegarda et al. | |
| 5,506,691 A | 4/1996 | Bednar et al. | |
| 5,513,272 A | 4/1996 | Bogosian, Jr. | |
| 5,534,682 A | 7/1996 | Graef et al. | |
| 5,546,471 A | 8/1996 | Merjanian | |
| 5,546,523 A | 8/1996 | Gatto | 395/156 |
| 5,550,359 A | 8/1996 | Bennett | |
| 5,557,686 A | 9/1996 | Brown et al. | |
| 5,559,504 A | 9/1996 | Itsumi et al. | |
| 5,570,465 A | 10/1996 | Tsakanikas | |
| 5,581,630 A | 12/1996 | Bonneau, Jr. | |
| 5,592,377 A * | 1/1997 | Lipkin | 705/42 |
| 5,594,226 A | 1/1997 | Steger | |
| 5,594,806 A | 1/1997 | Colbert | |
| 5,600,114 A | 2/1997 | Dunlap et al. | |
| 5,602,933 A | 2/1997 | Blackwell et al. | |
| 5,604,802 A | 2/1997 | Holloway | |
| 5,610,382 A * | 3/1997 | Yamamoto | 235/379 |
| 5,613,012 A * | 3/1997 | Hoffman et al. | 235/380 |
| 5,615,277 A | 3/1997 | Hoffman | |
| 5,649,117 A | 7/1997 | Landry | |
| 5,650,604 A | 7/1997 | Marcous et al. | |
| 5,663,546 A | 9/1997 | Cucinotta et al. | |
| 5,703,344 A * | 12/1997 | Bezy et al. | 235/379 |
| 5,764,789 A * | 6/1998 | Pare et al. | 382/115 |
| 5,774,663 A | 6/1998 | Randle et al. | |
| 5,790,668 A | 8/1998 | Tomko | |
| 5,793,027 A | 8/1998 | Baik | |
| 5,802,199 A | 9/1998 | Pare, Jr. et al. | |
| 5,832,464 A | 11/1998 | Houvener et al. | |
| 5,875,236 A | 2/1999 | Jankowitz et al. | |
| 5,897,625 A | 4/1999 | Gustin et al. | |
| 5,940,811 A | 8/1999 | Norris | |
| 5,958,014 A | 9/1999 | Cave | |
| 5,966,699 A | 10/1999 | Zandi | |
| 5,984,366 A | 11/1999 | Priddy | |
| 5,987,232 A | 11/1999 | Tabuki | |
| 6,045,039 A * | 4/2000 | Stinson et al. | 235/379 |
| 6,059,185 A * | 5/2000 | Funk et al. | 235/375 |
| 6,061,666 A * | 5/2000 | Do et al. | 235/379 |
| 6,072,894 A | 6/2000 | Payne | |
| 6,081,792 A | 6/2000 | Cucinotta et al. | |
| 6,105,006 A | 8/2000 | Davis et al. | |
| 6,105,011 A * | 8/2000 | Morrison, Jr. | 382/137 |
| 6,119,931 A | 9/2000 | Novogrod | |
| 6,129,273 A * | 10/2000 | Shah | 235/375 |
| 6,131,810 A * | 10/2000 | Weiss et al. | 235/379 |
| 6,145,738 A * | 11/2000 | Stinson et al. | 235/379 |
| 6,149,055 A * | 11/2000 | Gatto | 235/379 |
| 6,149,056 A * | 11/2000 | Stinson et al. | 235/379 |
| 6,164,528 A | 12/2000 | Hills et al. | |
| 6,199,755 B1 * | 3/2001 | Matsumoto et al. | 235/379 |
| 6,205,233 B1 | 3/2001 | Morley et al. | |
| 6,286,756 B1 * | 9/2001 | Stinson et al. | 235/379 |
| 6,328,207 B1 * | 12/2001 | Gregoire et al. | 235/379 |

FOREIGN PATENT DOCUMENTS

| | | | |
|---|---|---|---|
| JP | 3-260763 | 11/1991 | |
| JP | 7-262291 | 10/1995 | |
| JP | 7-325359 | 12/1995 | |
| JP | 8-305927 | 11/1996 | |
| JP | 10031778 A * | 2/1998 | G06F/19/00 |
| WO | WO 98/15924 | 4/1998 | |
| WO | WO 98/35298 | 8/1998 | |
| WO | 00/46710 | 8/2000 | |

OTHER PUBLICATIONS

J.L. Griffin, "Cash Store Finds Blank in Joplin," Joplin Globe, p. 1E, Joplin, MO, Dec. 22, 1996.

Jeff McKinney, "The Price of Convenience," Cincinnati Globe, p. E1, Cincinnati, OH, Jul. 14, 1996.

Ruiz–Mezcua et al. "Biometrics verification in a real environment," IEEE, pp. 243–246, Madrid, Spain, 1999.

"Electronic Cash in a Global World," GRL Higgins, NatWest Development Team, National Westminster Bank PLC, p. 86, 1996.

Harry Katzan, Jr., "Distributed Information Systems", Petrocelli Books, 1979, pp. 101–112 and 157–167.

Jeff McKinney, "The Price of Convenience", Cincinnati Enquirer, Jul., 1996, p. E1.

"About Miros", http://www.MIROS.COM/About_Miros.htm., Wellesley, MA, downloaded Dec. 6, 1996, 1 page.

"Frequently Asked Questions", http://www.MIROS.COM/FAQ.htm, Wellesley, MA, downloaded Dec. 6, 1996, 3 pages.

"TrueFace Access System", http://www.MIROS.COM/access_system.htm, Wellesley, MA, downloaded Dec. 6, 1996, 1 page.

"Service Center", advertising brochure, Mr. Payroll Corporation, Ft. Worth, Texas, date unknown, 1 page.

"AT&T Document Processing ATM(DP–ATM)", AT&T Global Information Solutions Company, 1994, 4 pages.

"Check–Control", advertising brochure by BMC Associates, Woodbury, New Jersey, date unknown, 1 page.

Programmer's Manual for TrueFace™ Version 2, Miro, Inc., Wellesley, MA, 1995.

Woods, Bob, "CyberWatch Security with Face Recognition, " Newsbytes, Aug. 7, 1996, 1 page.

"TrueFace CyberWatch", advertising brochure, Miros, Inc., Wellesley, MA, date unknown, 2 pages.

"Let Your Face Be Your Key", http.//www.MIROS.COM/, Wellesley, MA, downloaded Dec. 6, 1996, 1 page.

"TrueFace Products", http://www.MIROS.COM/Products.html, Wellesley, MA, downloaded Dec. 6, 1996, 1 page.

"TrueFace in the News", http://www.MIROS.COM/In_the_news.html, Wellesley, MA, downloaded Dec. 6, 1996, 2 pages.

Judge, Paul, "A Gatekeeper That Takes You at Face Value", http://www.businessweek.com/1996/36/b3491101.html, Nov. 25, 1996, 1 page.

"Facing a new era of data security", http://www.pcweek.com/archive/1334/pcwk0051.html, downloaded Dec. 6, 1996, 1 page.

"A Neural Net that Knows Faces", http://www.byte.com/art/9502/sec10/art4.html, Feb. 1995, 1 page.

"Face Recognition for Securing Data", http://www.MIROS.COM/CyberWatch.html, Wellesley, MA, downloaded Dec. 6, 1996, 1 page.

"Customizing TrueFace", http://www.MIROS.COM/TrueFace_engine.html, Wellesley, MA, downloaded Dec. 6, 1996, 2 pages.

"The Ultimate in Personal ID", http://www.MIROS.COM/Face_apps.html., Wellesley, MA, downloaded Dec. 6, 1996, 3 pages.

* cited by examiner

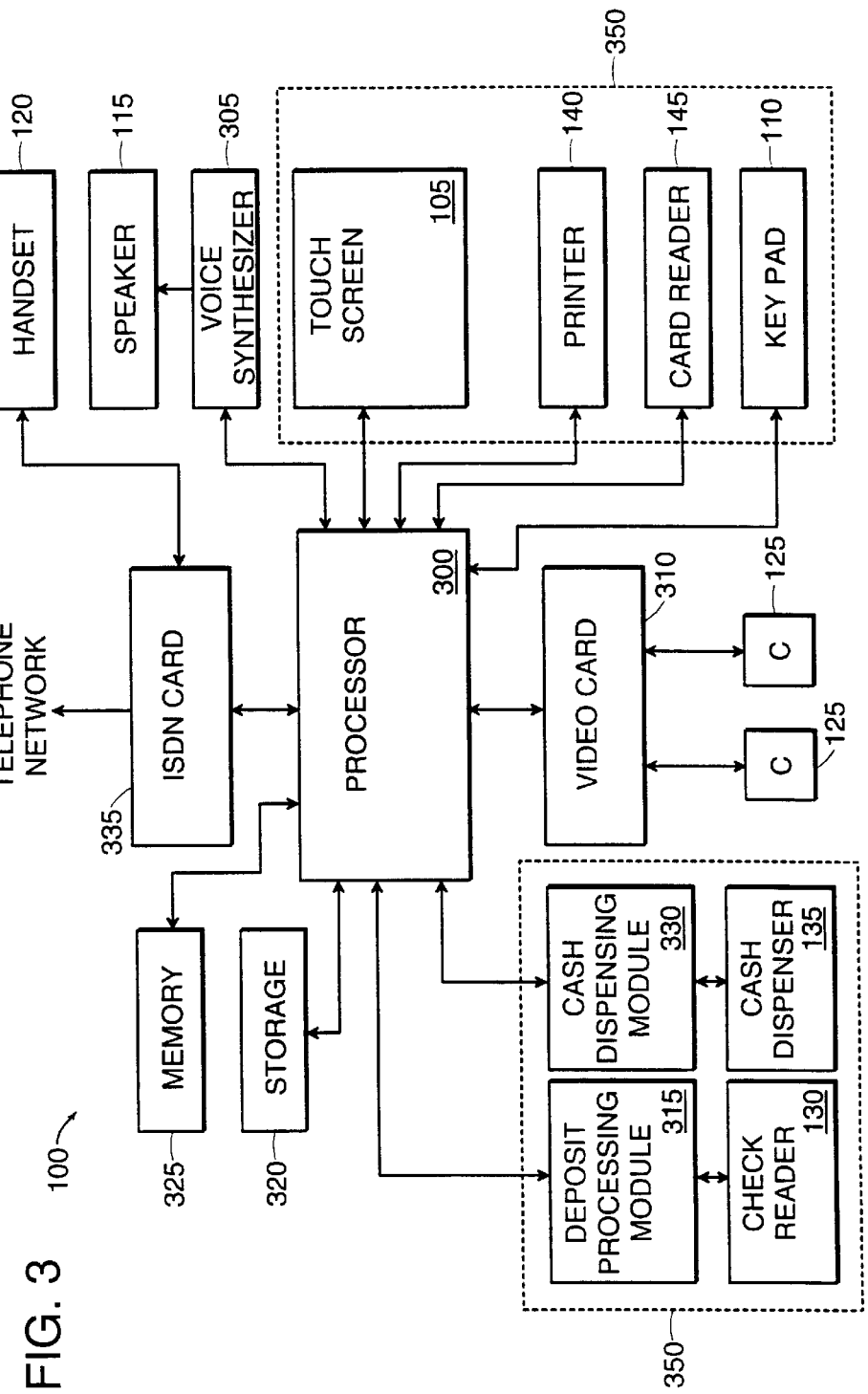

| CRITERIA | VALUE |
|---|---|
| AMOUNT OF CHECK | IF ONE OF THE FIRST 4 CHECKS CASHED FOR THE PAYEE CAN'T BE MORE THAN 15% OF ANY OF THE PREVIOUS CHECKS |
| AMOUNT OF CHECK | IF AFTER THE 4 CHECK FOR THE PAYEE CAN'T BE MORE THAN 25% OF ANY OF THE PREVIOUS CHECKS |
| AMOUNT OF CHECK | IF CHECK EXCEEDS SET LIMITS |
| CHECK ENDORSEMENT | IF CHECK ENDORSEMENT IS NOT FOUND |
| CAV COMPARISON | IF AMOUNT READ BY OCR MODULE DIFFERS FROM AMOUNT ENTERED BY CUSTOMER, SEND TO CSC |
| PAYOR | IF NEW PAYOR |
| PAYOR | STATUS OF VERIFY |
| PAYOR LAST TRANSACTION DATE | IF OVER 33 DAYS SINCE LAST TRANSACTION |
| PAYOR | IF FILE IS TAGGED TO ALWAYS GO TO CENTRAL |
| PAYEE | IF NEW PAYEE |
| PAYEE | STATUS OF VERIFY |
| PAYEE'S LAST TRANSACTION DATE | IF ONE OF THE FIRST 4 CHECKS FOR THE PAYEE CASHED CAN'T BE LESS THAN 6 OR GREATER THAN 18 DAYS |
| PAYEE | FIRST 2 TRANSACTIONS ON PAYOR PROBATIONARY PERIOD |
| PAYEE'S LAST TRANSACTION DATE | IF AFTER THE 4 CHECKS FOR THE PAYEE CAN'T BE LESS THAN 6 OR GREATER THAN 63 DAYS |
| PAYEE'S BIOMETRIC IMAGE | DOES NOT MATCH |
| MICR | MICR DOES NOT READ PROPERLY |
| ATM | CASH MACHINE HAS INSUFFICIENT FUNDS FOR CURRENT TRANSACTION |
| CHECK NUMBER | DUPLICATE CHECK NUMBER |
| POS LAST COMMUNICATION DATE | POS LAST COMMUNICATION DATE WITH CSC IS GREATER THAN 7 DAYS |

FIG. 9

□ CENTRAL SERVICES CENTER                   _ □ ×

1100

| PAYOR INFORMATION | PAYOR/PAYEE INFORMATION | ON FILE | FROM POS | PAYEE INFORMATION |
|---|---|---|---|---|
| NAME | AVG. CHECK AMT. | | | LAST NAME |
| START DATE | AVG. CHECKS CASHED PER WEEK | | | FIRST NAME |
| LAST TRANS DATE | # CHECKS CASHED | | | START DATE |
| # OF RETURNED CHECKS | | | | LAST TRANS DATE |
| | | | | # OF RETURNED CHECKS |

F5 TO VIEW ADDITIONAL PAYEES FOR THIS CHECK

TRANSACTION INFORMATION   STORE: ID    SS#

DOB    ACCT#    CHECK#    AMOUNT    FEE%    FEE    PAYBACK

BACK:          FRONT:

CHOOSE PAYOR MAINTENANCE BUTTON, EDIT OR ENROLL PAYOR, OR VIEW EXISTING PAYOR INFORMATION

OPTIONAL ACTIONS:
[PAYOR MAINTENANCE] [PAYEE MAINTENANCE] [PAYOR HISTORY]
[SS# SEARCH] [PAYEE HISTORY] [RETAKE PICTURE]
[TRANSACTION MAINT.] [ACCEPT] [REJECT]
[CALL CUSTOMER]

MANDATORY ACTIONS:
[PAYOR MAINTENANCE] [PAYEE MAINTENANCE] [SS# SEARCH]
[VERIFY FUNDS] [CALL MAKER] [SUPERVISOR APPROVAL]
[CHECK ID] [VERIFY CHECK] [CHECK ENDORSEMENT]
[CALL CUSTOMER]

[REF1] [REF2] [REF3] [REF4] [REF5] [REF6] [REF7] [REF8] [REF9] [REF10] [REF11] [REF12] [REF13] [REF14] [REF15]
[REF16] [REF17] [REF18] [REF19]

FIG. 10

```
PAYEE MAINTENANCE
┌─────────────────────────────────────────────────────────────┐
 SS#: [      ]    STATUS: [ ▼]  [ADD ANOTHER PAYEE]  [CLOSE]
 LASTNAME: [      ]
 FIRSTNAME [      ]
 MIDDLENAME: [    ]
 PHONE: [      ]
 ADDR1: [                              ]
 ADDR2: [                              ]
 CITY: [       ]   ST: [   ]   ZIP: [       ]
 DOB: [        ]
 SEX: [  ]
 NOTES: [                              ]
        [                              ]

STARTDATE: [        ]
 LAST UPDATE DATE: [       ]
 LAST UPDATE TIME: [       ]
```

FIG. 11C

```
PAYOR MAINTENANCE
RT#: [    ]   ACCT#: [    ]                    CLOSE
FEDERAL ID#: [         ]  STATUS: [  ▼]
NAME:    [      ]
ADDR1:   [                        ]
ADDR2:   [                        ]
CITY:    [      ]  ST: [  ]   ZIP: [    ]
PHONE:   [      ]
CHECKTYPE: [  ]
STARTDATE: [     ]
NOTES:   [                        ]
         [                        ]

LAST UPDATE DATE: [    ]
LAST UPDATE TIME: [    ]
```

FIG. 11D

```
SUPERVISOR APPROVAL
PLEASE ENTER SUPERVISOR CODE:
        [      ]
     [ OK ]  [ CANCEL ]
```

FIG. 11E

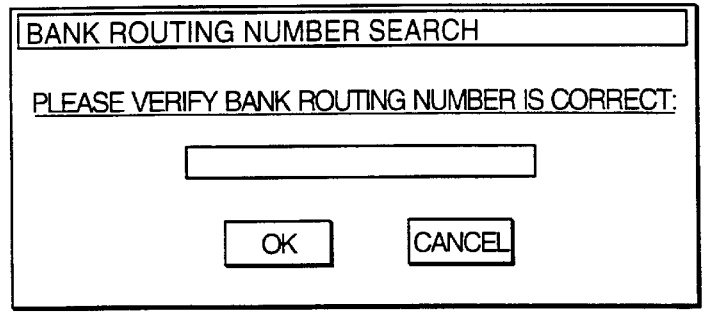
FIG. 11I
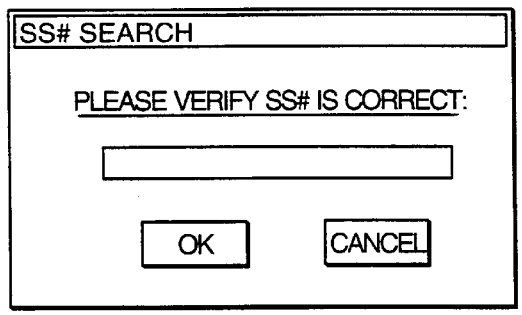
FIG. 11J
| BANK INFORMATION | | | | | CLOSE |
|---|---|---|---|---|---|
| BANK INFORMATION | | | | | |
| RT: 000000518 | | BANK PHONE: (202)874-8400 | | EXT: | |
| BANK NAME: | UNITED STATES TREASURER | | | | |
| BANK ADDRESS: | 401 14TH ST SW | | | | |
| CITY: WASHINGTON | | ST: DC | | ZIP: 20227- | |
FIG. 11K

| ☐ TRANSACTION MAINTENANCE | | | ▭▯⊠ |
|---|---|---|---|
| | | | CLOSE |
| | TRANSACTION MAINTENANCE | | |
| STORE_ID: | | | |
| RT#: | ACCT#: | | CHECK#: |
| AMOUNT: | SS#: | | |
| FEE%: | | | |
| FEE: | | | |
| PAYBACK: | | | |

FIG. 11L

ACTION MAINTENANCE

SAVE  CLOSE

ACTION MAINTENANCE

ACTION NUMBER: 01

DESCRIPTION: PAYOR MAINTENANCE

FIG. 11M

SS# SEARCH RESULTS

SOCIAL SECURITY SEARCH RESULTS — NEW SEARCH

NAME: ____  DOB: ____  CLOSE
STREET ADDR: ____  DATE ADDR UPDATED: ____
CITY: ____  ST: ____  ZIP: ____  PHONE NUMBER: ____
SECOND STREET ADDR: ____  DATE ADDR UPDATED: ____
SECOND CITY: ____  SECOND ST: ____  SECOND ZIP: ____
THIRD STREET ADDR: ____  DATE ADDR UPDATED: ____
THIRD CITY: ____  THIRD ST: ____  THIRD ZIP: ____

REFERRAL MAINTENANCE

SAVE  CLOSE

REFERRAL MAINTENANCE

REFERRAL NUMBER: 01

DESCRIPTION:

NEW PAYOR

ACTION NUMBER: 01

STATUS: M

FIG. 11N

REFERRAL 05 - PAYOR LAST TRANSACTION DATE IS MORE THAN 33 DAYS

REFERRAL 07 - PAYEE'S LAST CHECK IS LESS THAN 6
OR MORE THAN 18 DAYS FROM CURRENT TRANSACTION
FOR GIVEN PAYOR (1ST 5 CHECKS ONLY)

REFERRAL 08 - PAYEE'S LAST CHECK IS LESS THAN 6 OR MORE THAN 63 DAYS FROM CURRENT TRANSACTION FOR GIVEN PAYOR

REFERRAL 09 - PAYEE'S BIOMETRICS IMAGE DOES
NOT MATCH FOR EXISTING CUSTOMER

REFERRAL 11 - LARGE CHECK AMOUNT IN EXCESS 15%

REFERRAL 12 - LARGE CHECK AMOUNT IN EXCESS OF 25%

REFERRAL 13 - CHECK EXCEEDS SET LIMITS

REFERRAL 14 - OCR AMOUNT READ DIFFERS
FROM CUSTOMER INPUT

REFERRAL 15 - MICR LINE DID NOT READ PROPERLY

REFERRAL 16 - CHECK ENDORSEMENT NOT FOUND

REFERRAL 18 - DUPLICATE CHECK NUMBER

REFERRAL 19 - POS LAST COMMUNICATION DATE
WITH CSC IS GREATER THAN 7 DAYS

ACTION 11 - VERIFY CHECK

ACTION 12 - VERIFY ENDORSEMENT

SHARED TABLES

| TABLE | FIELD | TYPE | LEN | KEY | SECONDARY INDEXES |
|---|---|---|---|---|---|
| CHTYPE | CHECKTYPE | ALPHA | 1 | * | |
| | FEE% | NUMERIC | 4.2 | | |
| | DESC | ALPHA | 30 | | |
| | LIMIT | NUMERIC | 9.2 | | |
| MINFEE | MAX | NUMERIC | 7.2 | * | |
| | FEE | NUMERIC | 7.2 | | |
| PAYEE | SS# | ALPHA | 9 | * | FULLNAME(LASTNAME+FIRSTNAME |
| | STATUS | ALPHA | 1 | | |
| | LASTNAME | ALPHA | 15 | | LASTNAME(FIRSTNAME |
| | FIRSTNAME | ALPHA | 15 | | LNAMEDOB(LASTNAME+DOB |
| | MIDDLENAME | ALPHA | 15 | | LFMNAMEDOB(LASTNAME+FIRSTNAME |
| | PHONE | ALPHA | 20 | | |
| | ADDR1 | ALPHA | 30 | | |
| | ADDR2 | ALPHA | 30 | | |
| | CITY | ALPHA | 15 | | |
| | ST | ALPHA | 2 | | |
| | ZIP | ALPHA | 10 | | |
| | DOB | DATE | | | |
| | SEX | ALPHA | 1 | | |
| | LASTUPDATEDATE | DATE | | | |
| | LASTUPDATETIME | TIME | | | |
| | STARTDATE | DATE | | | |
| PAYEEID | SS# | ALPHA | 9 | * | ID# (ID#) |
| | ID# | ALPHA | 15 | * | |
| | IDTYPE | ALPHA | 3 | | |
| | IDST | ALPHA | 2 | | |

FIG. 15A

| PAYOR | RT# | ALPHA | 9 | | NAME (NAME) |
|---|---|---|---|---|---|
| | ACCT# | ALPHA | 20 | * | RT_ACCT (RT# +ACCT#) |
| | STATUS | ALPHA | 3 | * | |
| | FEDID# | ALPHA | 20 | | CITY (CITY) |
| | NAME | ALPHA | 30 | | ACCT# (ACCT#) |
| | ADDR1 | ALPHA | 30 | | RT# (RT#) |
| | ADDR2 | ALPHA | 30 | | |
| | CITY | ALPHA | 20 | | |
| | ST | ALPHA | 2 | | |
| | ZIP | ALPHA | 10 | | |
| | PHONE | ALPHA | 12 | | |
| | LASTUPDATEDATE | DATE | | | |
| | LASTUPDATETIME | TIME | | | |
| | STARTDATE | DATE | | | |
| | CHECKTYPE | ALPHA | 1 | | |
| OPERATOR | OPERATORID | ALPHA | 10 | * | NAME (NAME) |
| | PASSWORD | ALPHA | 10 | | |
| | NAME | ALPHA | 25 | | |
| | SECLEV | NUMERIC | 2 | | |
| | LANGUAGE | ALPHA | 1 | | |

FIG. 15B

NON SHARED
TABLES

| TABLE | FIELD | TYPE | LEN | KEY | SECONDARY INDEXES |
|---|---|---|---|---|---|
| CHECKAUD | STORE_ID | ALPHA | 10 | * | |
| | TRANS# | NUMERIC | 10 | * | |
| | SSN | ALPHA | 9 | * | SSN |
| | RT# | ALPHA | 9 | | RAC(RT# +ACCT#) |
| | ACCT# | ALPHA | 20 | | PCRECDATE(DESCENDING) |
| | CHECK# | ALPHA | 30 | | |
| | CHECKSCAN | ALPHA | 80 | | |
| | AMOUNT | NUMERIC | 10.2 | | |
| | FEE | NUMERIC | 10.2 | | |
| | LANGUAGE | NUMERIC | 1 | | |
| | OPERATORID | ALPHA | 10 | | |
| | RETURNED | ALPHA | 1 | | |
| | MRPR DISP | NUMERIC | 2 | | |
| | CUSTOMER DISP | NUMERIC | 2 | | |
| | HARDWARE DISP | NUMERIC | 2 | | |
| | PCRECDATE | DATE | | | |
| | PCRECTIME | TIME | | | |
| | CSCCORERECDATE | DATE | | | |
| | CSCCORERECTIME | TIME | | | |
| | OPERRECDATE | DATE | | | |
| | OPERRECTIME | TIME | | | |
| | OPERCMPDATE | DATE | | | |
| | OPERCMPTIME | TIME | | | |
| | ATMCOMPDATE | DATE | | | |
| | ATMCOMPTIME | TIME | | | |

| CHECK | SUPERVISOR | ALPHA | 10 | |
|---|---|---|---|---|
| | STOREID | ALPHA | 10 | * |
| | TRANS# | NUMERIC | 8 | * |
| | SSN | ALPHA | 9 | * |
| | RT# | ALPHA | 9 | RAC (RT# + ACCT#) |
| | ACCT# | ALPHA | 20 | |
| | CHECK# | ALPHA | 30 | PCRECDATE(DESCENDING) SSN |
| | CHECKSCAN | ALPHA | 80 | |
| | AMOUNT | NUMERIC | 10.2 | |
| | FEE | NUMERIC | 10.2 | |
| | LANGUAGE | NUMERIC | 1 | |
| | OPERATORID | ALPHA | 10 | OPERATORID |
| | RETURNED | ALPHA | 1 | |
| | MRPR DISP | NUMERIC | 2 | |
| | CUSTOMER DISP | NUMERIC | 2 | |
| | HARDWARE DISP | NUMERIC | 2 | |
| | PCRECDATE | DATE | | |
| | PCRECTIME | TIME | | |
| | CSCCORERECDATE | DATE | | |
| | CSCCORERECTIME | TIME | | |
| | OPERRECDATE | DATE | | |
| | OPERRECTIME | TIME | | |
| | OPERCMPDATE | DATE | | |
| | OPERCMPTIME | TIME | | |

|              | ATMCOMPDATE    | DATE    |     |   |
|--------------|----------------|---------|-----|---|
|              | ATMCOMPTIME    | TIME    |     |   |
|              | SUPERVISOR     | ALPHA   | 10  |   |
| POSINFO      | STORE_ID       | ALPHA   | 10  | * |
|              | BDEN1          | NUMERIC | 4   |   |
|              | BDEN2          | NUMERIC | 4   |   |
|              | BDEN3          | NUMERIC | 4   |   |
|              | BDEN4          | NUMERIC | 4   |   |
|              | CDEN1          | NUMERIC | 3.2 |   |
|              | CDEN2          | NUMERIC | 3.2 |   |
|              | CDEN3          | NUMERIC | 3.2 |   |
|              | CDEN4          | NUMERIC | 3.2 |   |
|              | LASTCOMMPOSDATE| DATE    |     |   |
|              | LASTCOMMPOSTIME| TIME    |     |   |
|              | POSDATAPHONE   | ALPHA   | 10  |   |
|              | POSVOICEPHONE  | ALPHA   | 10  |   |
|              | FIRSTNSFGRACE  | NUMERIC | 2   |   |
| CHKREJRSN    | STORE_ID       | ALPHA   | 10  | * |
|              | TRANS#         | NUMERIC | 10  | * |
|              | RSNCODE        | ALPHA   | 2   |   |
| REJRSN       | RSNCODE        | ALPHA   | 2   | * |
|              | RSNDESC        | ALPHA   | 130 |   |
| CHKREFRL     | STOREID        | ALPHA   | 10  | * |
|              | TRANS#         | NUMERIC | 10  | * |
|              | REFNUM         | ALPHA   | 2   |   |

FIG. 15E

| | | | | |
|---|---|---|---|---|
| PRYNOTES | RT# | ALPHA | 9 | * |
| | ACCT# | ALPHA | 20 | * |
| | NOTES | ALPHA | 600 | |
| PYENOTES | SSN | ALPHA | 9 | * |
| | NOTES | ALPHA | 600 | |
| CHKRTN | STOREID | ALPHA | 10 | * |
| | TRANS# | NUMERIC | 10 | * |
| | SSN | ALPHA | 9 | * |
| | RTNDATE | DATE | | |
| | RTNREASON | ALPHA | 130 | |
| POSSITES | STOREID | ALPHA | 10 | * |
| | ADDR1 | ALPHA | 30 | |
| | ADDR2 | ALPHA | 30 | |
| | CITY | ALPHA | 20 | |
| | STATE | ALPHA | 2 | |
| SSRSLTS | SSNUM | ALPHA | 9 | * |
| | SEQ# | NUMERIC | 2 | * |
| | FIRSTNAME | ALPHA | 20 | |
| | MIDDLENAME | ALPHA | 20 | |
| | LASTNAME | ALPHA | 20 | |
| | HOUSENUM | ALPHA | 10 | |
| | STREETNAME | ALPHA | 20 | |
| | STREETTYPE | ALPHA | 10 | |
| | APARTNUM | ALPHA | 10 | |

FIG. 15F

| | | |
|---|---|---|
| CITY | ALPHA | 20 |
| STATE | ALPHA | 2 |
| ZIP | ALPHA | 9 |
| PHONENUM | ALPHA | 10 |
| DOB | ALPHA | 8 |
| DATEADDR | DATE | |
| SECHOUSENUM | ALPHA | 6 |
| SECSTNAME | ALPHA | 19 |
| SECSTTYPE | ALPHA | 2 |
| SECAPARTNUM | A | 5 |
| SECCITY | A | 16 |
| SECSTATE | A | 2 |
| SECZIP | A | 9 |
| DATEADDR2 | DATE | |
| THRDHOUSENUM | A | 6 |
| THRDSTNAME | A | 19 |
| THRDSTTYPE | A | 2 |
| THRDAPARTNUM | A | 5 |
| THRDCITY | A | 16 |
| THRDSTATE | A | 2 |
| THRDZIP | A | 9 |
| DATEADDR3 | DATE | |

FIG. 15G

| | | | |
|---|---|---|---|
| INPUTQUERY | IDENTIFIER | ALPHA | 2 |
| | TYPE | ALPHA | 3 |
| | LASTNAME | ALPHA | 20 |
| | MIDDLENAME | ALPHA | 10 |
| | FIRSTNAME | ALPHA | 10 |
| | FIRSTNAMETYPE | ALPHA | 1 |
| | STREETNUM | ALPHA | 7 |
| | PREDIR | ALPHA | 2 |
| | NAME | ALPHA | 19 |
| | TYPE | ALPHA | 2 |
| | APARTNUM | ALPHA | 5 |
| | UNUSED | ALPHA | 4 |
| | CITY | ALPHA | 15 |
| | STATE | ALPHA | 2 |
| | ZIP | ALPHA | 9 |
| | PHONE | ALPHA | 10 |
| | TIESFLAG | ALPHA | 1 |
| | SCROLLKEY | ALPHA | 6 |
| | CUSTACCT | ALPHA | 18 |
| | NAMEPARSEFLG | ALPHA | 1 |
| | SSNUM | ALPHA | 9 |
| | DRIVERSNUM | ALPHA | 27 |
| | DRIVERSTATE | ALPHA | 2 |

FIG. 15H

|          |               |       |     |   |        |
|----------|---------------|-------|-----|---|--------|
|          | STREETPARSEFLG | ALPHA | 1   |   |        |
|          | DOB           | ALPHA | 8   |   |        |
|          | EMPSEGCOUNT   | ALPHA | 1   |   |        |
|          | PROPSEGCOUNT  | ALPHA | 1   |   |        |
|          | MISCSEGCOUNT  | ALPHA | 1   |   |        |
|          | RESERVED      | ALPHA | 52  |   |        |
| BANKINFO | ITUPDATE      | ALPHA | 6   |   |        |
|          | INSTTYPE      | ALPHA | 2   |   |        |
|          | RTMICR        | ALPHA | 9   | * | RTMICR |
|          | INSTNAME      | ALPHA | 50  |   |        |
|          | STADDR        | ALPHA | 40  |   |        |
|          | CITY          | ALPHA | 30  |   |        |
|          | STABBR        | ALPHA | 2   |   |        |
|          | ZIPCODE       | ALPHA | 5   |   |        |
|          | ZIP4          | ALPHA | 4   |   |        |
|          | AREACODE      | ALPHA | 3   |   |        |
|          | PHONENUM      | ALPHA | 7   |   |        |
|          | PHONEEXT      | ALPHA | 5   |   |        |
|          | Fedresrv      | ALPHA | 6   |   |        |
| ACTIONS  | ACTIONNUM     | ALPHA | 2   | * |        |
|          | DESCRIPTION   | ALPHA | 130 |   |        |
|          | HELPTEXT      | ALPHA | 130 |   |        |

FIG. 15I

| | | | | | |
|---|---|---|---|---|---|
| REFERRALS | REFNUM | ALPHA | 2 | * | |
| | DESCRIPTION | ALPHA | 120 | | |
| | ACTIONNUM | ALPHA | 2 | * | |
| | STATUS | ALPHA | 1 | | |
| PYETMPL | SSN | ALPHA | 9 | * | |
| | | | | | TMPL |
| | TMPL | BLOB | | | SSN |
| PYETRANSPIC | TRANS# | NUMERIC | 10 | * | |
| | BMPFILENAME | | | | |
| PYEPIC | SSN | ALPHA | 9 | * | |
| | BMPFILENAME | | | | |
| ATMINVBILLS | STOREID | ALPHA | 10 | * | |
| | DATE | DATE | | * | |
| | TIME | TIME | | * | |
| | CNT_BILLS_1 | NUMERIC | 4.0 | | |
| | CNT_BILLS_2 | NUMERIC | 4.0 | | |
| | CNT_BILLS_3 | NUMERIC | 4.0 | | |
| | CNT_BILLS_4 | NUMERIC | 4.0 | | |
| | CNT_BILLS_1_REJ | NUMERIC | 4.0 | | |
| | CNT_BILLS_2_REJ | NUMERIC | 4.0 | | |
| | CNT_BILLS_3_REJ | NUMERIC | 4.0 | | |
| | CNT_BILLS_4_REJ | NUMERIC | 4.0 | | |

FIG. 15J

|  |  |  |  |  |
|---|---|---|---|---|
| | CNT_BILLS_1_STS | ALPHA | 1.0 | |
| | CNT_BILLS_2_STS | ALPHA | 1.0 | |
| | CNT_BILLS_3_STS | ALPHA | 1.0 | |
| | CNT_BILLS_4_STS | ALPHA | 1.0 | |
| ATMINVCOINS | STOREID | ALPHA | 10 | * |
| | DATE | DATE | | * |
| | TIME | TIME | | * |
| | CNT_COINS_1 | NUMERIC | 4.0 | |
| | CNT_COINS_2 | NUMERIC | 4.0 | |
| | CNT_COINS_3 | NUMERIC | 4.0 | |
| | CNT_COINS_4 | NUMERIC | 4.0 | |
| | CNT_COINS_1_STS | ALPHA | 1.0 | |
| | CNT_COINS_2_STS | ALPHA | 1.0 | |
| | CNT_COINS_3_STS | ALPHA | 1.0 | |
| | CNT_COINS_4_STS | ALPHA | 1.0 | |
| ATMERRORLOG | STOREID | ALPHA | 10 | * |
| (UNSOLICITED) | DATE | DATE | | * |
| | TIME | TIME | | * |
| | MSGTYPE | ALPHA | 6 | |
| | MESSAGE | ALPHA | 100 | |
| PRNTCHK | TRANS# | NUMERIC | 10 | * |
| | BMPFILENAME | | | |

FIG. 15K

| | | | | |
|---|---|---|---|---|
| BAKCHK | TRANS# | NUMERIC | 10 | * |
| | BMPFILENAME | | | |

FIG. 15L

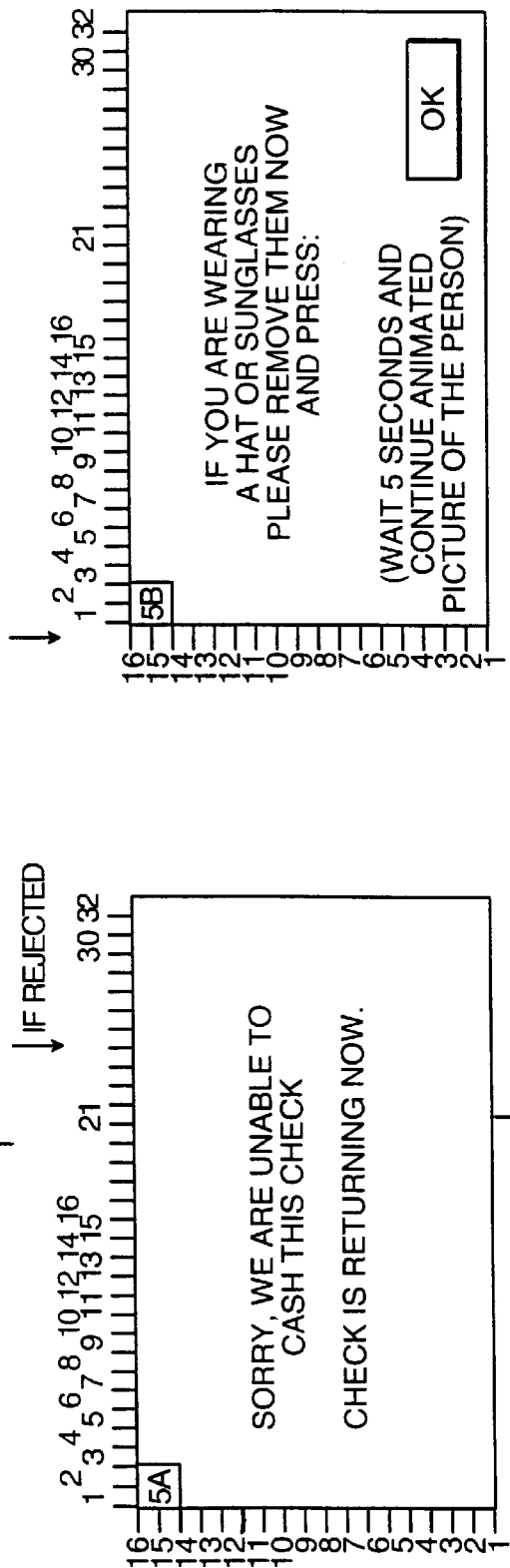
FIG. 16C

METHOD AND APPARATUS FOR AUTOMATIC CHECK CASHING

CROSS REFERENCE TO RELATED APPLICATIONS

This application is a continuation of U.S. patent application Ser. No. 08/854,321, entitled, "Check Cashing", filed on May 12, 1997 now U.S. Pat. No. 6,145,738, which is incorporated by reference herein, and which claims priority from U.S. Provisional Application No. 60/036,923, entitled "CHECK CASHING" and filed Feb. 6, 1997, which is incorporated by reference herein.

BACKGROUND

The invention relates to check cashing.

At present, a substantial portion of the working population does not have a bank account and, for this reason, lacks access to a bank for purposes of cashing paychecks. A number of companies provide check cashing services to this portion of the population.

In some instances, check cashing services are provided from a bullet-proof enclosure. An employee within the enclosure determines whether to cash a customer's paycheck by referencing a computer database that includes information about the customer ("the payee") and the customer's employer ("the payor"). The employee also may contact the payor's bank in some circumstances. If the employee decides to cash the paycheck, the employee collects an appropriate amount of cash from a cash drawer within the enclosure and provides the cash to the customer.

In other instances, check cashing services are provided by an employee using a computer that is connected to a cash-dispensing machine. The employee determines whether to cash the customer's paycheck in the manner described above. If the employee decides to cash the check, the employee uses the computer to cause the cash-dispensing machine to dispense an appropriate amount of cash. The employee then provides the cash to the customer. Security provided by the cash-dispensing machine reduces the risk of theft and permits elimination of the bullet-proof enclosure.

SUMMARY

The invention provides automated check cashing through unmanned check-cashing units. Automation of the check-cashing process promises to provide tremendous cost advantages, because an employee no longer will be needed to operate each check-cashing unit. Automation of the check-cashing process also promises to increase the level of privacy associated with the check-cashing transaction. For example, there no longer will be any need for an employee to count out the amount of cash provided to the customer while others, such as people waiting in line behind the customer, can overhear the amount.

In one aspect, generally, the invention features an automated check-cashing apparatus that includes an input device configured to generate input signals in response to inputs from a customer presenting a check to be processed, a storage device including a database of customer information, a check reader configured to receive and read the check to be processed, a cash dispenser, and an electronic processor connected to the input device, the storage device, the check reader, and the cash dispenser. The processor is configured to receive the input signals from the input device, receive information about the check to be processed from the check reader, access the database of customer information to obtain data about the customer, and determine automatically whether to accept or reject the check based on the input signals, the received information about the check, and the data about the customer. Upon accepting the check, the processor signal the cash dispenser to dispense cash to the customer.

Embodiments of the invention may include one or more of the following features. The processor may be configured to confirm the identity of the customer based on biometric information about the customer. For example, the biometric information may be an image of the customer's face, and the apparatus may include a camera configured to obtain the image of the customer's face. The database of customer information stored on the storage device may include images of customers' faces, and the processor may compare an image of the customer's face from the database of customer information to the image of the customer's face produced by the camera to confirm the identity of the customer. The processor may obtain the image of the customer's face from the database of customer information based on input signals generated by the input device in response to information supplied by the customer. The camera may be a digital video camera. The apparatus may include a second camera that obtains a second image of the customer's face, and the processor may compare the two images when confirming the identity of the customer. The apparatus also may include lights positioned to illuminate the customer's face to improve an image obtained by the camera. The biometric information also may be the customer's fingerprint.

After confirming the identity of the customer, the processor may determine automatically whether to accept or reject the check by applying a set of business rules. The business rules may be defined generally to permit the processor to accept the check if the customer has used the apparatus previously to cash a previous check for a similar amount from a payor associated with the check.

The processor may access the database of customer information using an input signal generated by the input device in response to identification information, such as an identification number, supplied by the customer using the input device. Alternatively, the processor may access the database of customer information using identification information, such as the customer's name, provided by the check reader.

The processor may accept the check when the database of customer information includes a record for the customer and criteria stored in the record for the customer are met. When the storage device also includes a database of payor information, the processor may accept the check when the database of customer information includes a record for the customer, criteria stored in the record for the customer are met, the database of payor information includes a record for a payor of the check, and criteria stored in the record for the payor are met. The processor may reject the check when a criterion stored in the record for the customer is not met, or a criterion stored in the record for the payor is not met.

The apparatus may include an automated teller machine that itself includes the input device, the check reader, and the cash dispenser. The automated teller machine also may include a card reader, and the apparatus may be configured to perform banking transactions associated with an account identified by a card inserted into the card reader.

The apparatus may include an output device for providing information to the customer. For example, the input device and the output device may be provided by a touch screen display. The output device may be a speaker, and the apparatus may include a voice synthesizer connected to the speaker and configured to provide spoken information to the customer through the speaker. The input device may be a numeric keypad.

The apparatus may be included in a check-cashing system that also includes a remotely-located service center. For example, several check-cashing apparatuses may be located in convenience stores or other locations, and may be served by a single service center located in a central location. The check-cashing apparatus may include a communications device connected to the processor, and the service center may include a communications device configured to communicate with the communications device of the check-cashing apparatus using, for example, a public telephone network.

The processor of the check-cashing apparatus may be configured to contact the remotely-located service center for assistance when the database of customer information does not include a record for the customer presenting a check, or the database of payor information does not include a record for the payor of the check. The processor also may contact the service center for assistance when the processor is unable to confirm the identity of the customer.

The service center may include a storage device including a central database of customer information and an electronic processor connected to the communications device and the storage device. The processor may be configured to receive information about a customer and a check from the communications device, access the central database of customer information to obtain data about the customer, determine automatically whether to accept or reject the check based on the received information and the data about the customer, and control the communications device to transmit an indication of whether the check should be accepted or rejected.

The processor of the service center may be configured to accept the check when the central database of customer information includes a record for the customer and criteria stored in the record for the customer are met, and to contact a human operator at the service center for assistance when the central database of customer information does not include a record for the customer. The processor of the service center may be configured to reject the check when a criterion stored in the record for the customer is not met. The processor of the service center may control the communications device to transmit information for use in updating the database of customer information at the check-cashing apparatus after contacting the human operator for assistance. The database of customer information stored on the storage device of the check-cashing apparatus may include only a partial subset of the customer information of the central database of customer information.

The service center may include a display device for use by a human operator, and the processor of the service center may be configured to automatically accept a check when the check meets a set of acceptance criteria, automatically reject the check when the check meets a set of rejection criteria, and display information about the check on the display device when the check meets a set of intervention criteria, to permit the human operator to accept or reject the check. The information displayed about the check may include an intervention criterion met by the check.

When the check-cashing apparatus includes an automated teller machine, the check-cashing apparatus may be configured to perform banking transactions associated with an account identified by a card inserted into the card reader, and the communications device of the check-cashing apparatus may be configured to transmit information about checks and information about the banking transactions to the service center. The service center may be configured to distinguish between information about checks and information about banking transactions. For example, the service center may be configured to process information about checks and to forward information about banking transactions to a banking network provider.

In another aspect, generally, the invention features a check-cashing system that includes a first check-cashing unit, a second check-cashing unit, and a service center remotely located from the check-cashing units and including a communications device. Each check-cashing unit includes a storage device including a database of customer information, a check reader configured to receive and read a check to be processed, a cash dispenser, a communications device configured to communicate with the communications device of the service center, and an electronic processor connected to the storage device, the check reader, the cash dispenser, and the communications device. The electronic processor is configured to receive information about a check to be processed from the check reader, access the database of customer information to obtain data about a customer presenting the check to be processed, determine automatically whether to accept or reject the check to be processed based on the received information about the check and the data about the customer, and, upon accepting the check, signal the cash dispenser to dispense cash to the customer presenting the check. Embodiments of this aspect of the invention may include one or more of the features described above.

In another aspect, generally, the invention features a service center for a check-cashing system. The service center includes a communications device configured to receive from a remotely-located cash-checking unit information about a check and a customer presenting the check, a storage device including a central database of customer information, and an electronic processor connected to the communications device and the storage device. The electronic processor is configured to receive information about a customer and a check from the communications device, access the central database of customer information to obtain data about the customer, determine automatically whether to accept or reject the check based on the received information and the data about the customer, and control the communications device to transmit to the check-cashing unit an indication of whether the check should be accepted or rejected. Embodiments of this aspect of the invention may include one or more of the features described above.

In yet another aspect, generally, the invention features a method of processing a check. The method includes receiving information about a check to be processed from a check reader, accessing a database of customer information to obtain data about a customer presenting the check, determining whether to accept or reject the check based on the received information about the check and the data about the customer, and upon accepting the check, signaling a cash dispenser to dispense cash to the customer presenting the check. Embodiments of this aspect of the invention may include one or more of the features described above.

A check-cashing unit produces an image of the front and back of the customer's check and analyzes the image to extract information about the check and to verify the authenticity and amount of the check. The check-cashing unit also verifies the customer's identity using biometric information such as an image of the customer's face (known as facial biometrics). Use of biometric information permits customers to perform transactions without providing a membership card or other form of identification.

After verifying the customer's identity, the check-cashing unit applies a set of business rules to determine whether the check cashing unit is authorized to automatically cash the check. In general, the business rules will permit the check-cashing unit to cash the check if the customer has used the check-cashing unit previously to cash a check from the same payor for a similar amount.

If the check-cashing unit is not authorized to automatically cash the check, the check-cashing unit telephones a centralized services center ("CSC") to seek authorization. The CSC may automatically authorize the transaction. For example, since the CSC generally has more data available to it than does the check-cashing unit, the CSC may be able to recognize the customer as one who normally uses a different check-cashing unit, and may authorize the transaction for that reason. The CSC also may involve an operator in determining whether to authorize the transaction. For example, if the customer has not previously cashed a check using the check-cashing unit or a related check-cashing unit, the operator may verify the customer's identity by referencing a database that includes information about the customer's current and previous addresses, telephone numbers, and neighbors. Access to a database suitable for this purpose is available, for example, from Integrated Database Software, Inc. of Villa Park, Ill. Computers at the CSC provide detailed screen prompting to permit even minimally-trained personnel to follow the steps of cashing a check.

In general, automatic check approval may take about two minutes per transaction. When CSC intervention is required, processing times may be on the order of fifteen minutes per transaction.

Other features and advantages of the invention will be apparent from the following description, including the drawings, and from the claims.

BRIEF DESCRIPTION OF THE DRAWING

FIGS. 3 and 3A are block diagrams of the check-cashing unit of FIG. 1.

FIG. 9 is a table of business rules.

FIG. 10 is a screen display of the centralized services center of the checkcashing system of FIG. 5.

FIGS. 15A–15L are data structures employed by the check-cashing system of FIG. 5.

FIGS. 16A–16F are screen displays of a point-of-sale unit.

DESCRIPTION

Figure 1:
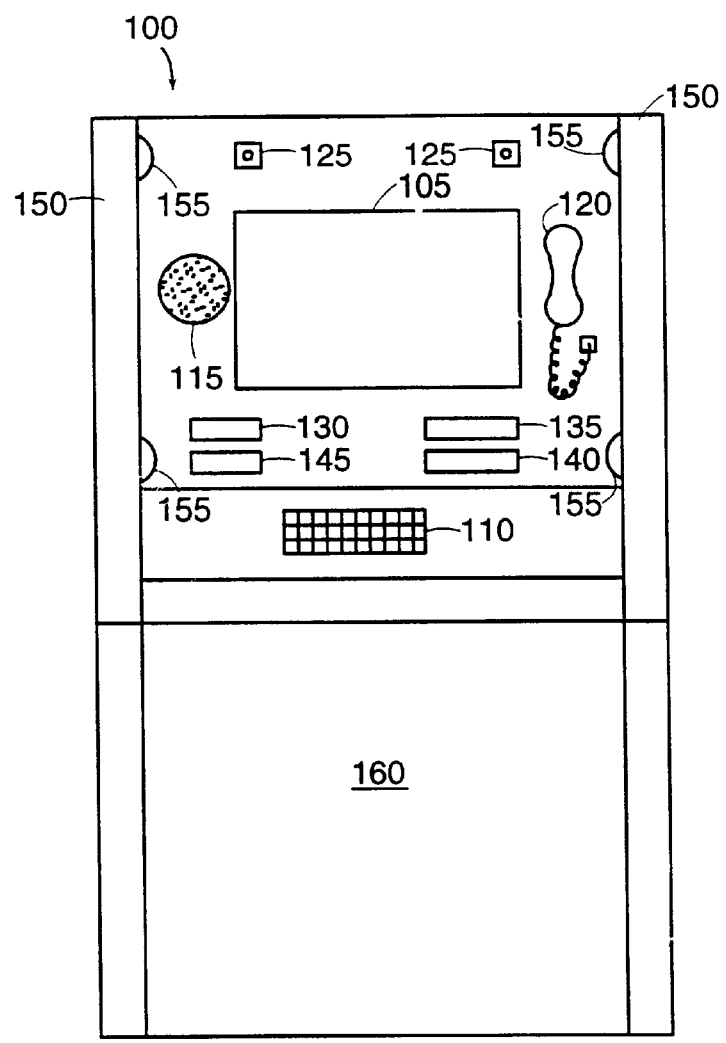
FIGS. 1 and 2 are front and side views of an automated check-cashing unit.
Figure 2:
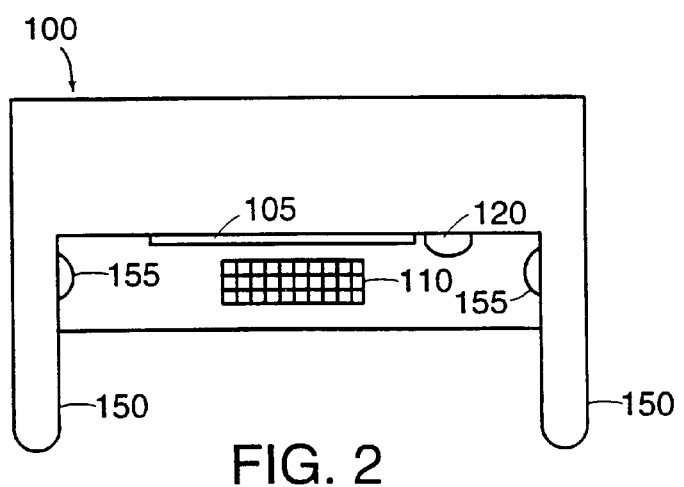

An automated check-cashing unit 100, also referred to as a point-of-sale ("POS") unit, is illustrated in FIGS. 1 and 2. The check-cashing unit 100 includes a touch-screen display 105, a numeric keypad 110, and a speaker 115 that permit the unit to communicate with a customer. A telephone handset 120 permits communication between the customer and a remote operator. A pair of digital video cameras 125 produce images of the customer that are used to verify the customer's identity.

The check-cashing unit 100 also includes a check reader 130 into which the customer's check is inserted for processing. When the unit 100 decides to cash the customer's check, a cash dispenser 135 provides cash to the customer and a printer 140 provides the customer with a receipt. In general, the cash dispenser 135 may include four cash drawers, with the drawers containing, respectively, $1, $5, $20 and $100 denominations. If desired, the cash dispenser 135 also may include a change dispenser. An optional card reader 145, though not needed for the check-cashing function of the unit 100, permits the unit 100 to provide banking functions (e.g., withdrawals from a checking or savings account) so that the unit 100 also may serve as a traditional automated teller machine ("ATM").

The check-cashing unit 100 also includes privacy screens 150 that provide the customer with a degree of privacy while using the checking unit. Lights 155 are positioned so as to illuminate the customer's face in a way that permits the video cameras 125 to produce high quality images.

An optional base 160 permits the check-cashing unit 100 to be configured as a stand-alone unit (as shown in FIGS. 1 and 2). The base 160 may be removed to configure the check-cashing unit 100 as a counter-top unit (not shown). The check-cashing unit also may be mounted within a wall, configured as a drive-through unit, or configured in other ways.

Figure 3A:
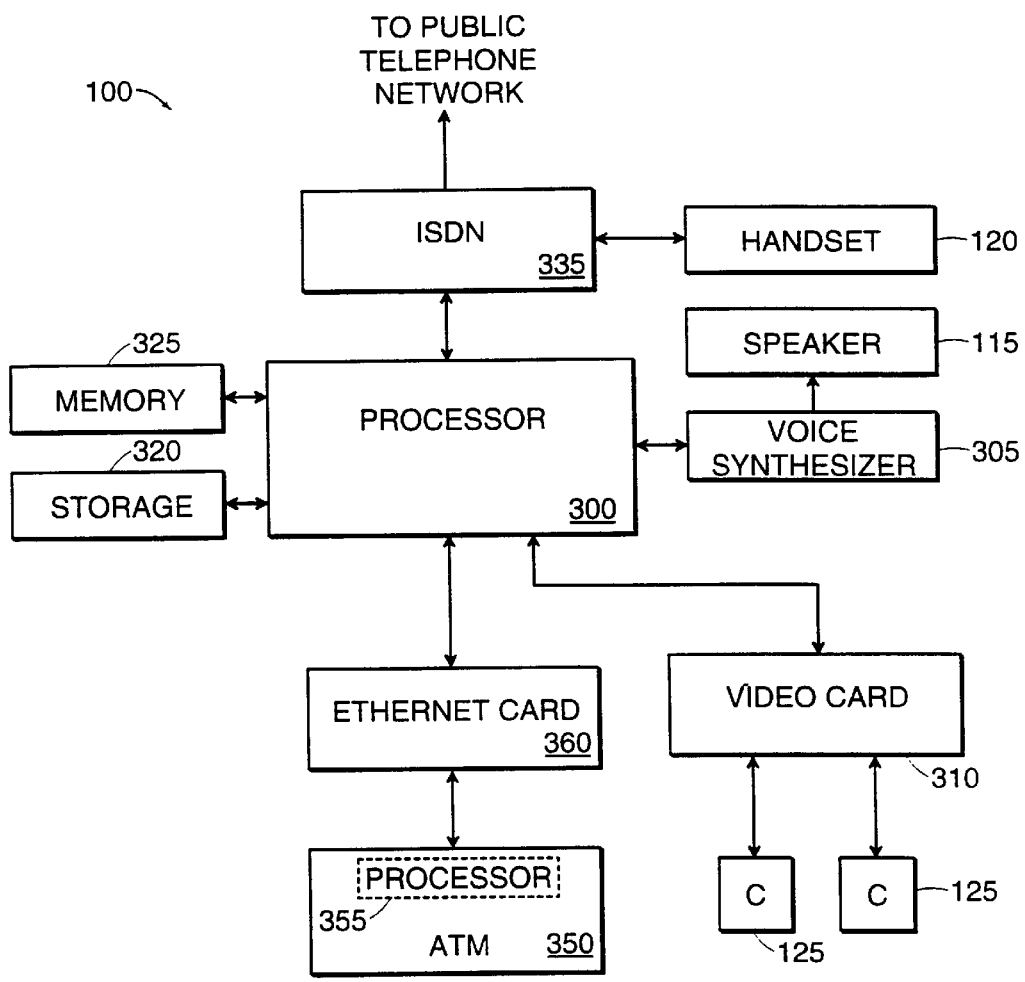

Referring to FIG. 3, the check-cashing unit 100 is controlled by a processor 300. The processor 300 receives input from the customer through the input portion of the touch screen 105 and through the keypad 110. The processor provides information to the customer through the display portion of the touch screen 110 The processor also may use a voice synthesizer 305 to speak to the customer through the speaker 115.

A video card 310 permits the processor 300 to receive images from the cameras 125. The processor 300 uses these images to identify the customer. In some instances, the processor may receive information about the customer's identity from the card reader 145.

A deposit processing module 315 connected to the check reader 130 provides the processor with information about the customer's check. Using a database loaded from a storage device 320 into memory 325, the processor verifies the customer's identity and determines whether the processor is authorized to cash the customer's check. If the processor concludes that it is authorized to cash the customer's check, the processor instructs a cash dispensing module 330 to dispense an appropriate amount of cash to the customer through the cash dispenser 135. The processor 300 provides the customer with a receipt through the printer 140. As indicated by the dashed lines in FIG. 3 and illustrated in FIG. 3A, the touch screen 105, the keypad 110, deposit processing module 315, the check reader 130, the cash dispensing module 330, the cash dispenser 135, the printer 140, and the card reader 145 may be implemented using a commercially-available automated teller machine ("ATM") 350, such as the DPATM Model Number 5675 available from the NCR Corporation. The processor 300 may communicate with a processor 355 (FIG. 3A) of the ATM through, for example, an ethernet connection provided by an Ethernet card 360 (FIG. 3A), and may communicate according to the TCP/IP protocol.

Figure 4:
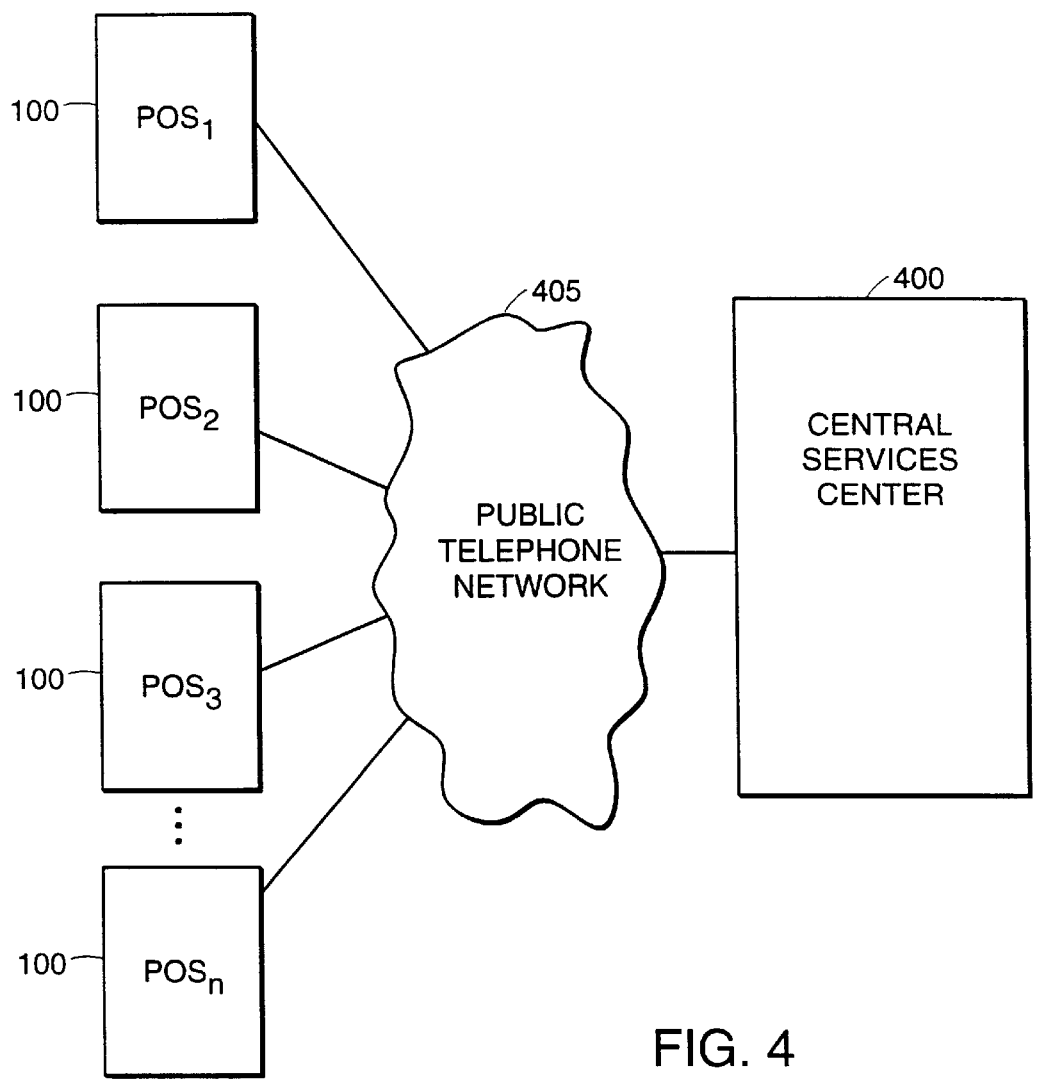
FIGS. 4, 5, 5A and 5B are block diagrams of check-cashing systems using the check-cashing unit of FIG. 1.

When the processor 300 is unable to verify the customer's identity, or is unauthorized to cash the customer's check automatically, the processor may transmit information about the customer and the customer's check to a remotely-located centralized services center ("CSC") through the public telephone network (see FIG. 4). Personnel at the CSC, or a computer at the CSC, would then attempt to verify the customer's identity and authorize cashing of the customer's check.

An ISDN card 335 allows communication between the processor 300 and the CSC. The ISDN card 335 also is connected to the handset 120 to permit the customer to speak with personnel at the CSC, if necessary. In some circumstances, the ISDN card 335 may be replaced with a cellular modem or similar device.

Referring to FIG. 4, a large number of check-cashing, or point-of-sale ("POS"), units 100 may communicate with a centralized services center ("CSC") 400 through the public telephone network 405. The POS units 100 automatically cash checks that meet certain criteria, while deferring to the CSC 400 for authorization to cash checks that do not meet the designated criteria. For security, the POS units 100 initiate all calls to the CSC and do not accept incoming calls. Similarly, the CSC accepts calls only from known POS units 100.

Figure 5:
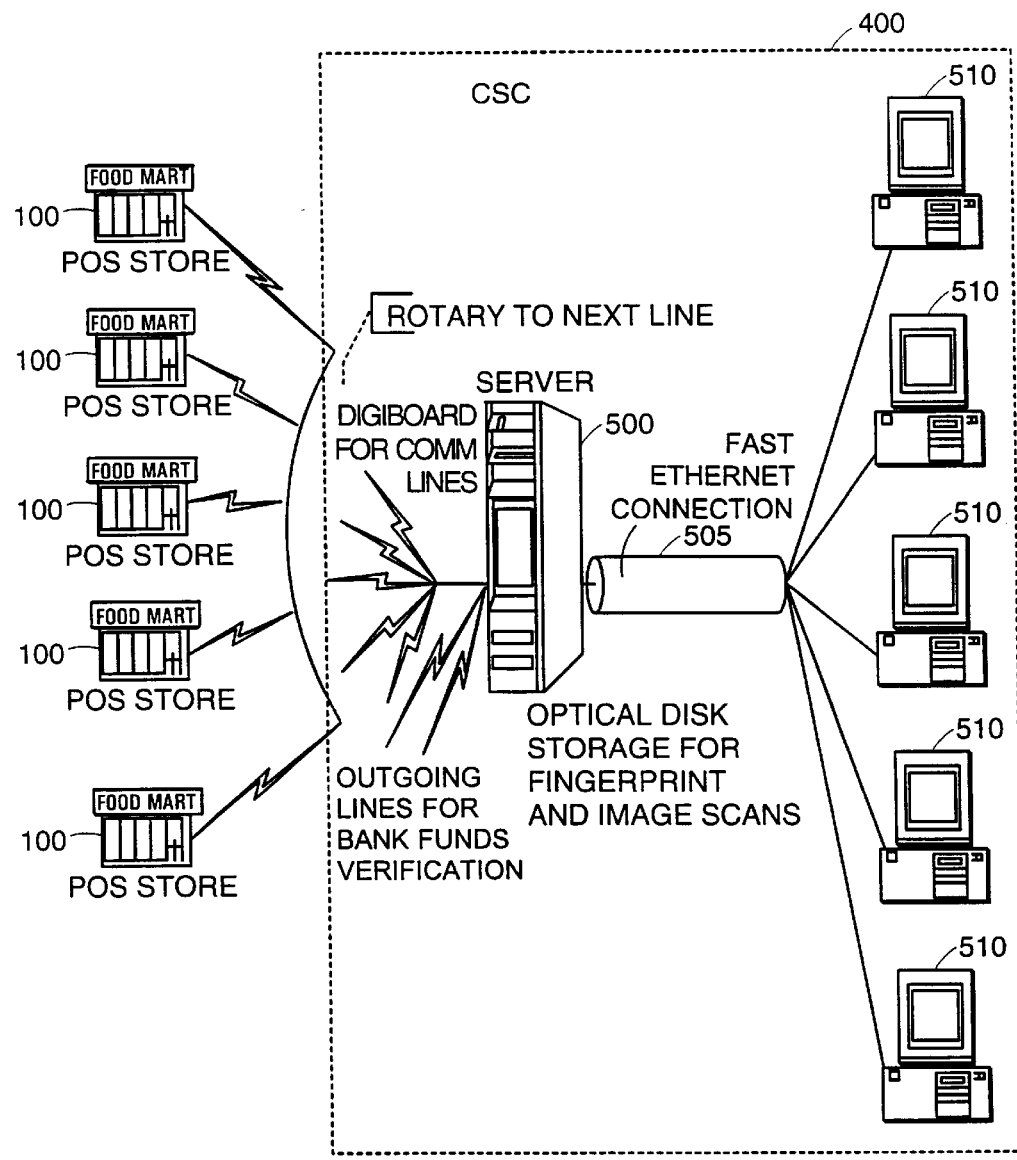

As shown in FIG. 5, a server 500 at the CSC 400 receives and processes calls from the POS units 100. The server, which generally has more available information than does a particular POS unit 100, may determine that the check should be cashed and may provide an indication to that effect to the calling POS unit 100. When the server 500 is unable to automatically cash a check, and determines that a call needs the attention of CSC personnel, the server identifies an available operator and directs information about the call through an Ethernet connection 505 to the operator's workstation 510. The operator then decides whether to cash the check and sends an appropriate signal to the calling POS unit 100. The server may direct calls based solely on operator availability, but also may consider other criteria. For example, the server may direct a call to an operator fluent in a language identified by the customer when accessing the POS unit 100.

Figure 5A:
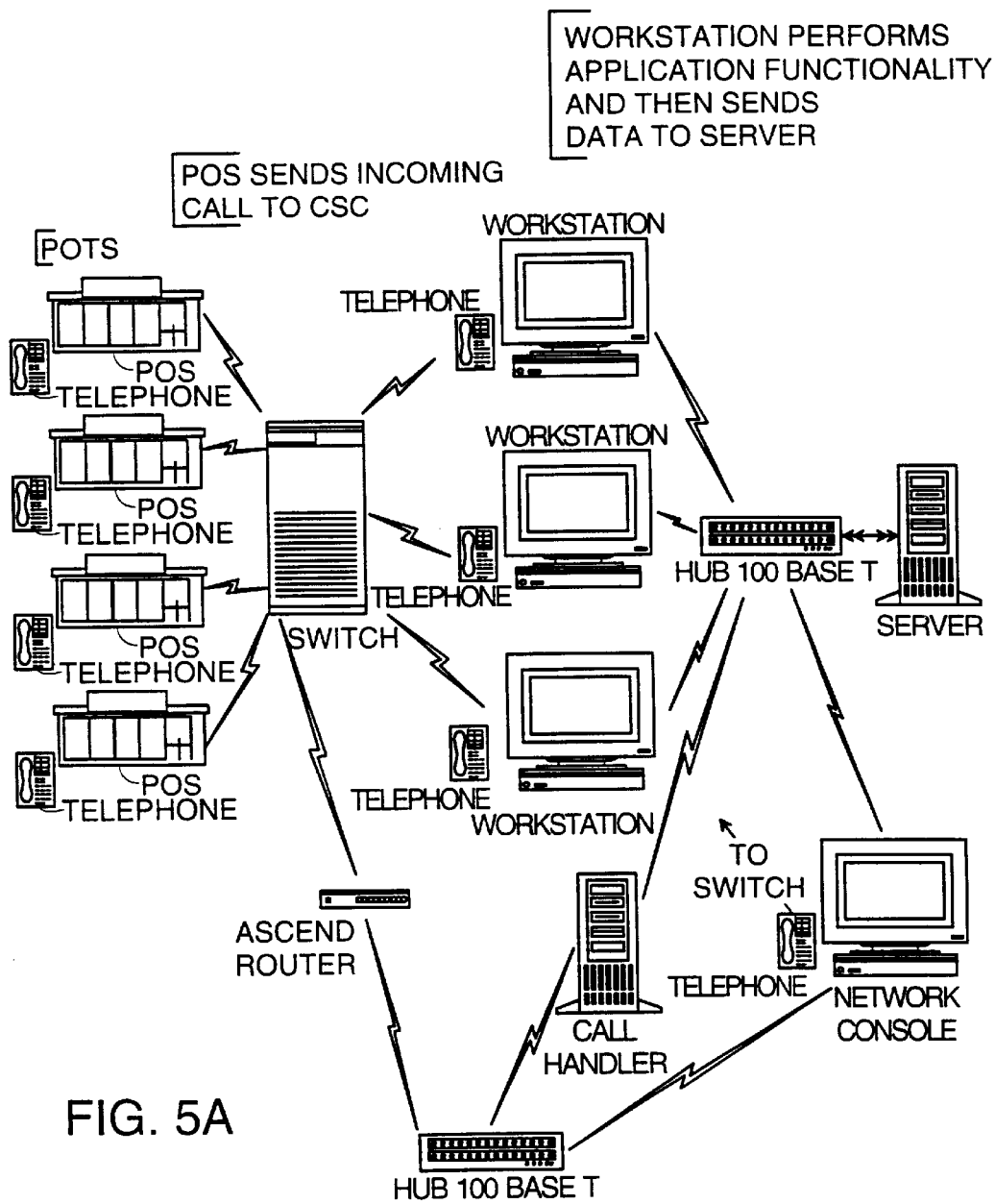

As shown in FIG. 5A, in one implementation, hardware of each POS unit 100 is implemented using an NCR 5675 ATM, two digital cameras, an Intel Pentium processor operating at 166 MHz, 32 megabytes of memory, a 2.5 gigabyte hard drive, an Ethernet card providing a coaxial cable connection between the ATM and the processor, an ISDN card, a Matrox video capture card, speakers, a telephone handset, and BRI ISDN telephone service. In the same implementation, hardware-of the CSC is implemented using twenty three lines of PRI ISDN telephone service; a Lucent Definity telephone switch, an Ascend router; two fast Ethernet 100BaseT hubs; an IBM 704 PC Server configured as a call handler (2×200 MHz, 256 MB memory, 2.14 GB Hard drive, redundant power supply, fast Ethernet card); an IBM 704 PC Server configured as a file server (4×200 MHz, 256 MB memory, 27.06 GB RAID-1 Disk, 24/48 GB internal tape auto loader, redundant power supply, fast Ethernet card); an IBM Server Rack 24 inch (14" color display, 101 keyboard); a Best uninterruptable power supply ("UPS") 5.3 kVA with the capability to run 5 hours without power for the telephone switch, router, fast Ethernet hubs, server rack, file server, and call handler; and forty workstations. Each workstation may be implemented using an Intel Pentium processor operating at 200 MHz, 32 MB memory, a 2.5 GB hard drive, a 101 Keyboard, a mouse, a fast Ethernet card, a 17" touch screen monitor, a phone handset, and a UPS.

Figure 5B:
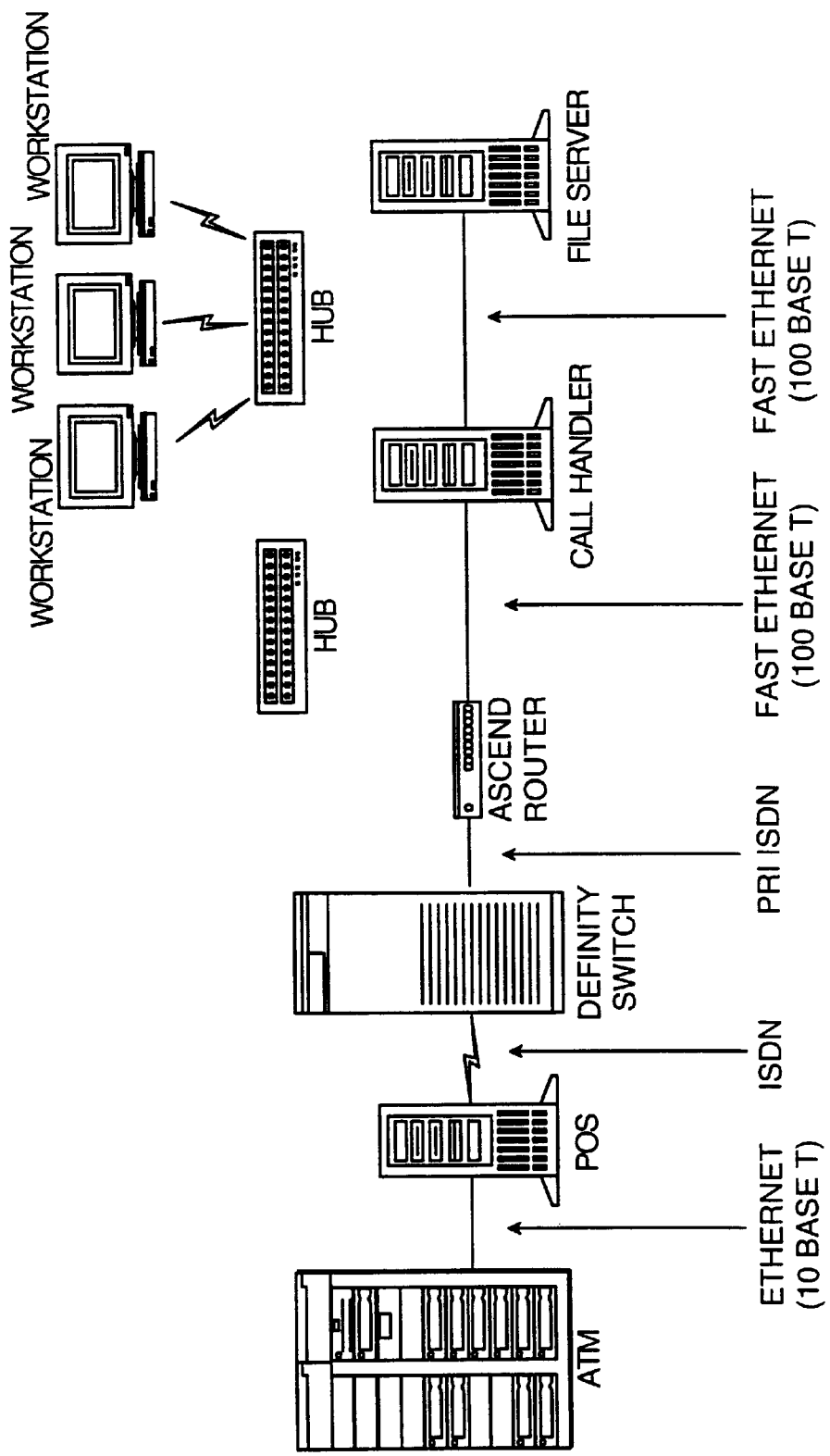

Connectivity in the implementation of FIG. 5A may be provided as shown in FIG. 5B. The ATM is connected to the POS processor through an Ethernet coaxial cable. The POS unit dials into the CSC using a BRI ISDN line. The CSC receives calls on a PRI ISDN going into the Definity switch. The Definity switch connects to the Ascend router using PRI ISDN. The Ascend router connects to the CSC call handler using a fast Ethernet Hub 100BaseT. Finally, the call handler, file server, and workstations are all connected by a separate fast Ethernet Hub 100BaseT.

Referring to FIGS. 6A, 6B, 7, 8A and 8B, the ATM 350, the processor 300, and the CSC 400 operate according to interacting procedures, with the ATM 350 operating according to a procedure 600, the processor 300 operating according to a procedure 700, and the CSC operating according to a procedure 800. Initially, the ATM 350 displays a screen that permits the customer to select an appropriate language (e.g., English or Spanish) and waits for the selection from the customer (step 605). When the customer selects the language (step 610), the ATM 350 prompts the customer to enter the customer's social security number or other identification number. After the customer enters the social security number (step 615), the ATM 350 prompts the customer for the amount of the check and the customer enters the amount (step 620).

Next, the ATM 350 prompts the customer to endorse the check and to insert the check into the check reader 130 (step 622), and the customer inserts the check (step 625). The check processing module 315 of the ATM 350 scans the check to produce images of the front and back of the check, validates the MICR ("magnetic ink character recognition") code on the check, and reads designated zones of the check (step 630). If the customer has failed to endorse the check, as indicated by the image of the back of the check, or has inserted the check incorrectly (step 632), then the ATM returns the check to the customer and prompts the customer to endorse the check (if necessary) and to reinsert the check (step 634). If the check has been endorsed and properly inserted, the ATM 350 then displays an image of the front of the check to the customer (step 635) and validates the contents of the check using optical character recognition ("OCR") (step 540). Using the recognized amount of the check, the ATM then calculates the difference, if any, between the recognized amount of the check and the amount entered by the customer (step 645).

Next, the ATM 350 sends information to the processor 300 (step 650). The information sent includes the customer's social security number or other identification number, the images of the front and back of the check, MICR information, information as to whether the contents of the check passed the validation step, the check amount read by OCR, the check amount entered by the customer, and the difference, if any, between the two amounts. The ATM then prompts the customer to remove any hat, sunglasses, or other items that would obscure the customer's face (step 652) and waits for a response from the processor 300. The message may be accompanied by an animated character that removes its hat and sunglasses.

Figure 7:
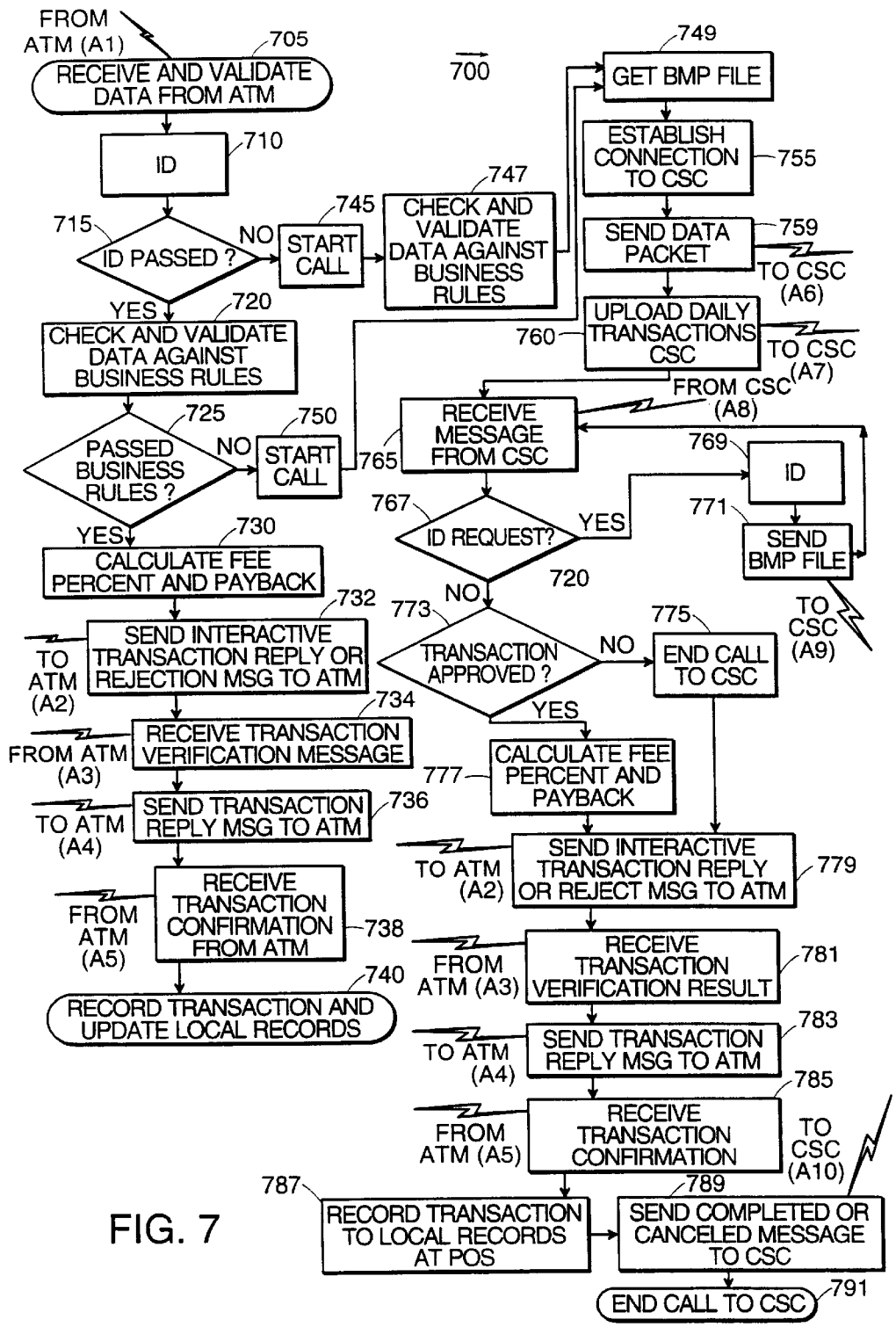
FIG. 7 is a flowchart of a procedure implemented by a processor of the check-cashing unit of FIG. 1.

Referring to FIG. 7, upon receiving and validating the information from the ATM 350 (step 705), the processor 300 attempts to identify the customer (step 710). To this end, the processor uses identification software that identifies a person based on an image of the person's face. An example of software that is suited for this purpose is the TrueFace CyberWatch software available from Miros, Inc., of 572 Washington St. #18, Wellesley, Mass. 02181. This software is described by Miros, Inc., in the Programmer's Manual For TrueFace Version 2, which is incorporated by reference.

The identification software compares an image of the customer produced by a camera 125 with an image stored in conjunction with the customer's identification number in a database stored on the storage device 320. The image is produced when the customer enters the first digit of the customer's social security number or other identification number to ensure that the customer is looking at the camera. The image from the second camera 125, though not used for comparison with the stored image, is used to verify that the image from the first camera is an image of the customer rather than an image of a picture held in front of the camera. The ATM displays the "remove hat and sunglasses" message because the presence of a hat or sunglasses can reduce the ability of the identification software to identify the customer. The identification software also may compare the image of the customer's face with a database of images associated with "bad" customers (i.e., customers who have previously submitted bad checks or who have a record of doing so).

Other types of biometric identification software could be used. For example, the identification software could identify the customer using a fingerprint or palmprint, DNA analysis, a retinal scan, or an analysis of the customer's voice.

If the identification software approves the customer (i.e., if the customer's image matches the image stored with the customer's identification number) (step 715), the processor determines whether data associated with the customer and the customer's check satisfy a set of business rules stored on the storage device 320 (step 720).

The business rules 900 used by the processor in one implementation are illustrated in FIG. 9. These business rules, which are intended to be illustrative only, include a set of criteria 905 and a set of values 910. In general, when checking the business rules, the processor references a payor database and a payee database to obtain information about the customer (the payee) and the customer's employer (the payor). If the transaction violates any one of the business rules, then the processor 300 is not authorized to automatically cash the customer's check, and must seek authorization from the CSC 400.

If the check satisfies the business rules (step 725), the processor 300 determines the fee to charge the customer and the payback amount (i.e., the amount of cash that the customer will receive) (step 730). The processor 300 then sends this information to the ATM 350 and waits for a reply (step 732).

Figure 6A:
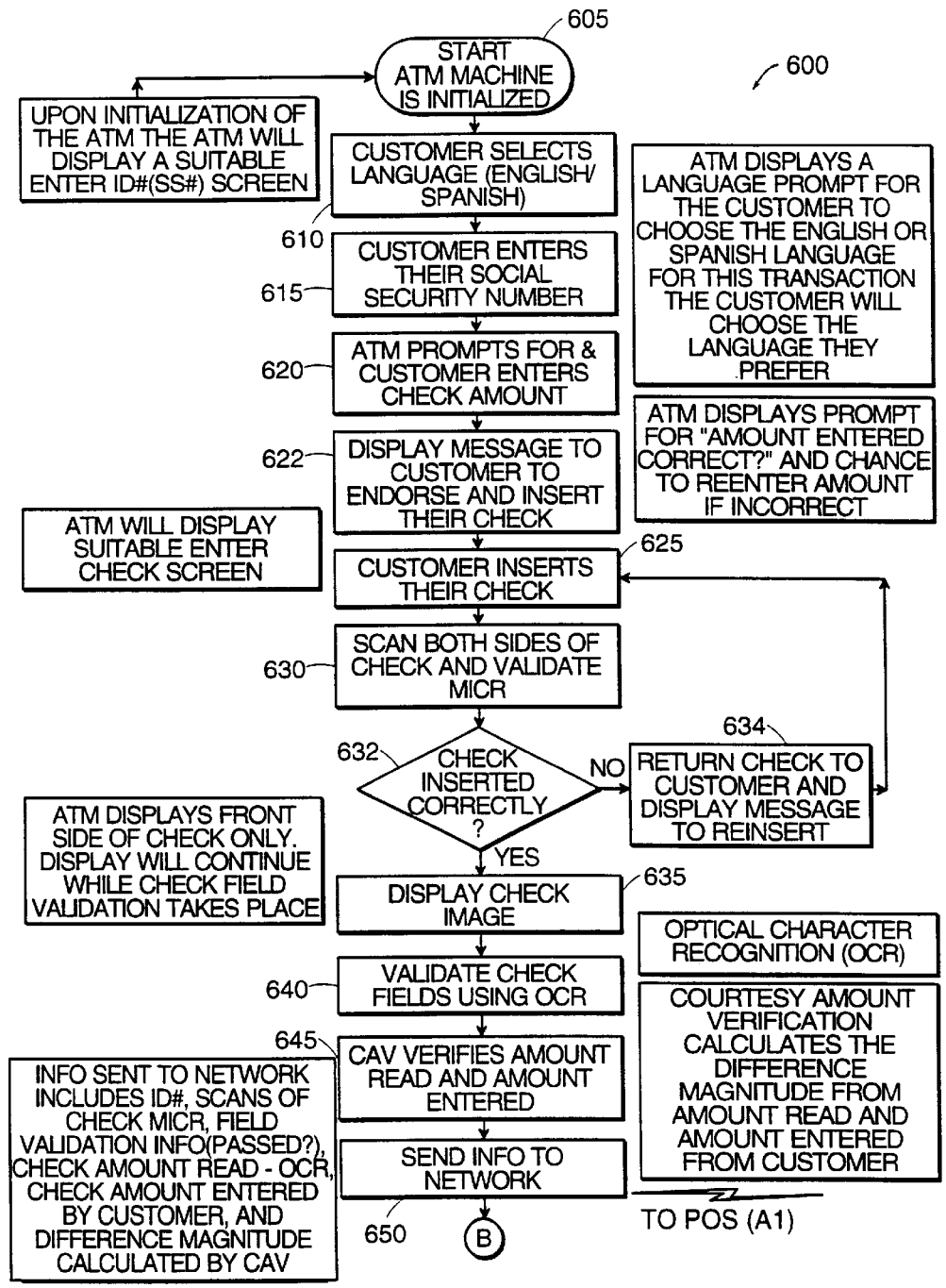
FIGS. 6A and 6B are flow charts of a procedure implemented by an ATM of the check-cashing unit of FIG. 1.
Figure 6B:
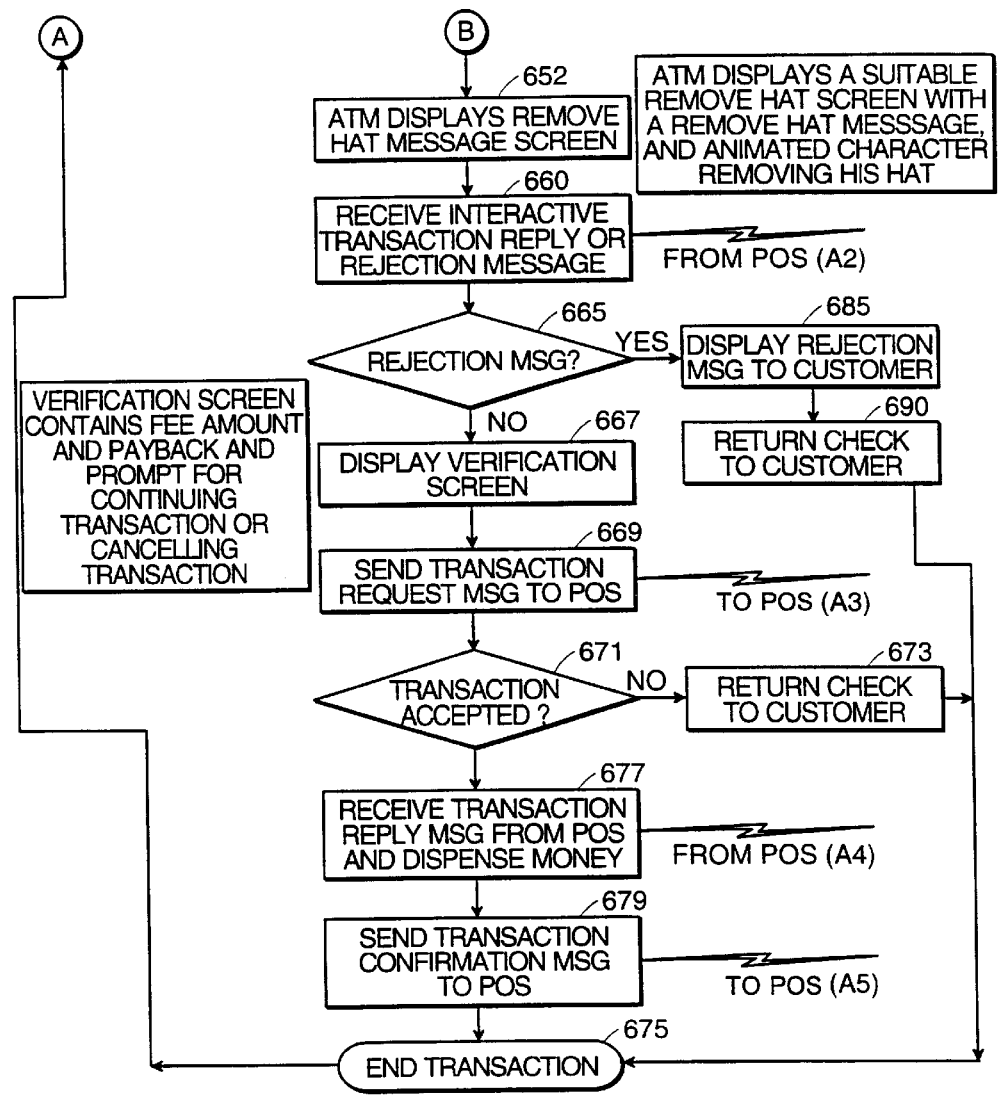

Referring to FIG. 6B, upon receiving the fee and payback amount (step 660), since the check has not been rejected (step 665), the ATM 350 displays the fee and payback amount for verification by the customer (step 667). The ATM 350 then sends a transaction request message to the processor 300 (step 669). Based on the customer's response, the transaction request message indicates to the processor that the transaction should either be continued or cancelled. If the customer has not accepted the transaction (step 671), the ATM 350 returns the customer's check (step 673). The ATM 350 then ends the transaction (step 675) and waits for another customer (step 605). If the customer has accepted the transaction (step 671), the ATM 350 waits for a transaction reply message from the processor 300.

Upon receiving a transaction reply (step 677), the ATM 350 dispenses the appropriate amount of money. The ATM 350 then sends a confirmation to the processor 300 (step 679) and ends the transaction (step 675).

If, as discussed below, the processor 300 sends a rejection message in response to the first request (step 665), the ATM 350 displays a rejection message to the customer (step 685), returns the check to the customer (step 690) and ends the transaction as noted above. In some instances, the ATM 350 may retain the rejected check. For example, an operator at the CSC 400 may signal the ATM 350 to retain the rejected check if the operator determines that the check has been stolen.

Referring again to FIG. 7, upon receiving a response from the ATM 350 (step 734), the processor 300 sends a reply to the ATM 350 (step 736) and waits for a confirmation. Upon receiving the confirmation (step 738), the processor 300 records the transaction and updates the database located on the storage device 320 (step 740). The processor then waits to receive a new set of data from the ATM (step 705).

If the identification software does not approve the customer (i.e., if the customer's image does not match the stored image, or if there is no stored image for the customer's identification number) (step 715), the processor 300 initiates a call to the CSC 400 (step 745) and determines whether data associated with the customer and the customer's check satisfy the business rules (step 747). The processor 300 then gets a bitmap ("BMP") file of the customer's image (step 749) for transmission to the CSC 400. The processor also initiates a call to the CSC (step 750) and gets the BMP file for the customer (step 749) if the identification software approves the customer (step 715), but the check does not satisfy the business rules (step 725).

After initiating a call, the processor 300 establishes a connection to the CSC 400 using an ISDN line (step 755). The processor uses one channel of the line to transmit a data packet about the customer and the customer's check to the CSC 400 (step 759). The data packet includes the information sent from the ATM 350 to the processor 300 (i.e, the customer's social security number or other identification number, the images of the front and back of the check, MICR information, information as to whether the contents of the check passed the validation step, the check amount read by OCR, the check amount entered by the customer, and the difference, if any, between the two amounts), the BMP file including an image of the customer, the results of the identification procedure, and the reason that the transaction is being sent to the CSC.

The processor uses the other channel of the line to establish a video conferencing connection between the POS unit 100 and the CSC 400. In one implementation, this connection includes bidirectional audio and unidirectional video, with still images being transferred periodically from the POS unit 100 to the CSC 400. Other implementations may include unidirectional or bidirectional real-time video.

Next, the processor 300 waits for a response from the CSC with respect to the current customer (step 760). While waiting for the response, the processor 300 uses any unused bandwidth of the connection between the POS unit 100 and the CSC 400 to provide the CSC 400 with information about any transactions that the processor has independently processed (see, e.g., step 738) since the last call from the processor to the CSC.

Figure 8A:
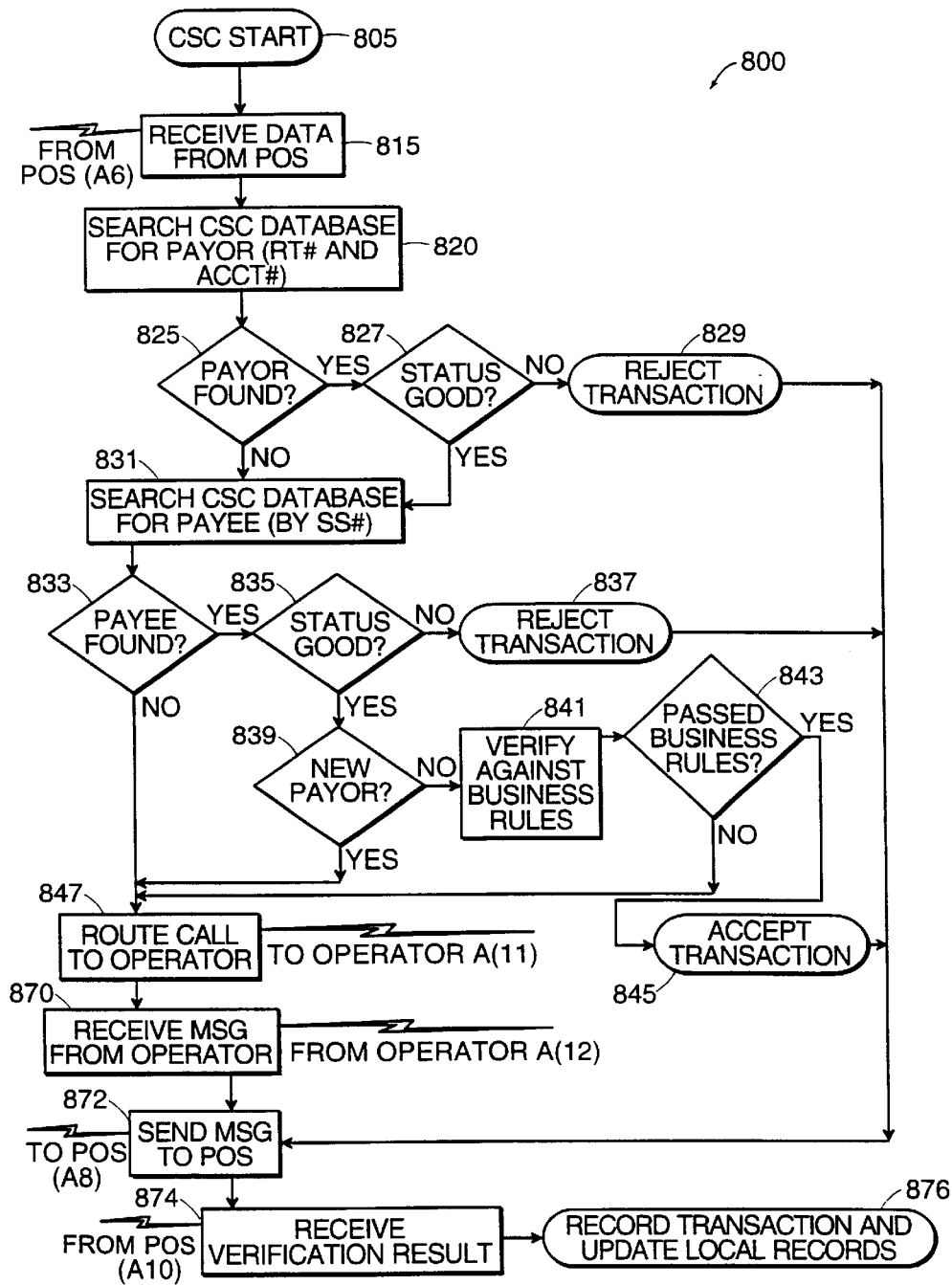
FIGS. 8A and 8B are flow charts of a procedure implemented by a centralized services center of the check-cashing system of FIG. 5.

Referring to FIG. 8A, the CSC 400 processes each call from a POS unit 100 according to the procedure 800. Upon receiving a call (step 805), the server 500 of the CSC 400 validates a security code associated with the call. Each POS unit 100 is encoded with a unique serial number which that is maintained at the CSC. This encrypted serial number serves as an authorization key to obtain CSC approvals and is transmitted with every transaction originating from the POS unit 100. At preset intervals, a new serial number is transmitted to the POS unit 100 for further security. If the security code is invalid, the server 500 notifies the POS 100 and terminates the call.

After validating the security code, the server 500 receives the data packet for the transaction from the POS unit 100 (step 815). The server 500 searches a payor database for the payor of the check (e.g., the customer's employer) (step 820). The server searches the payor database according to the routing number and the account number printed on the check and provided by the check processing module of the ATM.

If the server 500 finds the payor in the payor database (step 825), the server 500 determines whether the payor has a good payment status (step 827). If the payor does not have a good payment status, the server 500 indicates that the transaction should be rejected (step 829).

If the payor has a good payment status, or if the server does not find the payor in the payor database, the server 500 searches a payee database for the customer (step 831). The server 500 searches the payee database according to the customer's identification number. If the server 500 finds the customer in the payee database (step 833), the server 500 determines whether the payee has a good status (i.e., whether the customer has a history of depositing good checks) (step 835). If the customer does not have a good payment status, the server 500 indicates that the transaction should be rejected (step 837).

If the customer has a good status (step 835), and the payor is an established payor with a good status (step 839), the server verifies the transaction against a set of business rules (step 841). The business rules may be identical in content to the business rules 900 used by the processor 300 (see FIG. 9). However, as discussed below, each business rule includes an identifier, known as "a referral reason", to be displayed to a CSC operator when the rule is violated, and a list of actions that the operator is to take in response to the referral reason. By comparison, the processor 300 of the POS unit can be seen as taking the action of contacting the CSC in response to each referral reason.

If the transaction passes the business rules (step 843), the server 500 indicates that the transaction should be accepted (step 845). Thus, the server 500 may automatically accept transactions that the POS unit 100 is unauthorized to accept. For example, if a customer who typically uses a POS unit in a first location switches to a POS unit in a second location, the POS unit in the second location may not have information about the customer in the POS unit's database. For this reason, the POS unit will be unable to identify the customer and, accordingly, will be unauthorized to cash the customer's check. By contrast, the server 500 will maintain a much larger database with information about customers who use any POS unit. For this reason, the server 500 will be able to identify the customer and authorize the transaction.

If the server 500 is unable to find the customer in the payee database (step 833), is unable to find the payor in the payor database (step 839), or if the transaction does not satisfy the business rules (step 843), the server sends the transaction to the workstation 510 of the next available operator (step 847) and waits to receive a message from the operator.

Figure 8B:
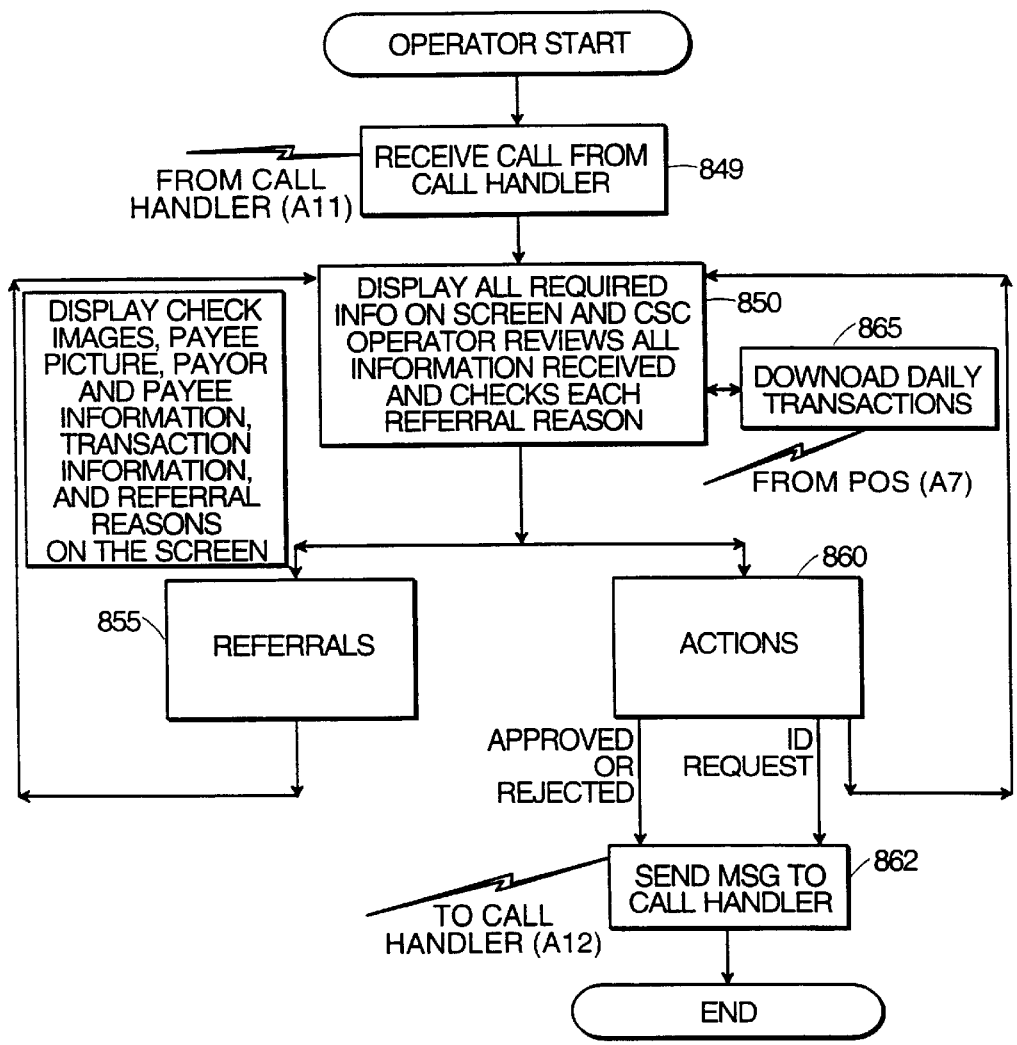
Figure 11A:
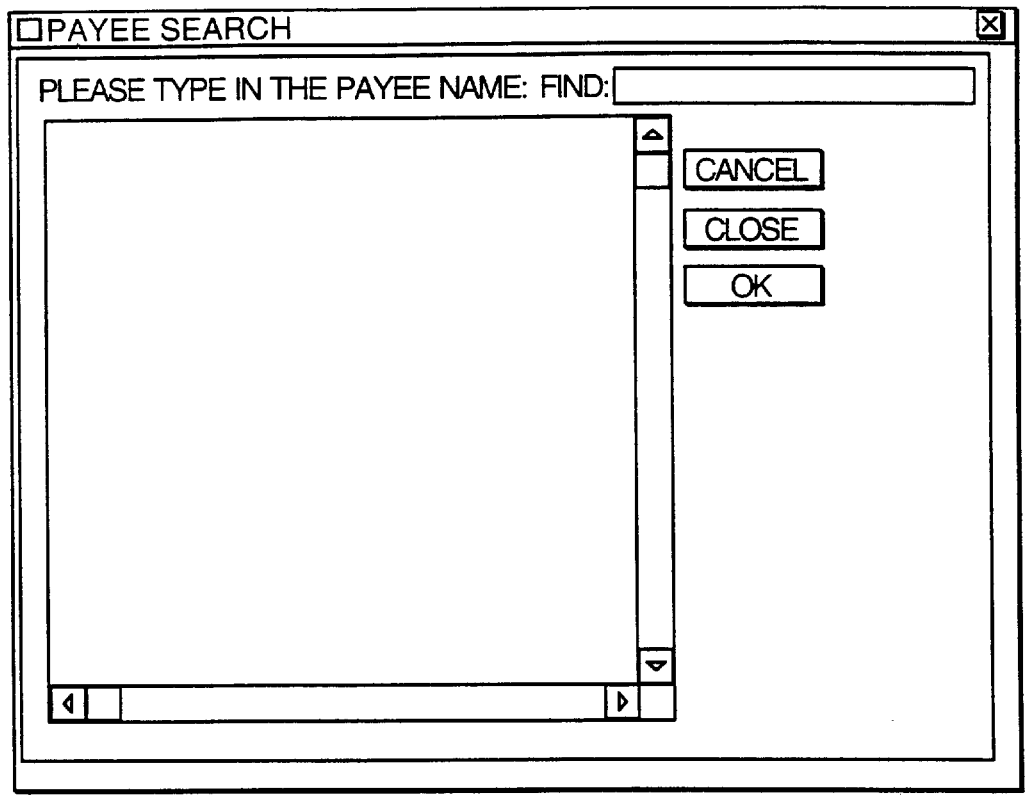
FIGS. 11A–11R are sub-screens of the screen display of FIG. 10.
Figure 11B:
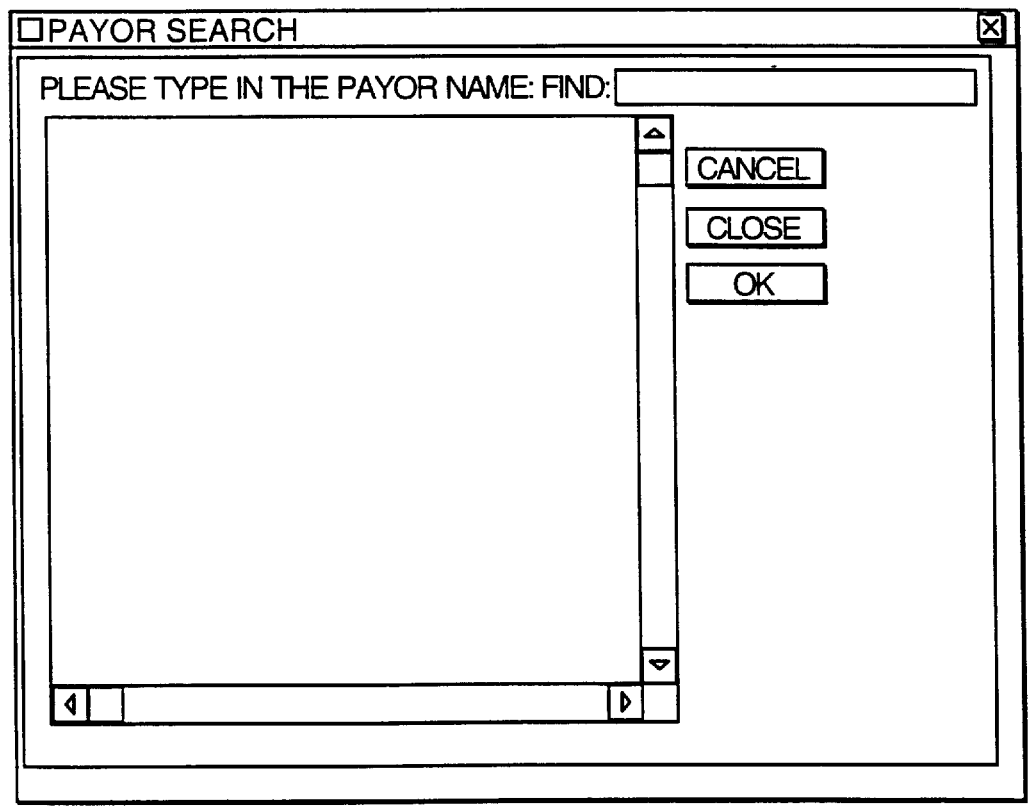
Figure 11F:
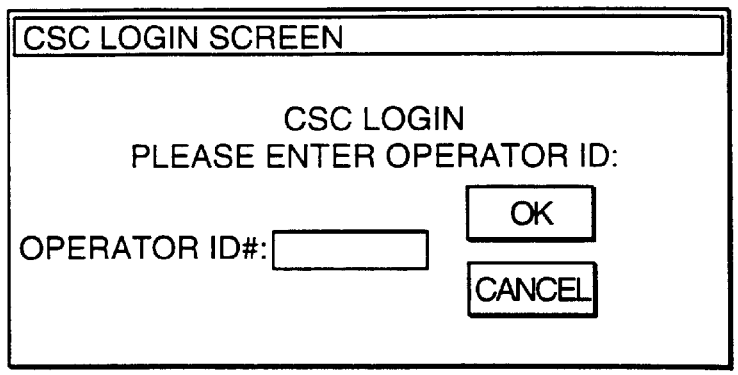
Figure 11G:
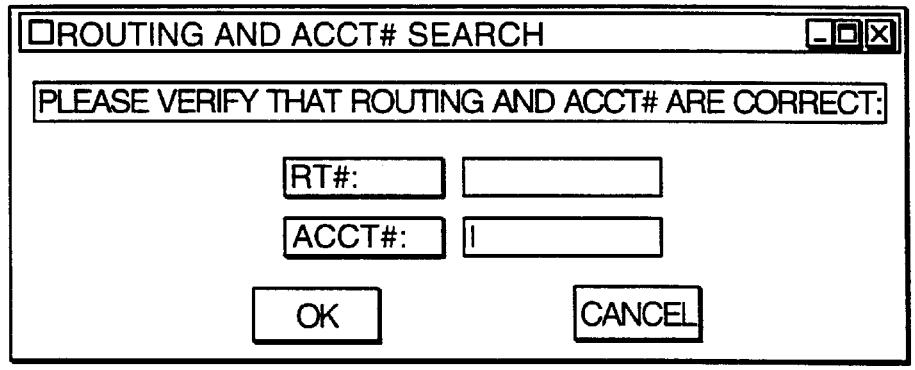
Figure 11H:
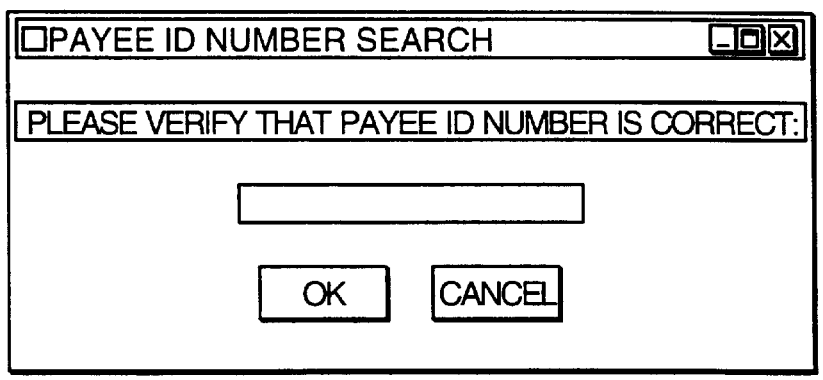
Figure 11O:
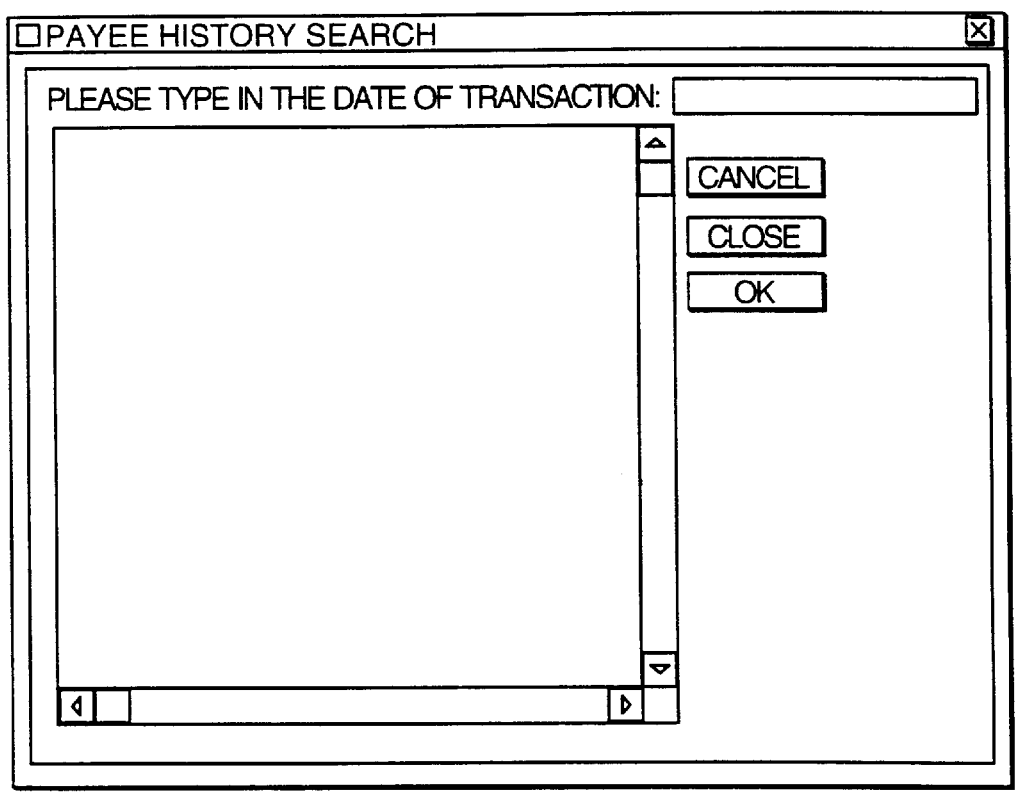
Figure 11P:
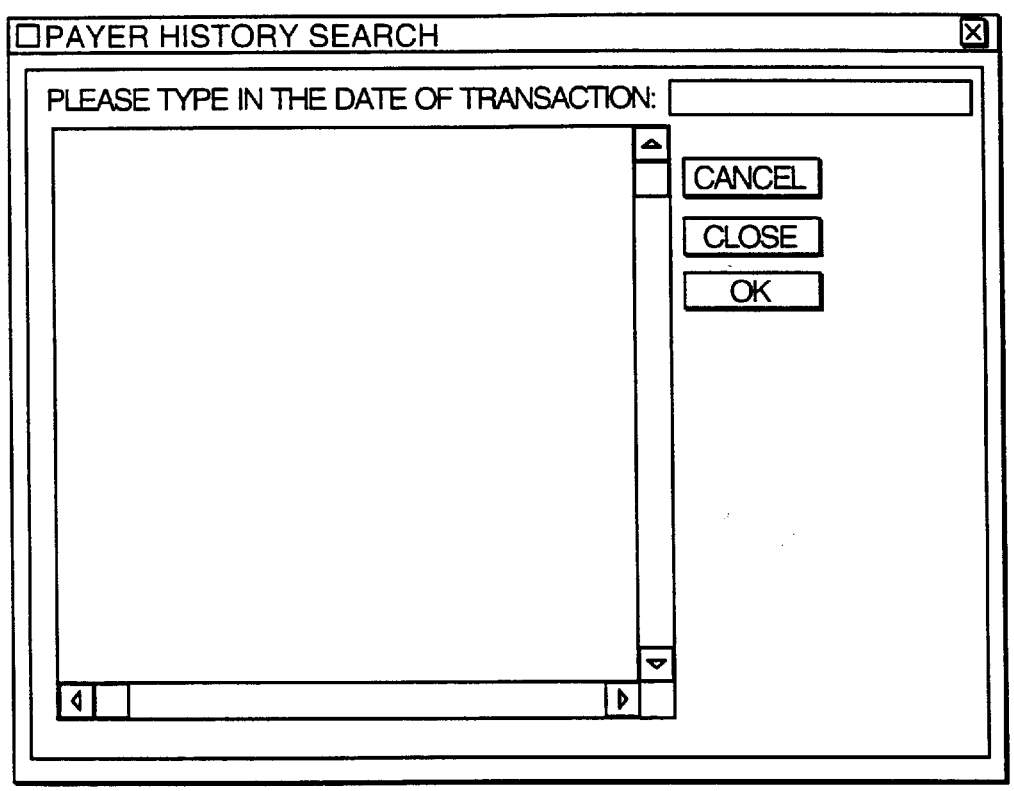
Figure 11Q:
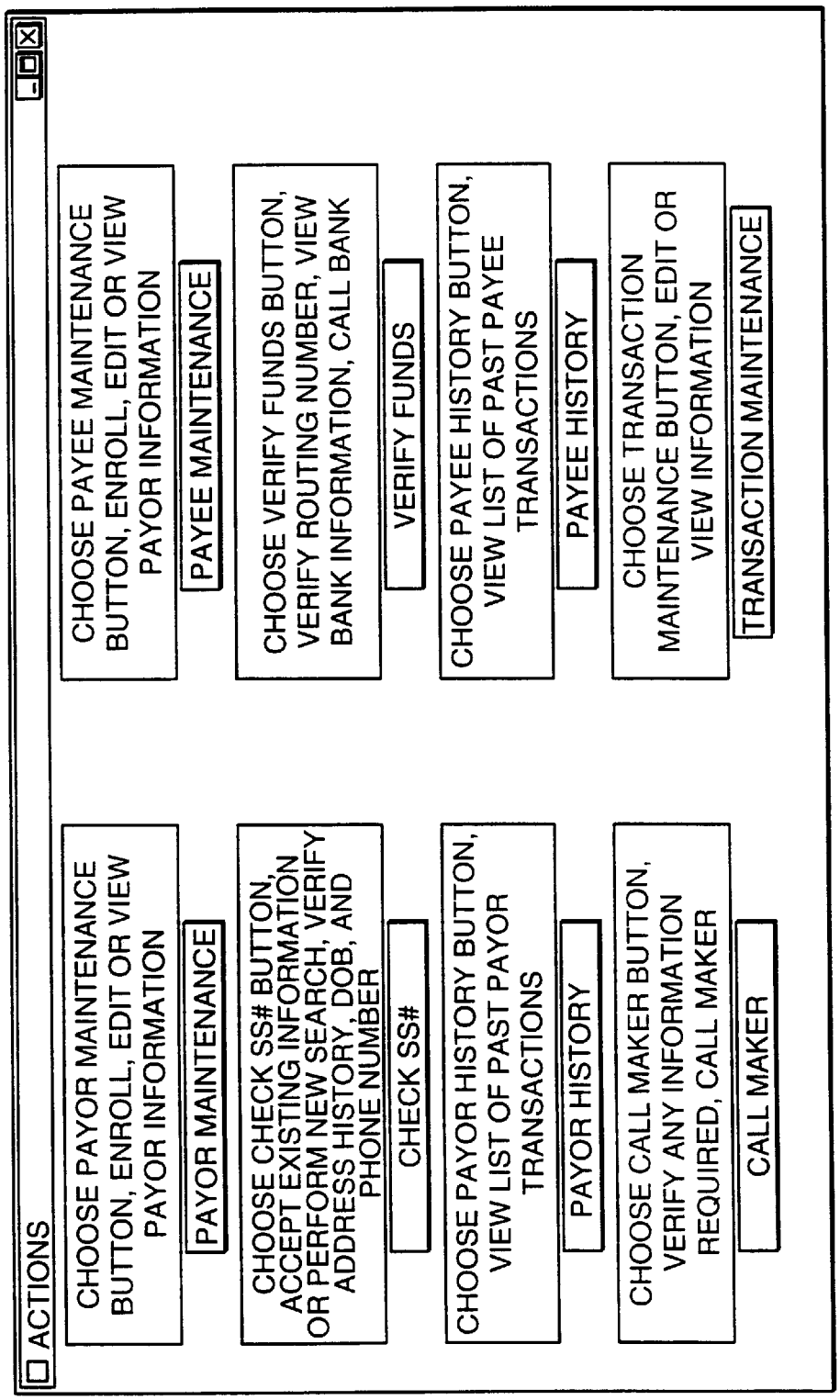
Figure 11R:
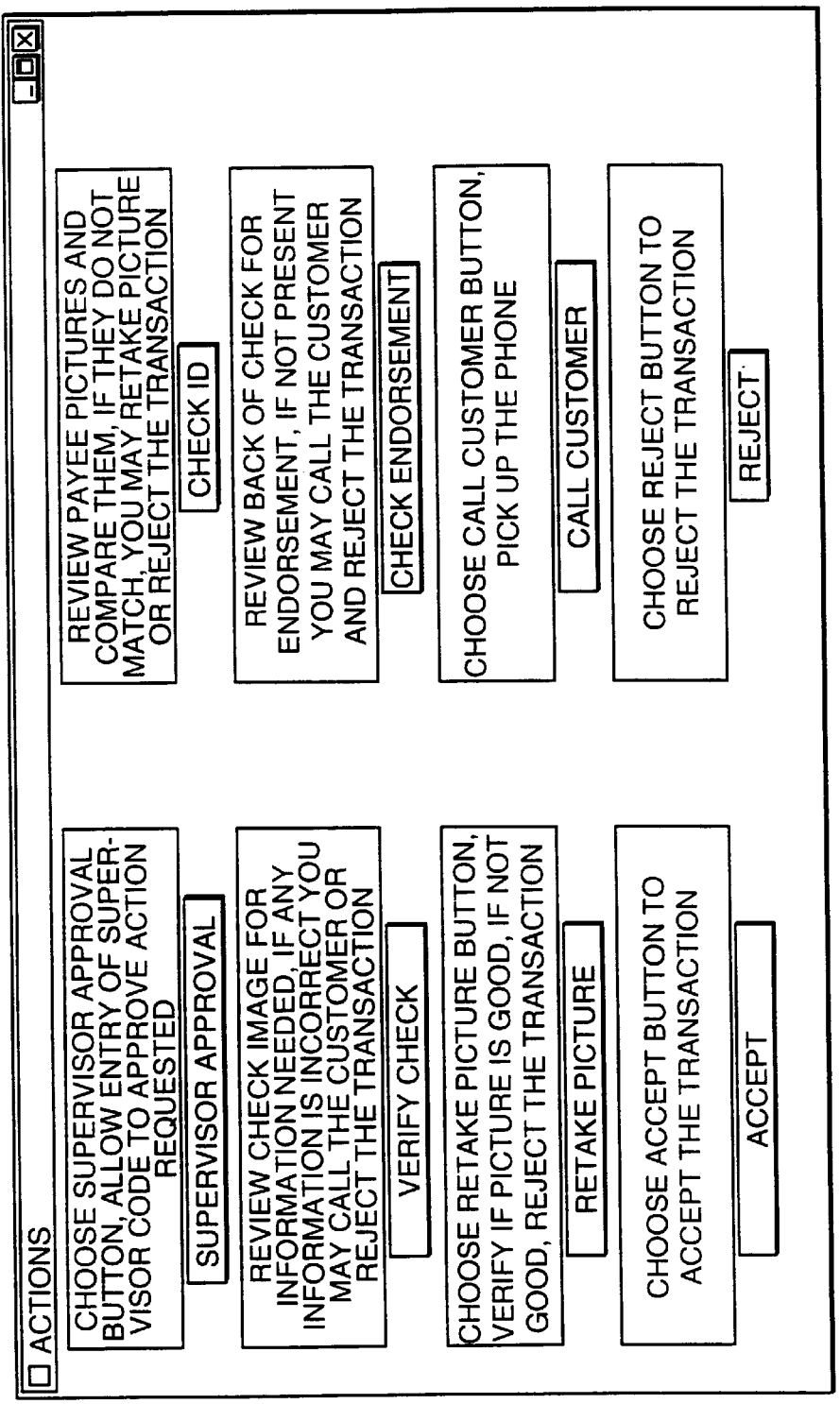

Referring to FIG. 8B, upon receiving a call from the call handler (step 849), the operator's workstation 510 provides the operator with the graphical user interface ("GUI") 1000 illustrated in FIG. 10 (step 850). The GUI 1000 provides the CSC operator with all information from the POS unit that is needed make a decision about the worthiness of the transaction. This information includes information about the payor, information about the payee, including the current and file image of the payee, an image of the check, and an indication as to why the transaction was rejected. In general, the GUI is a series of tabs with each reason that the transaction was not automatically approved being highlighted. The GUI is in an inactive state until it receives a request from a POS unit for approval. The workstation 510 responds to actions of the operator by displaying appropriate sub-screens of the GUI. These subscreens are illustrated in FIGS. 11A–11R.

Referring again to FIG. 8B, the CSC operator responds to the referrals (step 855) by taking actions (step 860) that may include, among other actions, accepting the transaction, rejecting the transaction, or requesting identification of the user. If the operator accepts the transaction, rejects the transaction, or requests identification of the user, a message is sent to the call handler (step 862).

As noted above, while the CSC operator processes the transaction, the server 500 takes advantage of any unused bandwidth of the connection between the POS unit 100 and the CSC 400 to obtain from the processor 300 information about any transactions that the processor has independently processed since the last call from the processor to the CSC (step 865). After retrieving all such data, the server 500 may use any other available bandwidth to update the databases of the POS unit 100.

Figure 12A:
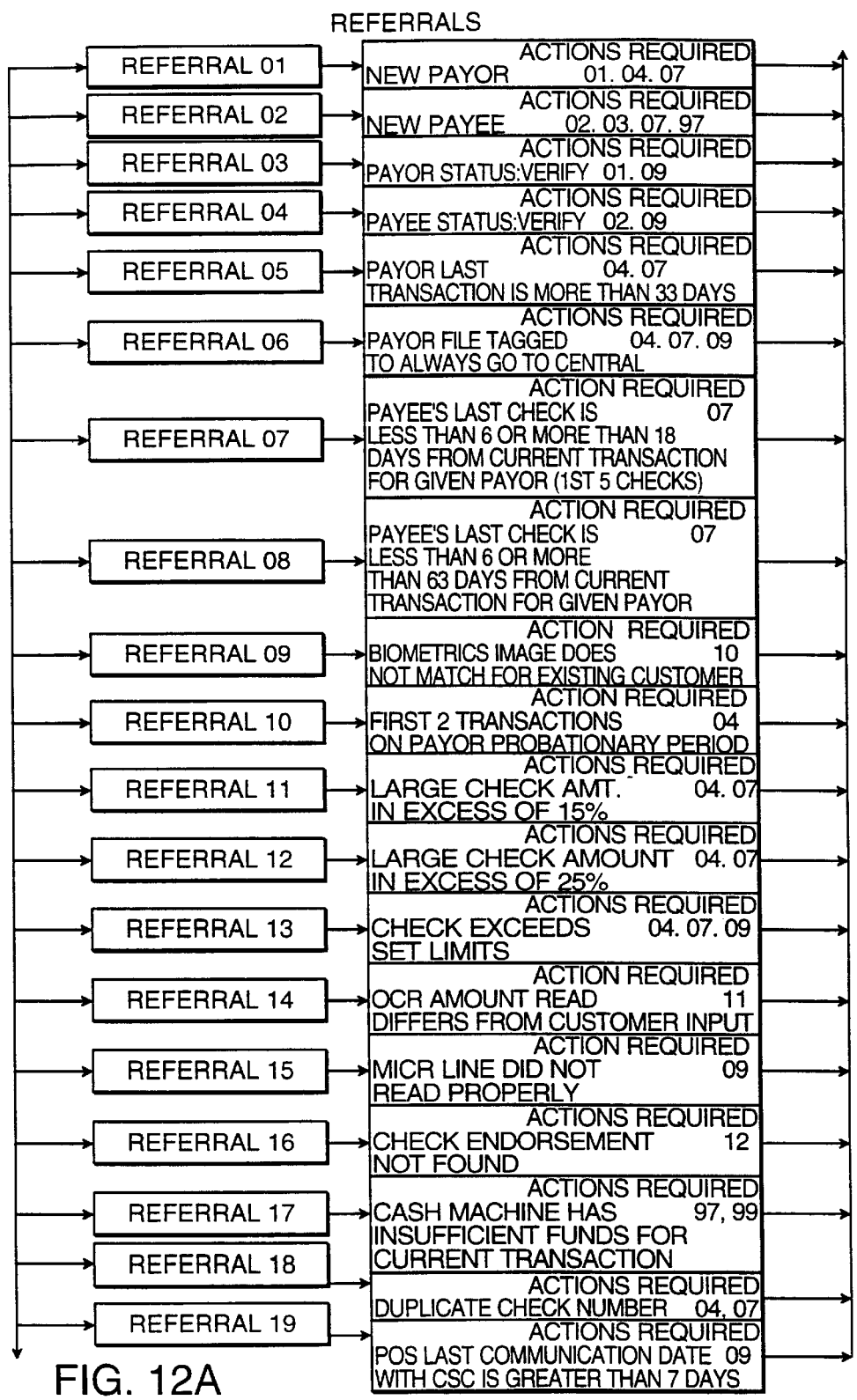
FIGS. 12A and 12B are tables of referrals and actions to be taken by the central services center of the check-cashing system of FIG. 5 in response to the referrals.
Figure 12B:
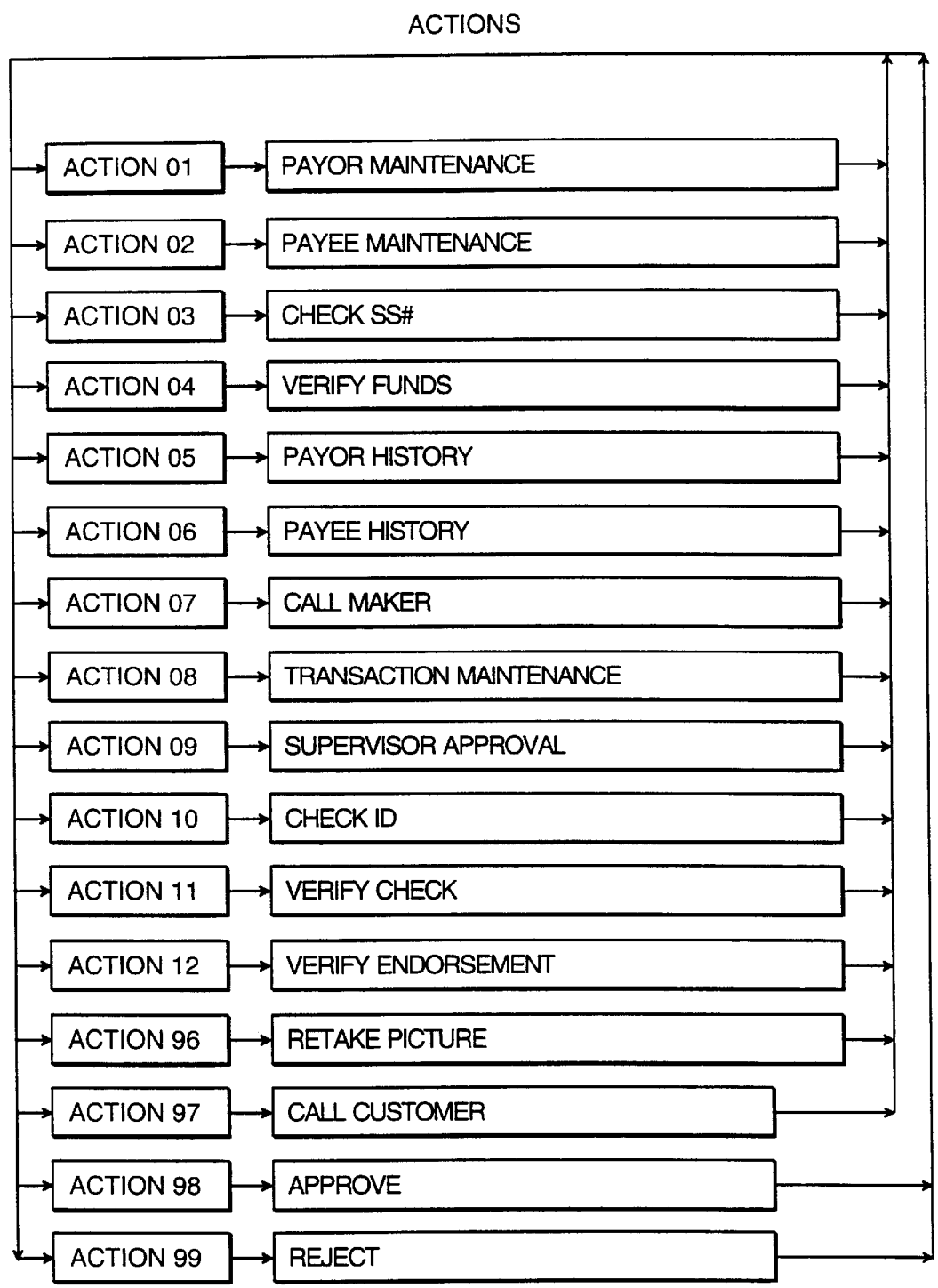
Figure 13A:
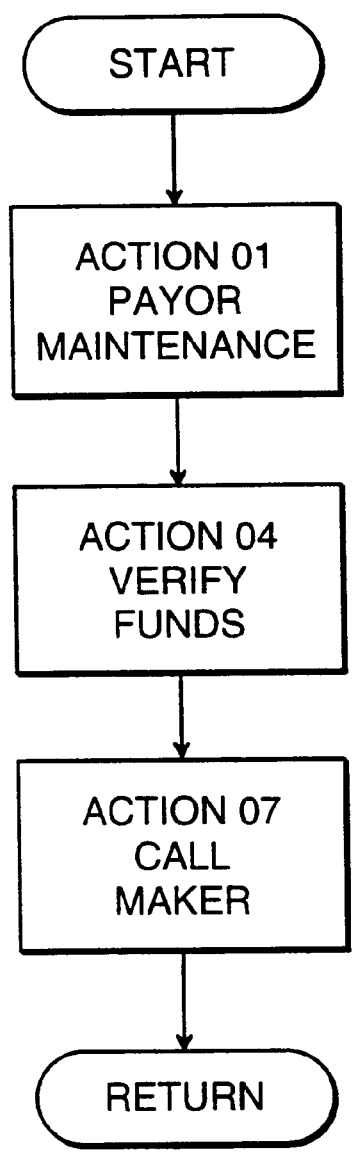
FIGS. 13A–13S are flow charts of procedures implemented by the centralized services center in responding to the referrals of FIG. 12A.
Figure 13B:
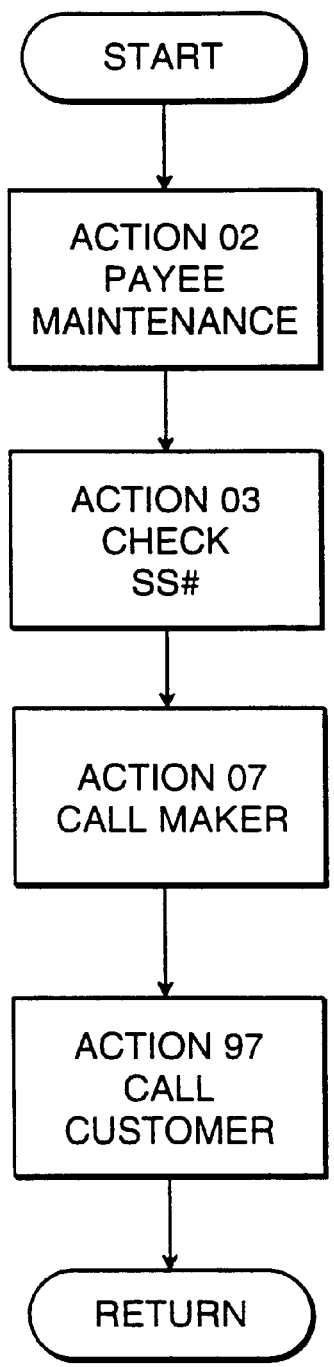
Figure 13C:
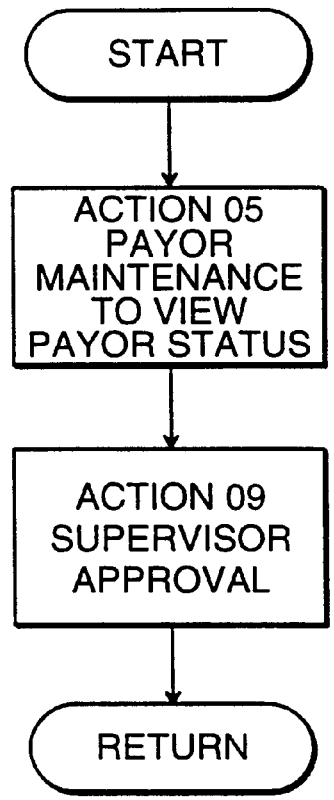
Figure 13D:
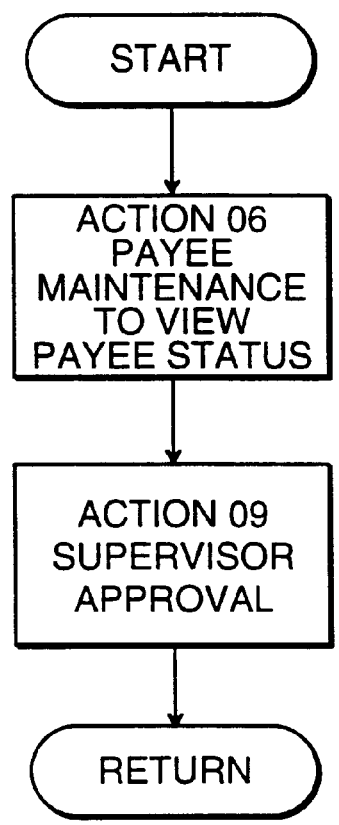
Figure 13E:
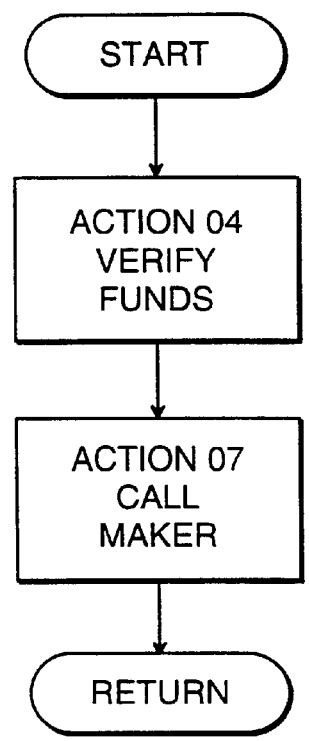
Figure 13F:
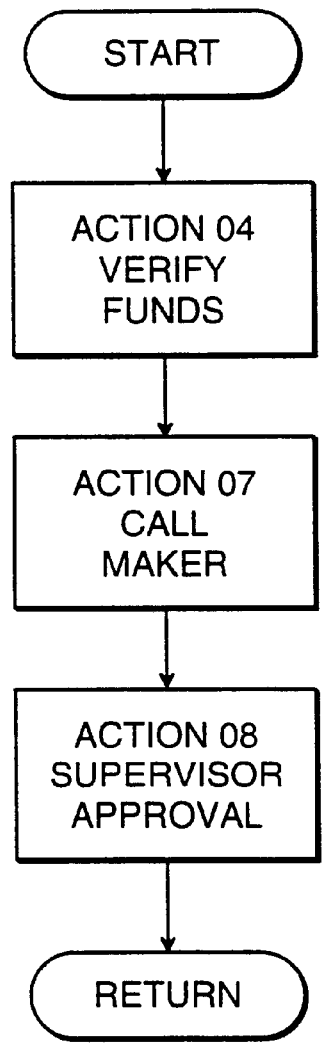
Figure 13G:
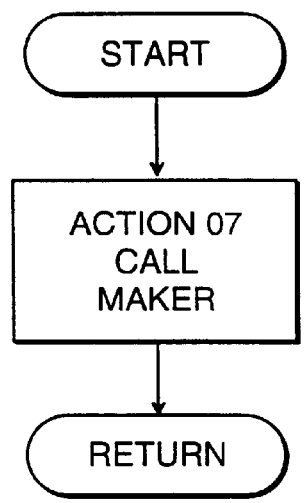
Figure 13H:
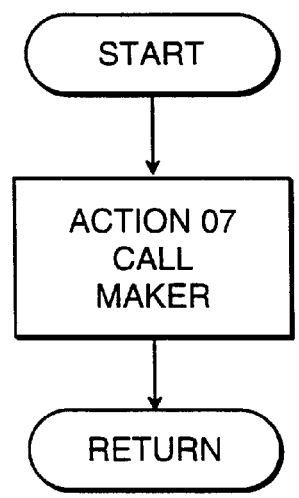
Figure 131:
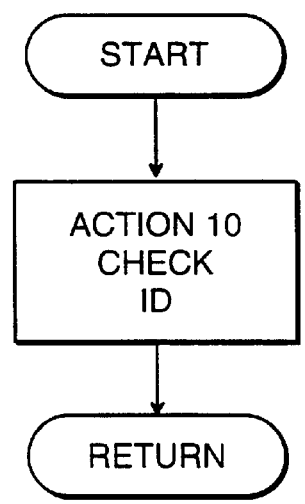
Figure 13J:
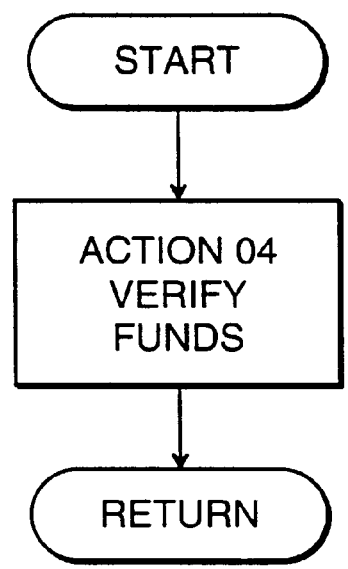
Figure 13K:
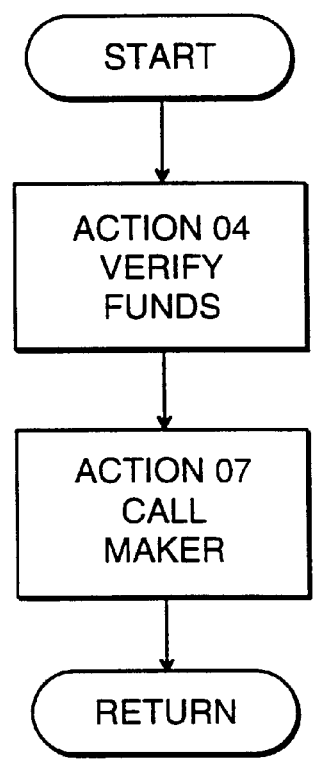
Figure 13L:
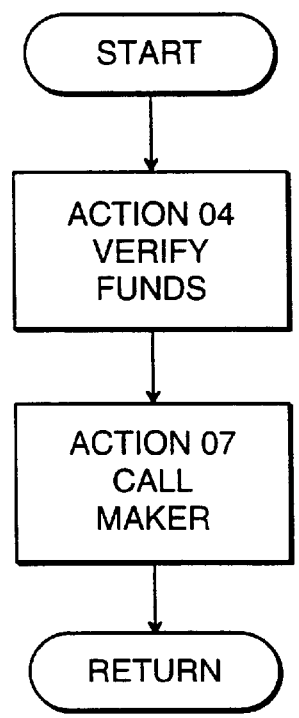
Figure 13M:
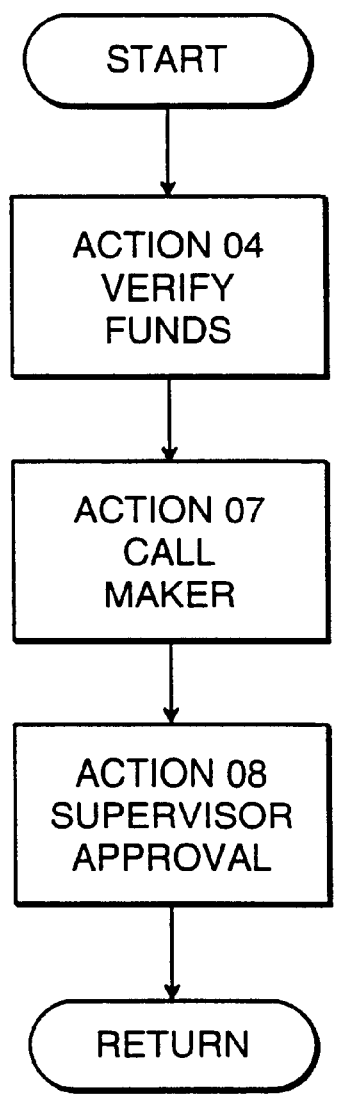
Figure 13N:
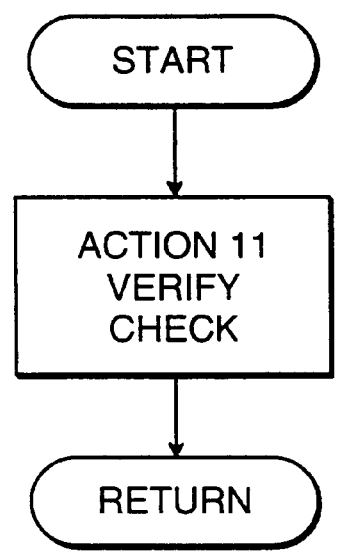
Figure 130:
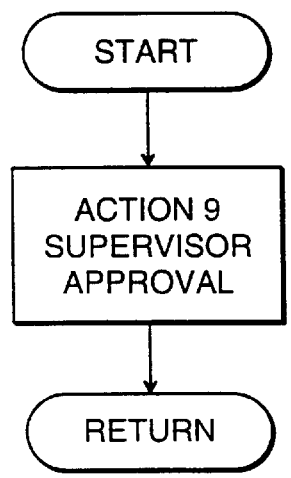
Figure 13P:
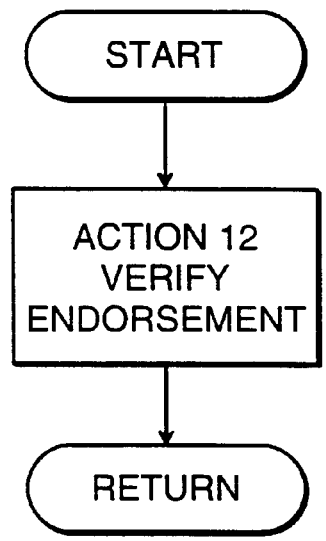
Figure 13Q:
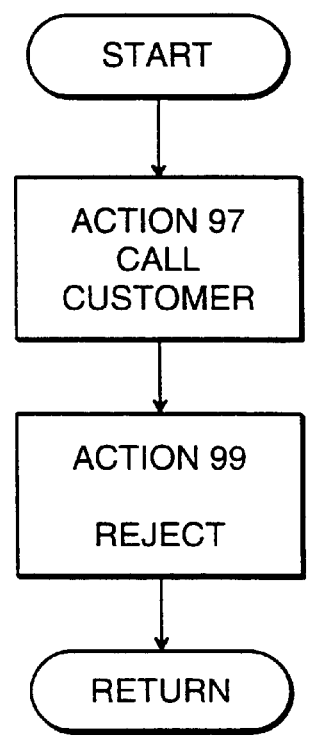
Figure 13R:
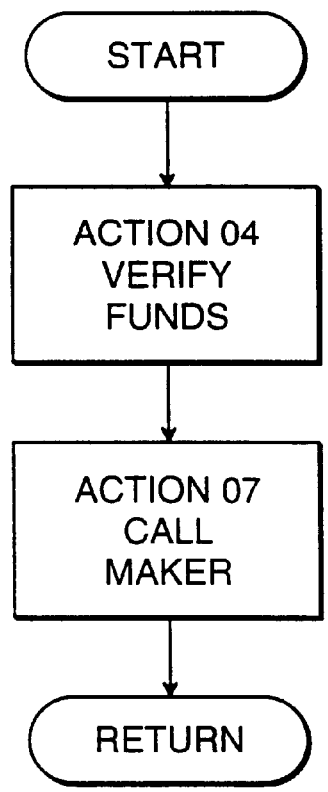
Figure 13S:
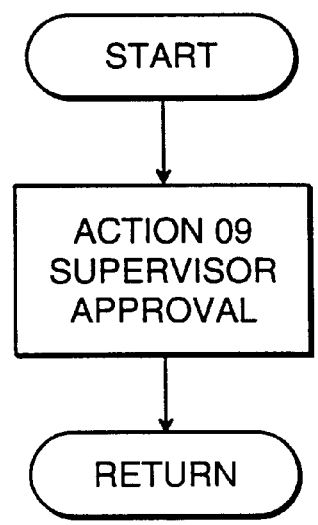
Figure 14A:
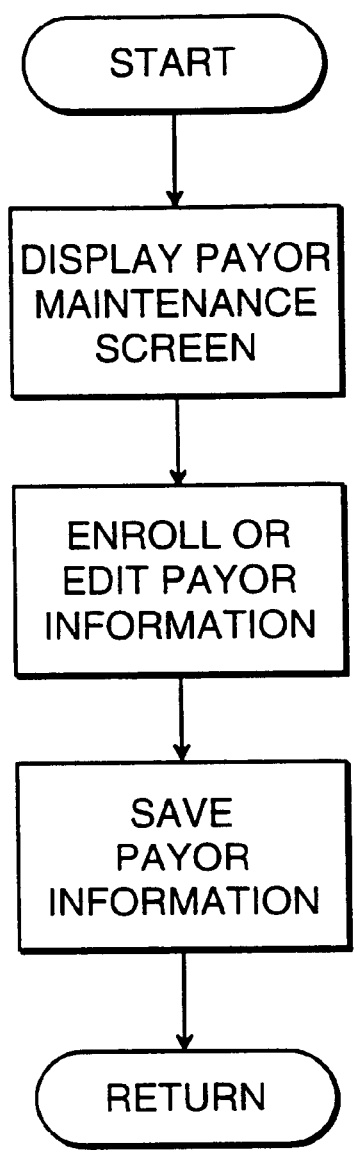
FIGS. 14A–14P are flow charts of procedures implemented by the centralized services center in performing the actions of FIG. 12B.
Figure 14B:
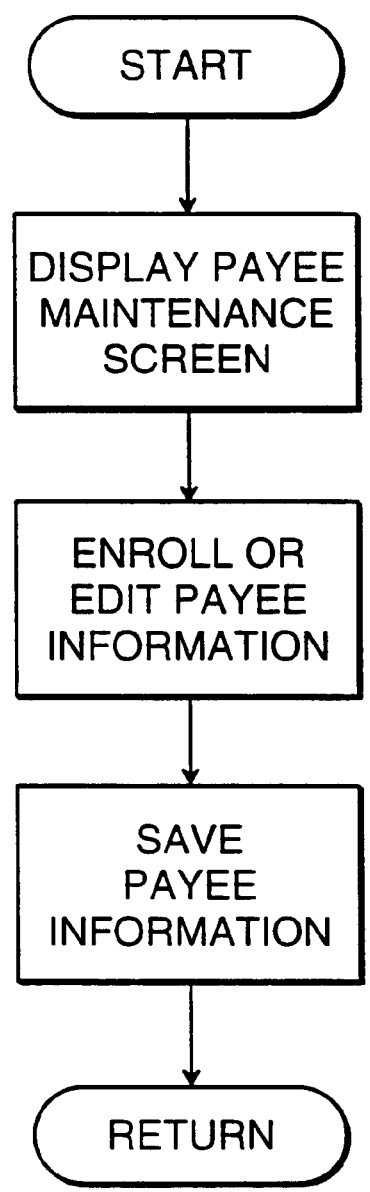
Figure 14C:
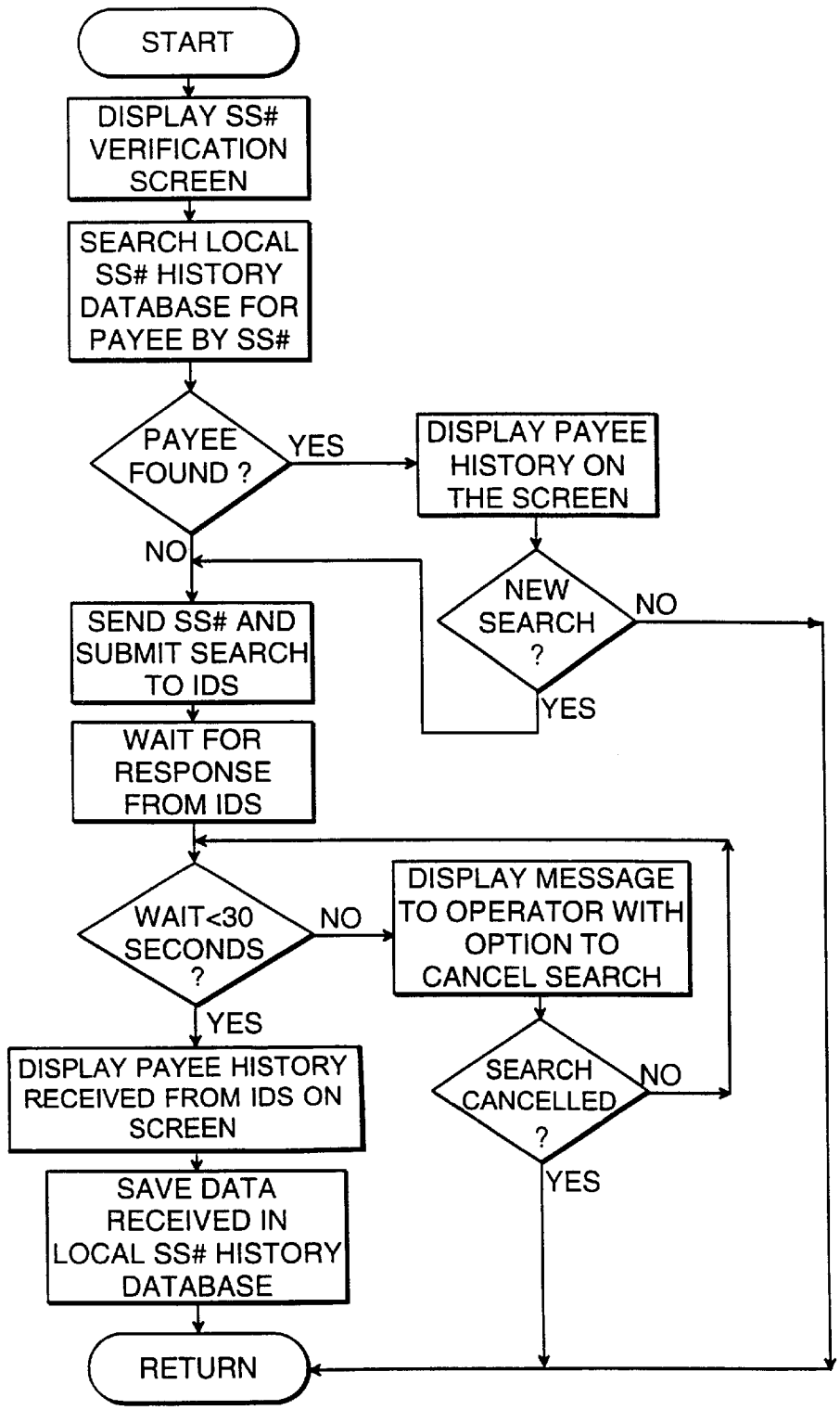
Figure 14D:
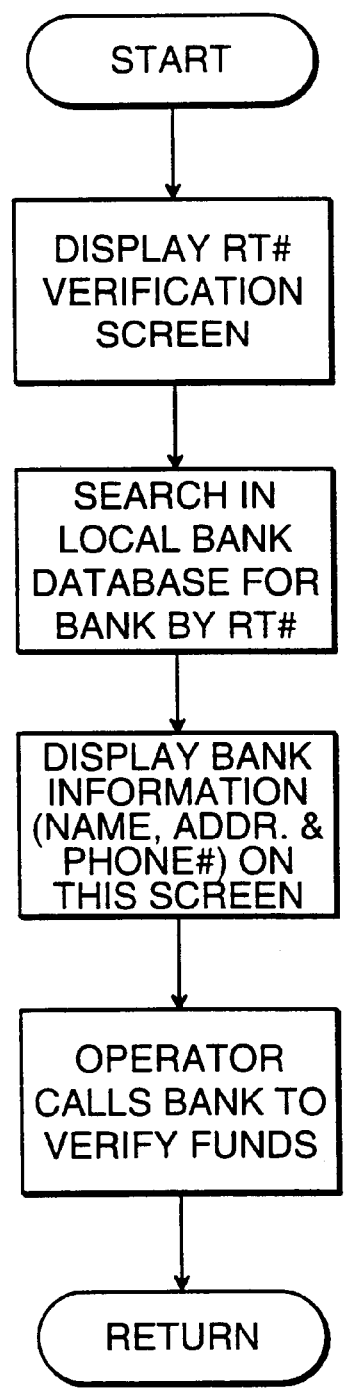
Figure 14E:
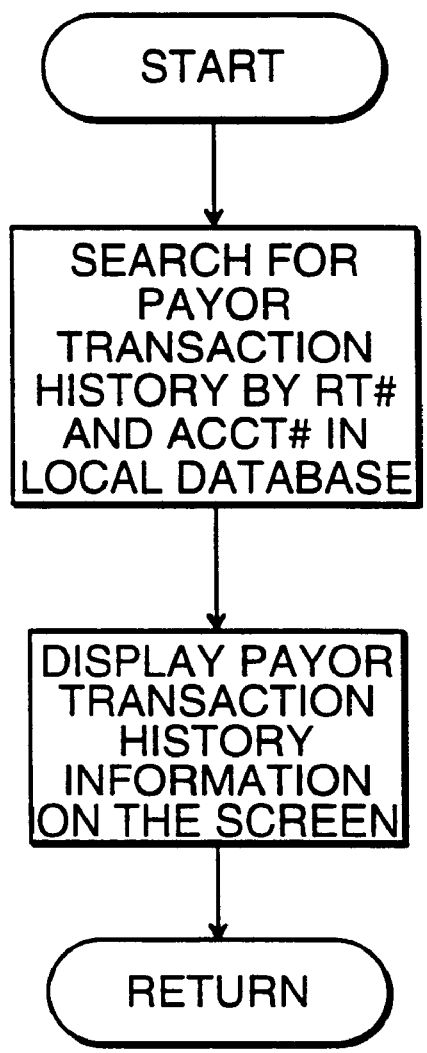
Figure 14F:
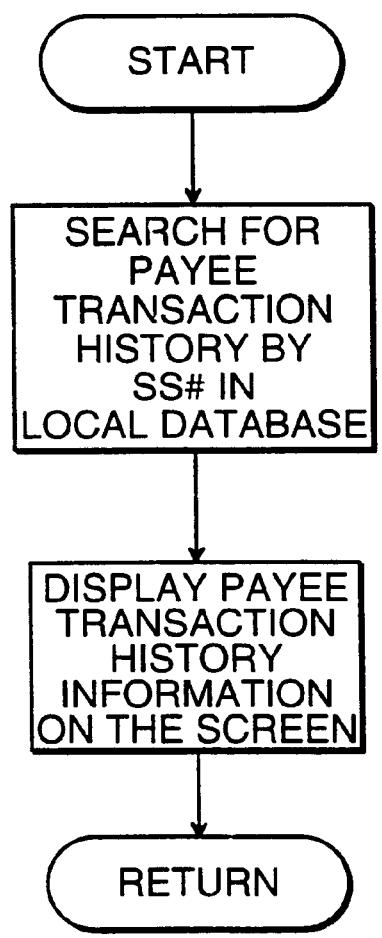
Figure 14G:
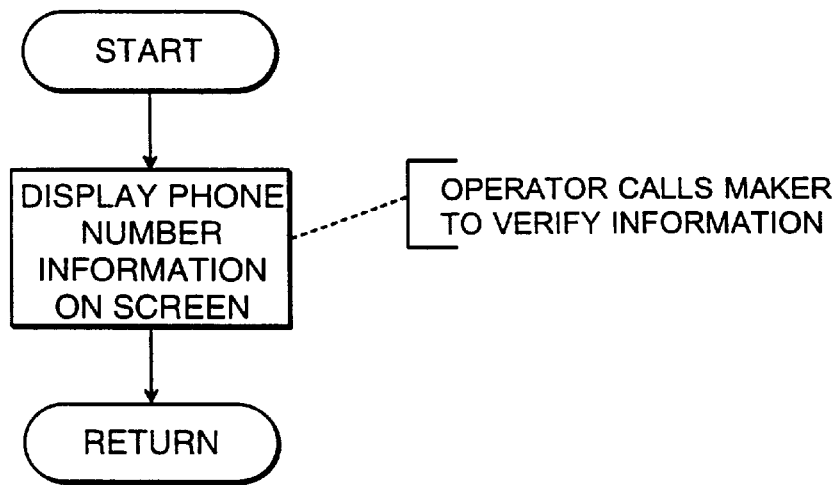
Figure 14H:
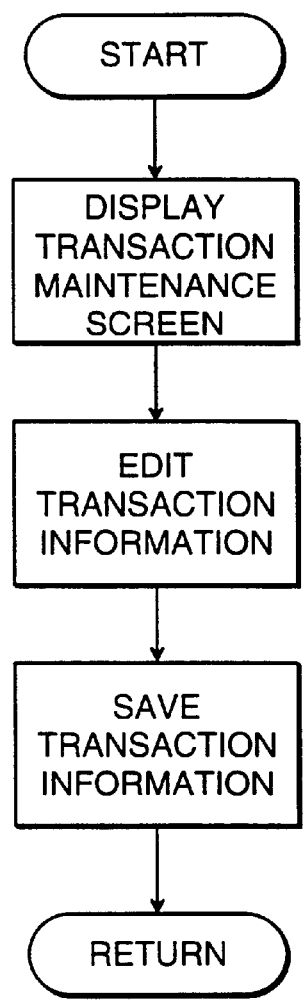
Figure 14I:
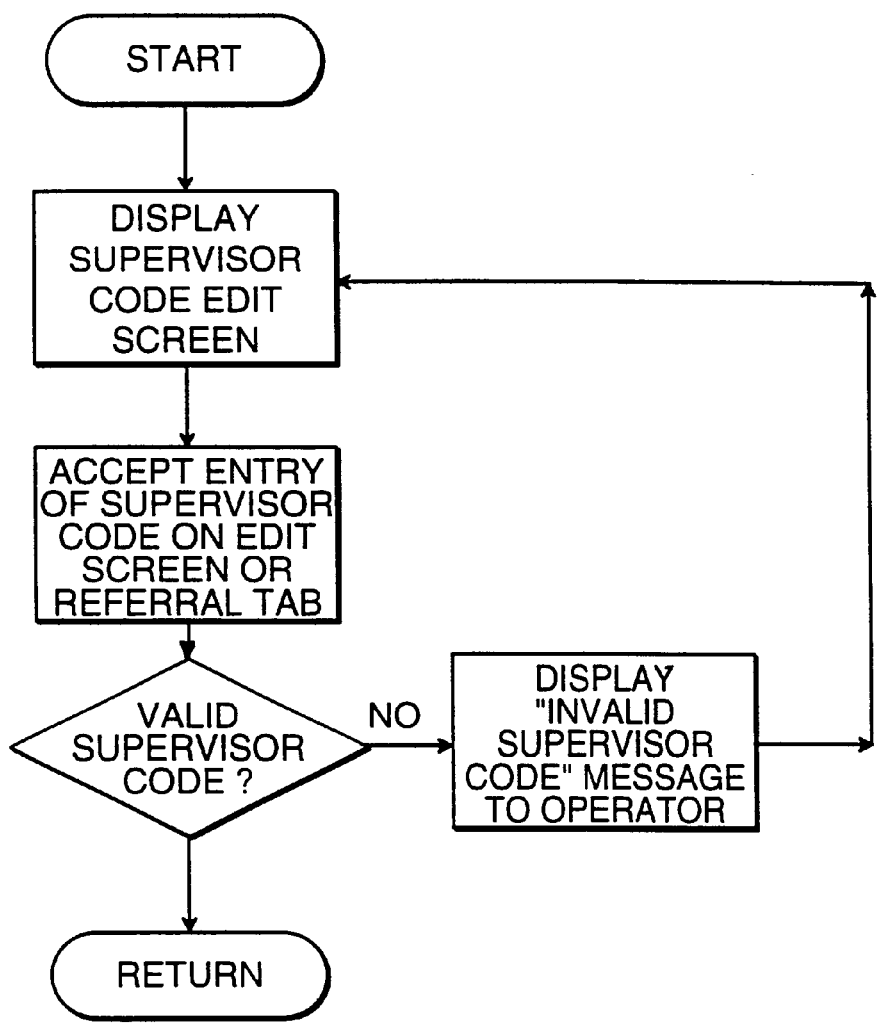
Figure 14J:
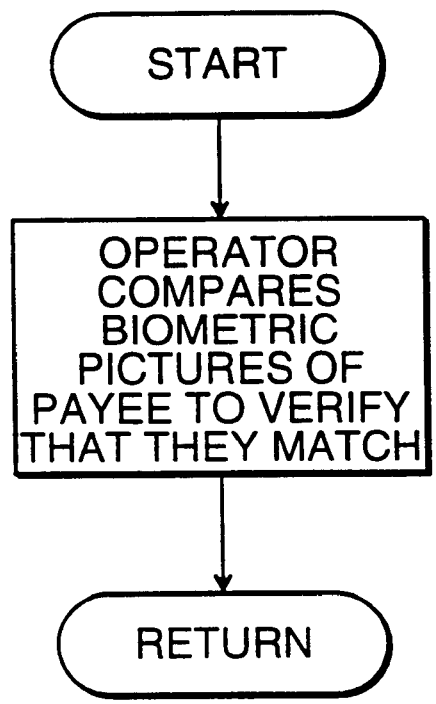
Figure 14K:
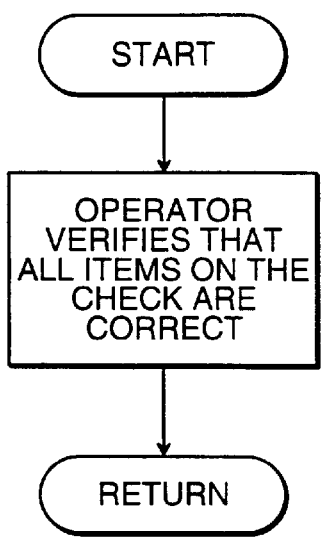
Figure 14L:
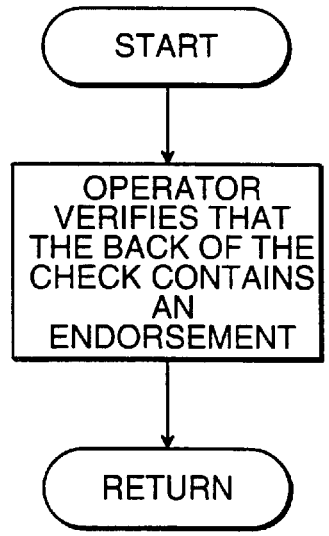
Figure 14M:
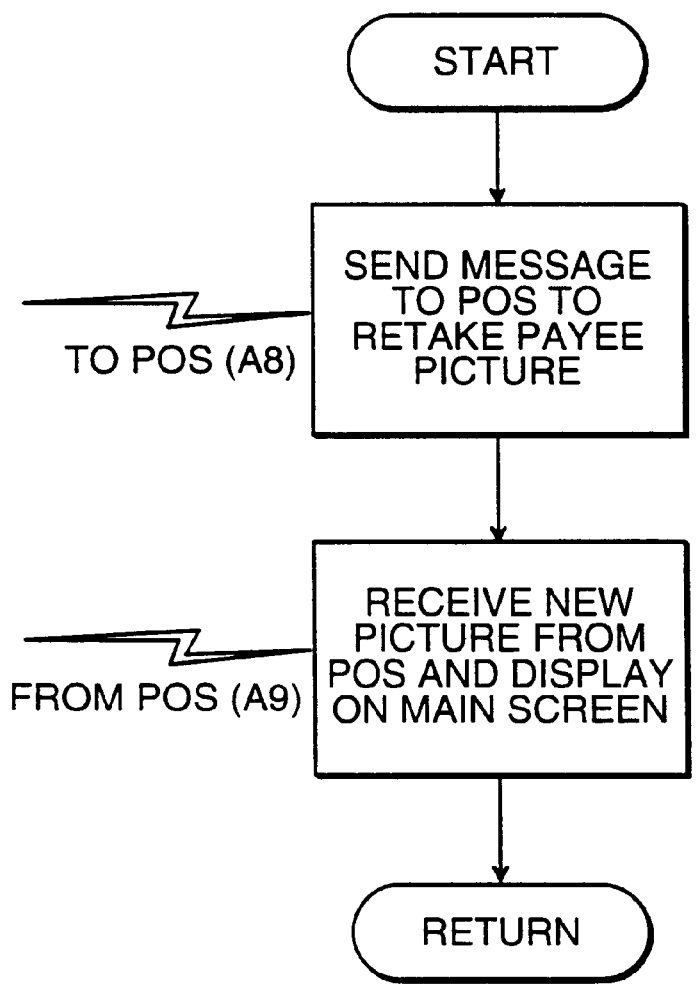
Figure 14N:
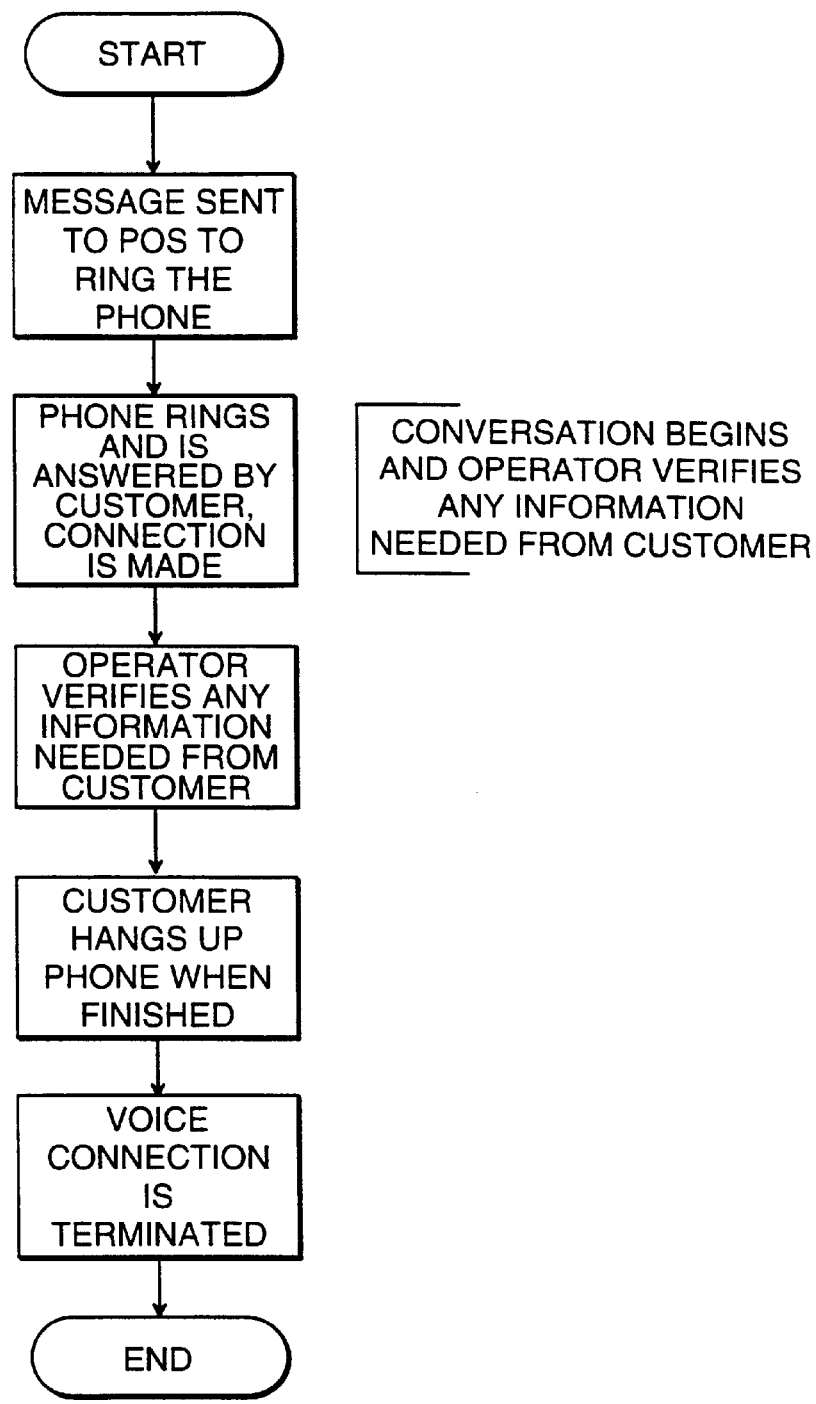
Figure 140:
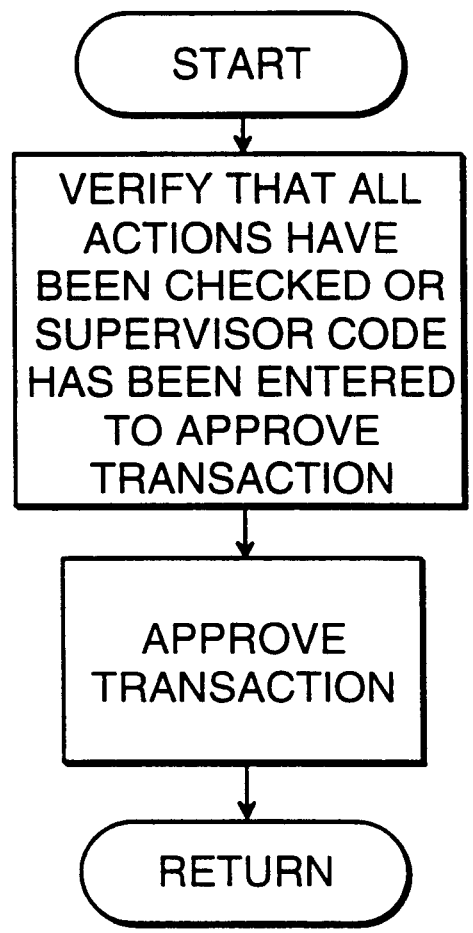
Figure 14P:
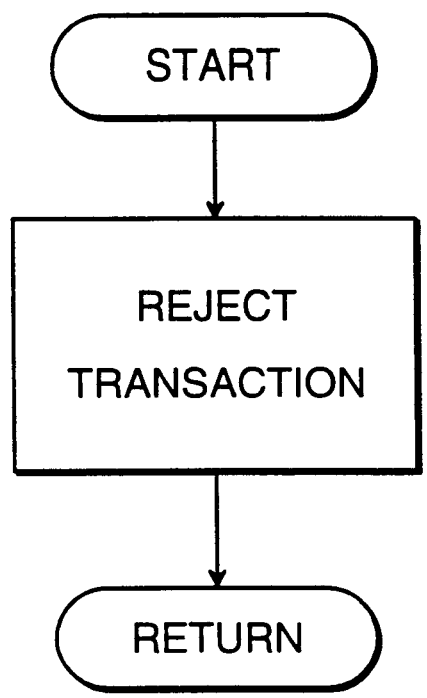
Figure 16A:
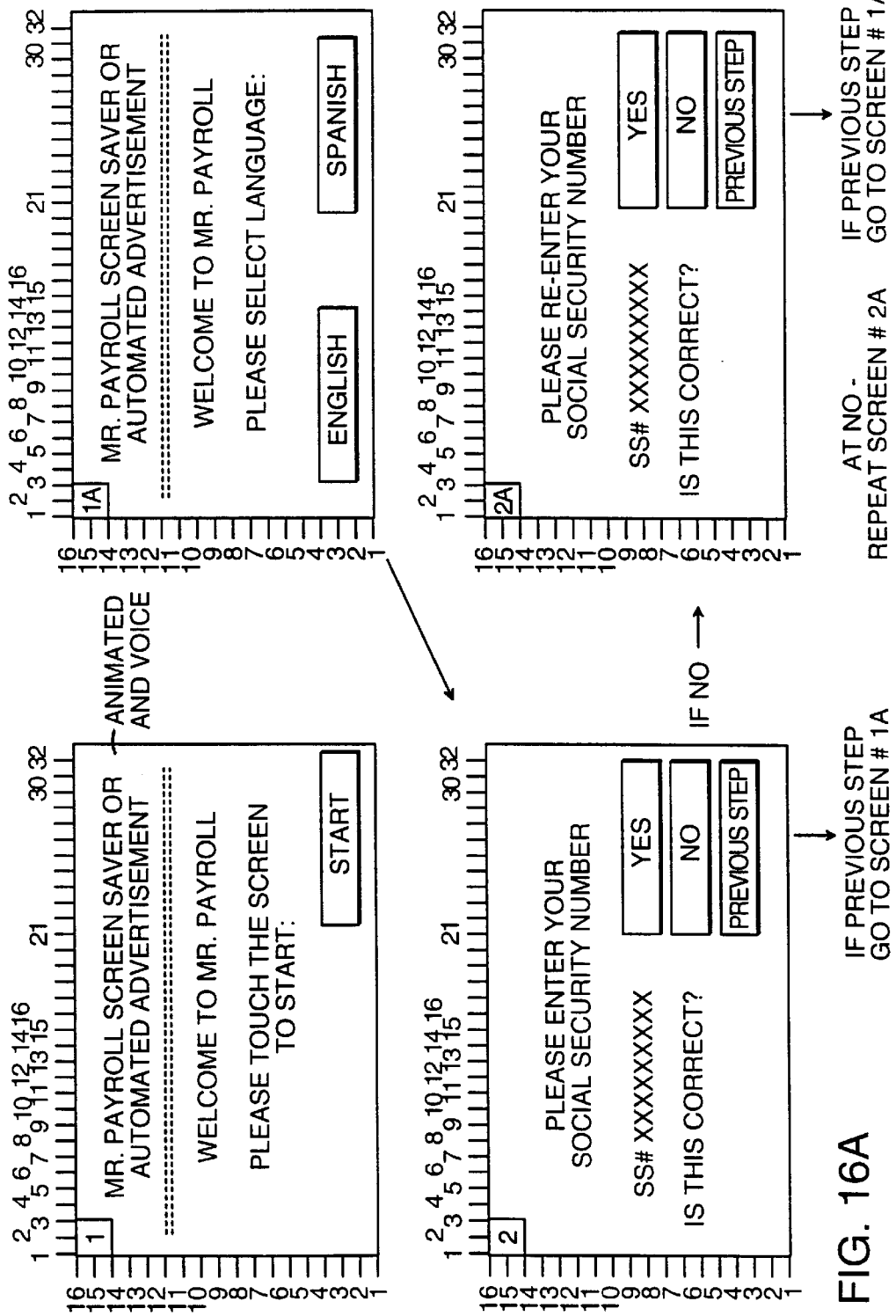
Figure 16B:
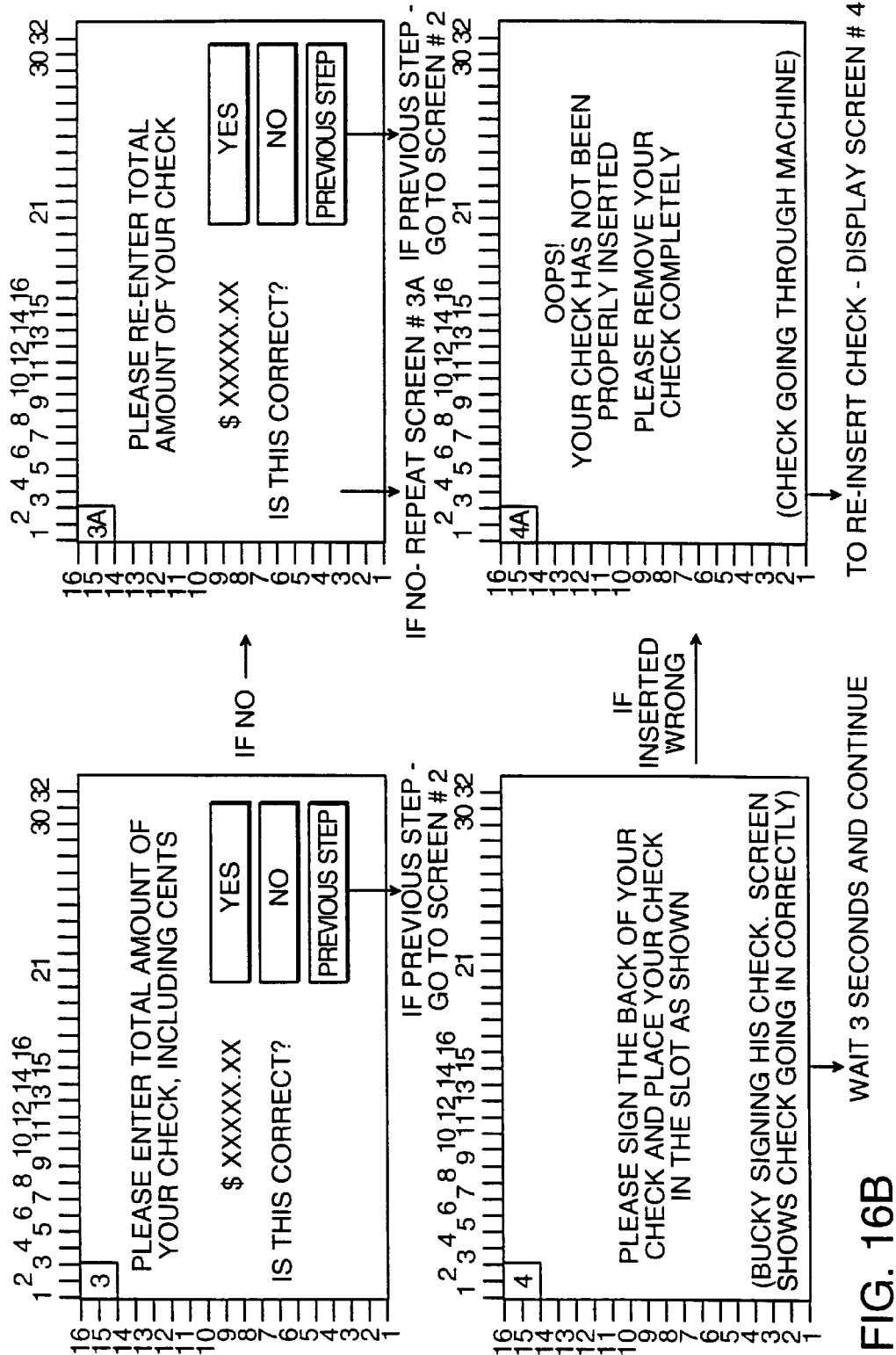
Figure 16D:
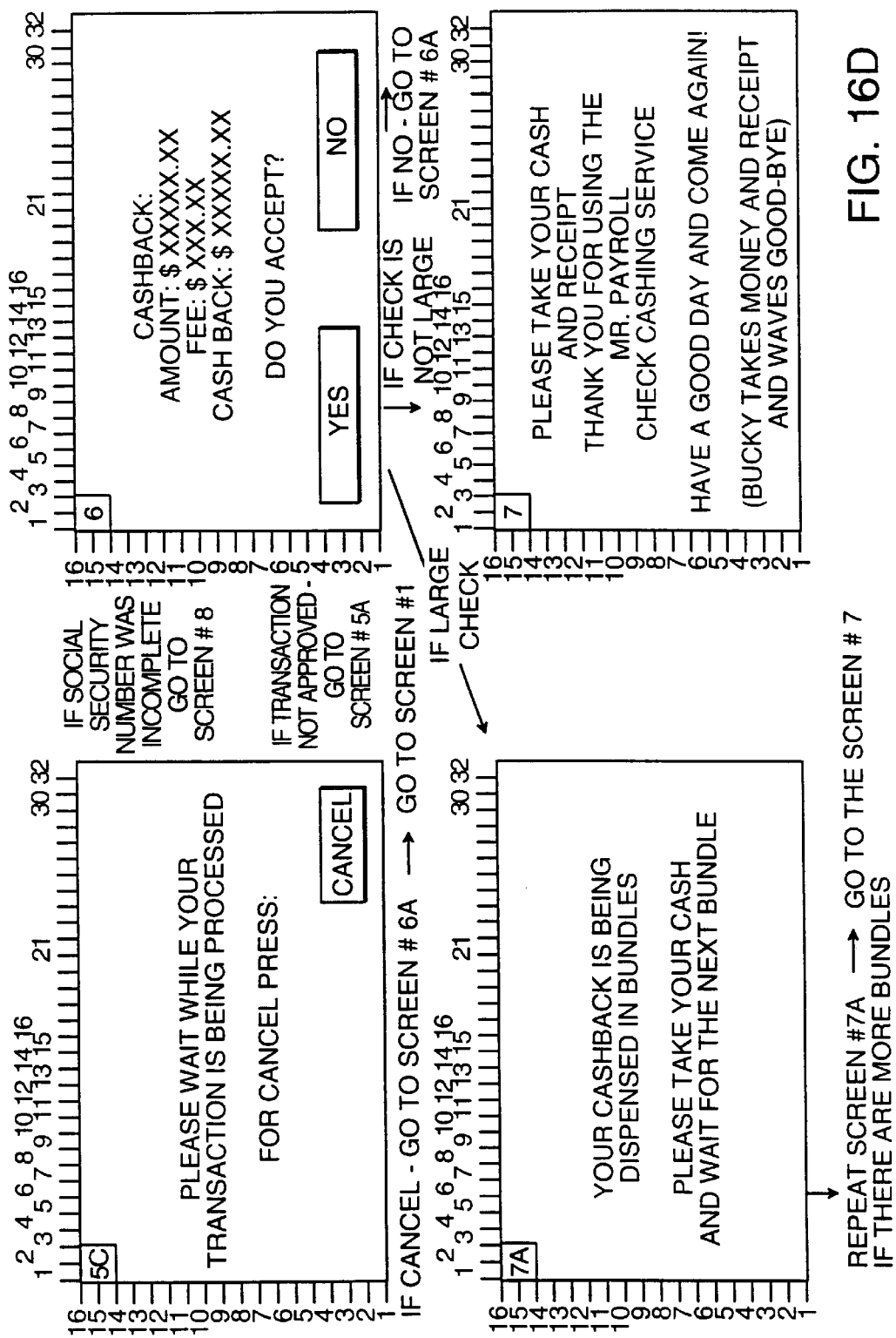
Figure 16E:
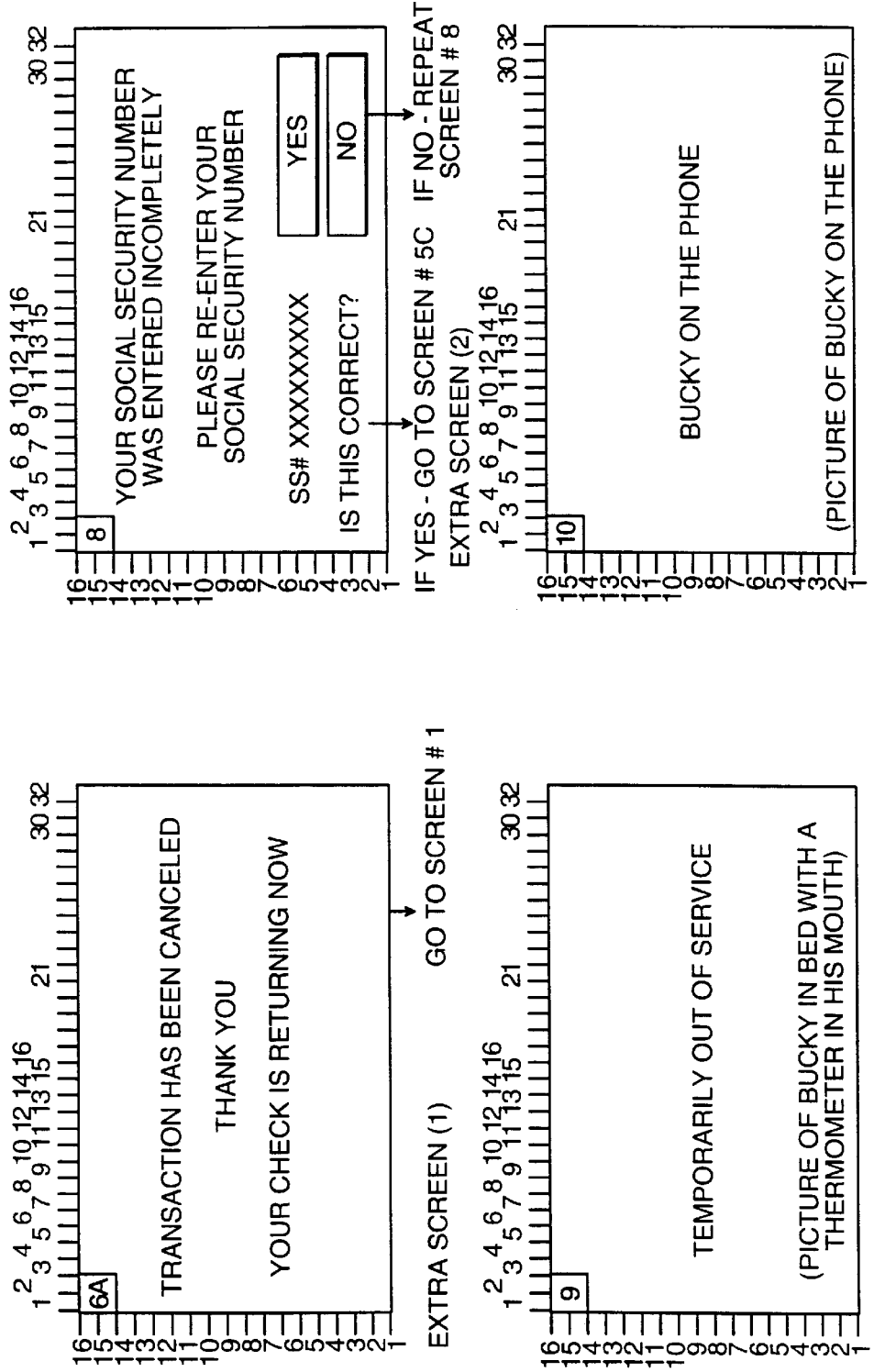
Figure 16F:
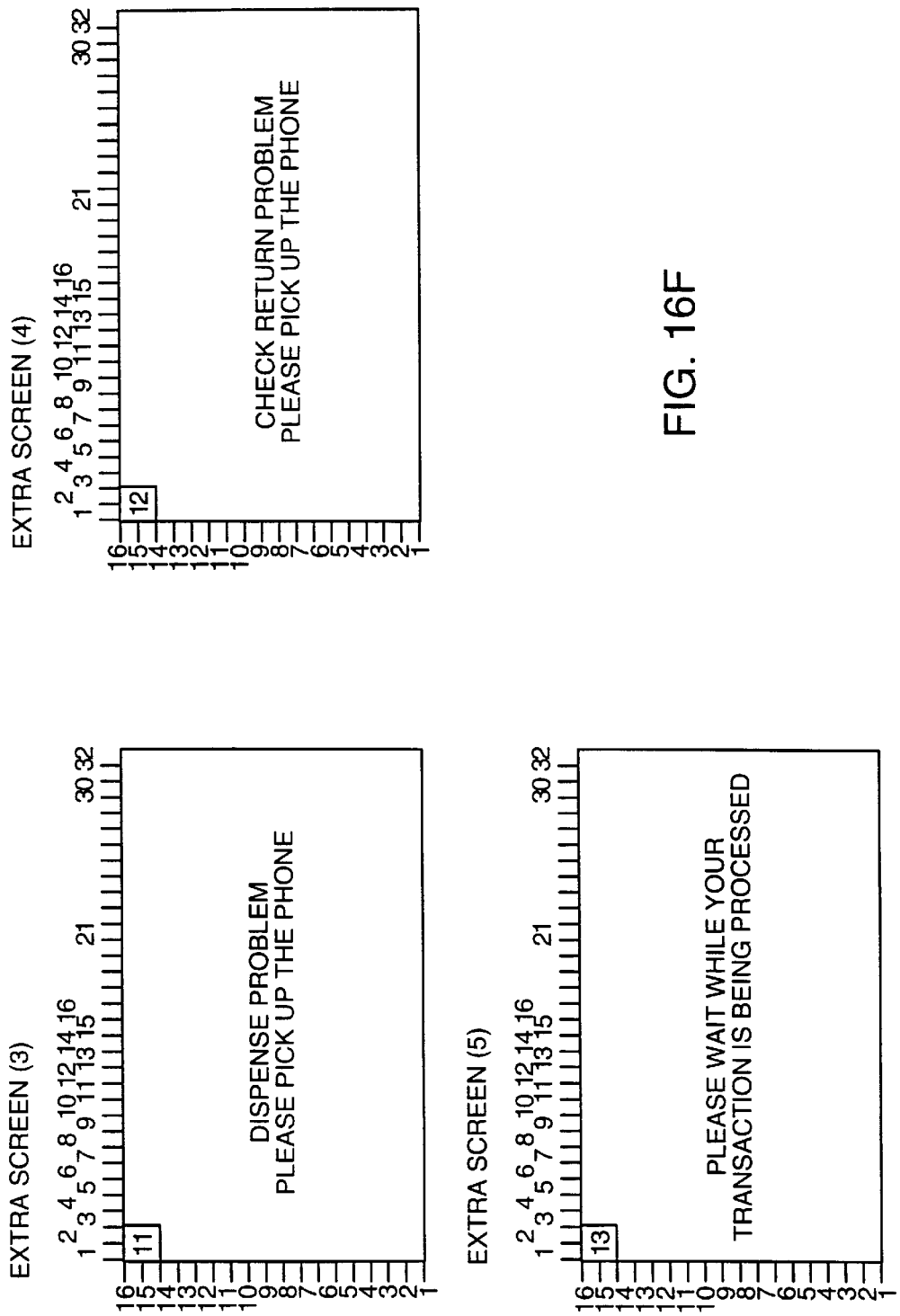

Referrals that may be provided to the CSC and the actions taken by the operator in response to those referrals are illustrated in FIG. 12A, with the actions that are identified by numbers in FIG. 12A being identified in more detail in FIG. 12B. Flowcharts of referral responses are provided in FIGS. 13A–13S. Flowcharts of actions are provided in FIGS. 14A–14P.

Referring again to FIG. 8A, upon receiving a message from the CSC operator (step 870), or after accepting (step 845) or rejecting (step 829 or 837) the transaction, the call handler sends an appropriate message to the POS unit 100 and waits for a response (step 872).

Referring again to FIG. 7, if the message received from the CSC is an identification request (step 767), the POS unit 100 makes a further attempt to identify the customer (step 769) and transmits a resulting BMP file to the CSC 500 (step 771). If the further attempt is unsuccessful, the server 500 may make a further attempt to identify the customer. The server 500 may be able to identify the customer even though the POS unit 100 could not because the server has access to a larger database than does the POS unit 100. For example, a customer who normally uses a different POS unit may not appear in the payee database of the current POS unit, but would appear in the payee database of the CSC. In this circumstance, the current POS unit would have no image against which to compare the customer's image, while the sever would have such an image. The server 500 then passes the BMP file and the results of the identification to the operator workstation 510 for use by the operator in taking additional actions (step 860 of FIG. 8B).

If the message received from the CSC is not an identification request (step 767), the processor 300 determines whether the transaction has been approved or rejected (step 773). If the transaction has been rejected, the processor 300 ends the call to the CSC 400 (step 775) and notifies the ATM 350 (step 779).

If the transaction has been approved (step 773), the processor 300 determines the fee to charge the customer and the payback amount (i.e., the amount of cash that the customer will receive) (step 777). The processor 300 then sends this information to the ATM 350 and waits for a reply (step 779). Because operator intervention was required, this fee may differ from the fee that would have been calculated had the processor automatically approved the transaction.

Upon receiving a transaction verification result from the ATM 350 (step 781), the processor 300 sends a transaction reply message to the ATM 350 (step 783) and waits for a transaction confirmation message from the ATM. Upon receiving a transaction confirmation message from the ATM, the processor 300 records the transaction and updates the database located on the storage device 320 (step 787). The processor 300 then sends a transaction completed or cancelled message to the CSC 400 (step 789) and ends the call to the CSC 400 (step 791).

Referring again to FIG. 8A, upon receiving a reply from the processor 300 (step 874), the server 500 records the transaction and updates the server's databases (step 876).

For tracking purposes, a check record associated with each check being handled by the CSC includes a status code, a check disposition code, and an operator code. A status code of "A" indicates that the check is waiting to be handled by an operator or a supervisor, and a status code of "C" indicates that the check has been processed by an operator or a supervisor and that the POS unit has performed the appropriate function in response. Check disposition codes of 11, 12, 21, 22, 31, 32, 41 and 42 indicate that the check was accepted ("n1") or rejected ("n2") by the POS unit ("1n"), CSC automatic verification ("2n"), a CSC Operator ("3n") or a CSC Supervisor ("4n"). The operator code is blank until the active check has been assigned to a specific operator, and thereafter identifies that operator. Other data structures used by the POS unit 100 and the CSC 400 are illustrated in FIGS. 15A–15L.

Sample screen displays produced by the ATM 350 of a POS unit 100 are illustrated in FIGS. 16A–16F. Arrows between the various screens indicate the sequence and the conditions under which the screens are displayed.

The software implemented by the CDC 400 may be described with reference to several different modules. The first module, referred to as the call handler, includes one instance per active call and receives messages from the POS unit. Functions implemented by the call handler include reformatting and/or writing a POS message to the CSC server and identifying the message type of the message. If the message is for a CSC operator, the call handled instantiates an instant check evaluator that attempts to automatically approve or reject the check associated with the message. If the message is for a CSC supervisor, the call handler places the message into a POS to CSC table. If the message is a photo or check image, and the related check is being handled by an operator or a supervisor (i.e., the check disposition code for the related check is "30" or "40"), the call handler updates an image display window for the operator or supervisor. The call handler also sends CSC mailbox items that are addressed to the POS unit, and terminates the call when a live call is completed by the CSC operator and all mail for the POS unit is sent.

As noted above, the instant check evaluator attempts to automatically approve or reject a check. The evaluator receives a store number and transaction number from the call handler and evaluates the business rules to determine if the check should be automatically accepted or rejected, and changes the check disposition code to show the results of the evaluation (i.e., "21" indicates automatic approval, "22" indicates automatic rejection, and "30" indicates that operator intervention is required).

An operator transaction manager module routes messages between the other modules. When one or more checks need to be processed by an operator (i.e., there are checks with disposition codes of "30"), and one or more operators are available, the operation transaction manager reads from the oldest check to be processed to the newest check to be processed, and determines for each check whether a qualified operator (e.g., an operator who speaks the appropriate language) is available. If a qualified operator is available, the operation transaction manager places the operator's number into the operator code for the check and passes information about the check to the operator.

A CSC operator module provides information about a check to the operator. The CSC operator module also provides the operator with any other information needed to evaluate the check. Once the operator makes a decision about the check, the CSC operator module changes the disposition code for the check to an appropriate value (i.e., "31" is approved, "32" if rejected, and "40" if referred to a supervisor) and takes an appropriate action.

A CSC supervisor module carries out functions similar to those of the operator transaction manager and the CSC operator module, but does so for the supervisor(s) rather than the operator.

The various software modules communicate with each other with messages passed between and among the modules. The messages may be formatted as: module from, module to, date, time, type, priority, store number, transaction number, and text, where the module from and module to entries may equal: ATM (the automated teller machine), POS (the point of sale unit), CAM (the camera) and CSC (the central service center), and where "text" is one or more comma delimited fields.

The system also could be put to uses other than check cashing. For example, as noted above, the POS units may be configured to provide banking functions presently provided by traditional ATM machines. When contacting the CSC, the POS unit indicates whether a transaction is a check transaction or a traditional ATM transaction. The server at the CSC routes ATM transactions to an ATM network provider, and processes check transactions as described above.

Other uses to which the system may be put include, but are not limited to: paying bills, extending loans, producing rent-to-own contracts, filing tax returns, or dispensing social security or other government benefits. For payment of bills, a cash acceptor or a similar device may be incorporated into the POS unit. Similarly, the system could be configured to perform wire transfers or to dispense money orders or telephone cards.

Other embodiments are within the scope of the following claims. For example, the techniques described here are not limited to any particular hardware or software configuration;

they may find applicability in any computing or processing environment that may be used for cashing checks or performing similar transactions. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. An automated check-cashing apparatus, comprising:
an input device configured to generate input signals in response to inputs from a customer presenting a check to be processed;
a storage device including a database of customer information;
a check reader configured to receive and read the check to be processed, including reading the amount of the check by optical character recognition;
a cash dispenser; and
an electronic processor connected to the input device, the storage device, the check reader, and the cash dispenser, and configured to:
receive the input signals from the input device,
receive information about the check to be processed from the check reader,
access the database of customer information to obtain data about the customer,
determine automatically whether to accept or resect the check based on the input signals, the received information about the check, and the data about the customer,
upon accepting the check, signal the cash dispenser to dispense cash to the customer
wherein the processor is further configured to confirm an identity of the customer based on biometric information about the customer,
wherein, after confirming the identity of the customer, the processor is configured to determine automatically whether to accept or reject the check by applying a set of business rules,
wherein the business rules are defined generally to permit the processor to accept the check if the customer has used the apparatus previously to cash a previous check for a similar amount from a payor associated with the check to be processed.

2. A method for automatically dispensing cash in exchange for a negotiable instrument, comprising:
inputting a user identification from a user,
acquiring biometric data relating to the user;
inputting a negotiable instrument from the user;
extracting information from the negotiable instrument;
determining based on the user identification whether a data store stores data relating to the user or the negotiable instrument;
comparing the stored data with input data if the data store stores data relating to the user or the negotiable instrument; and
determining whether to dispense cash in exchange for the negotiable instrument based on a result of said comparing,
wherein determining whether to dispense cash in exchange for the negotiable instrument comprises:
applying a set of business rules; and
if none of the business rules are violated, dispensing cash in exchange for the negotiable instrument based upon the comparison of the stored data with the received data, and
wherein applying the set of business rules comprises determining whether the user has previously submitted a negotiable instrument for a similar dollar amount from a payor associated with the negotiable instrument.

3. A method for automatically dispensing cash in exchange for a negotiable instrument, comprising:
inputting a user identification from a user,
acquiring biometric data relating to the user;
inputting a negotiable instrument from the user;
extracting information from the negotiable instrument;
determining based on the user identification whether a data store stores data relating to the user or the negotiable instrument;
comparing the stored data with input data if the data store stores data relating to the user or the negotiable instrument; and
determining whether to dispense cash in exchange for the negotiable instrument based on a result of said comparing,
wherein determining whether to dispense cash in exchange for the negotiable instrument comprises:
applying a set of business rules; and
if none of the business rules are violated, dispensing cash in exchange for the negotiable instrument based upon the comparison of the stored data with the received data, and
further comprising, if the data store does not store any data relating to the user or the negotiable instrument, transmitting the user identification, the acquired biometric data, and the information extracted from the negotiable instrument to a remote service center.

4. The method of claim 3, further comprising displaying instructions to the user to communicate with the remote service center via telephone.

5. An apparatus for automatically cashing a check presented by a user, comprising:
a display device to generate a user display that directs a user in a check cashing process;
a data input device to receive data input by the user, including a user identification;
a biometric input device to receive biometric data relating to the user;

a check input device to receive a negotiable instrument input by the user;

a storage device to store data relating to at least one user that has previously used the apparatus and biometric data relating to at least one user that has previously used the apparatus; and a processor to process the data input by the user, the received biometric data, the stored data, and the stored biometric data and to attempt to perform a determination of whether to dispense cash in exchange for the negotiable instrument, wherein if the processor cannot perform the determination, the processor further transmits at least the user identification and the received biometric data to a remote service center, the remote service center including a remote storage device that stores data relating to a plurality of users and biometric data relating to the plurality of users.

6. The apparatus of claim 5, further comprising a card reader device to read a magnetic strip on the card, wherein the apparatus further performs traditional automatic teller machine (ATM) functions.

7. The apparatus of claim 5, further comprising a biometric device to automatically collect biometric data relating to the user.

8. The apparatus of claim 7, wherein the biometric device comprises at least one camera, and wherein the biometric data comprises at least one image of the user's face.

9. An automated check-cashing apparatus, comprising:

an input device configured to generate input signals in response to inputs from a customer presenting a check to be processed;

a storage device including a database of customer information;

a check reader configured to receive and read the check to be processed, including reading the amount of the check by optical character recognition;

a cash dispenser; and an electronic processor connected to the input device, the storage device, the check reader, and the cash dispenser, and configured to:

receive the input signals from the input device;

receive information about the check to be processed from the check reader;

access the database of customer information to obtain data about the customer;

determine automatically whether to accept or reject the check based on the input signals, the received information about the check, and the data about the customer;

confirm an identity of the customer based on biometric information about the customer;

after confirming the identity of the customer, determine automatically whether to accept or reject the check by applying a set of business rules, wherein the business rules are defined generally to permit the processor to accept the check if the customer has used the apparatus previously to cash a previous check for a similar amount from a payor associated with the check to be processed; and upon accepting the check, signal the cash dispenser to dispense cash to the customer.

* * * * *